US012453761B2

(12) United States Patent
Norris et al.

(10) Patent No.: US 12,453,761 B2
(45) Date of Patent: Oct. 28, 2025

(54) TREATMENT AND DETECTION OF INFECTION AND DISEASE ASSOCIATED WITH DIFFERENT FUNGAL PATHOGENS

(71) Applicant: UNIVERSITY OF GEORGIA RESEARCH FOUNDATION, INC., Athens, GA (US)

(72) Inventors: Karen A. Norris, Athens, GA (US); Whitney Rabacal, Athens, GA (US); Emily Rayens, Athens, GA (US)

(73) Assignee: University of Georgia Research Foundation, Inc., Athens, GA (US)

( * ) Notice: Subject to any disclaimer, the term of this patent is extended or adjusted under 35 U.S.C. 154(b) by 1045 days.

(21) Appl. No.: 17/425,279

(22) PCT Filed: Jan. 23, 2020

(86) PCT No.: PCT/US2020/014805

§ 371 (c)(1),
(2) Date: Jul. 22, 2021

(87) PCT Pub. No.: WO2020/154510

PCT Pub. Date: Jul. 30, 2020

(65) Prior Publication Data

US 2022/0184190 A1 Jun. 16, 2022

Related U.S. Application Data

(60) Provisional application No. 62/796,120, filed on Jan. 24, 2019.

(51) Int. Cl.

| | |
|---|---|
| ***A61K 39/00*** | (2006.01) |
| ***A61P 31/10*** | (2006.01) |
| ***C07K 14/37*** | (2006.01) |
| ***C07K 16/14*** | (2006.01) |

(52) U.S. Cl.

CPC .......... *A61K 39/0002* (2013.01); *A61P 31/10* (2018.01); *C07K 14/37* (2013.01); *C07K 16/14* (2013.01); *A61K 2039/55511* (2013.01)

(58) Field of Classification Search

CPC ...... A61K 39/0002; A61K 2039/55511; A61K 2039/545; A61K 2039/55; A61K 2039/55505; A61K 2039/55572; A61K 2039/575; A61K 2039/58; A61P 31/10; C07K 14/37; C07K 16/14; C12N 9/58

See application file for complete search history.

(56) References Cited

U.S. PATENT DOCUMENTS

| | | | |
|---|---|---|---|
| 4,816,567 | A | 3/1989 | Cabilly et al. |
| 4,956,778 | A | 9/1990 | Naito |
| 4,981,785 | A | 1/1991 | Nayak |
| 5,091,513 | A | 2/1992 | Huston et al. |
| 5,132,405 | A | 7/1992 | Huston et al. |
| 5,225,539 | A | 7/1993 | Winter |
| 5,358,691 | A | 10/1994 | Clark et al. |
| 5,530,101 | A | 6/1996 | Queen et al. |
| 5,585,089 | A | 12/1996 | Queen et al. |
| 5,693,762 | A | 12/1997 | Queen et al. |
| 5,859,205 | A | 1/1999 | Adair et al. |
| 5,885,530 | A | 3/1999 | Babson et al. |
| 6,159,750 | A | 12/2000 | Edmonds |
| 9,181,538 | B1 | 11/2015 | Norris et al. |
| 9,580,704 | B2 | 2/2017 | Kolls et al. |
| 9,914,917 | B1 | 3/2018 | Norris et al. |
| 2005/0196754 | A1 | 9/2005 | Drmanac et al. |
| 2010/0008954 | A1 | 1/2010 | Wong et al. |
| 2010/0093557 | A1 | 4/2010 | Kumble |
| 2010/0190656 | A1 | 7/2010 | Li et al. |
| 2013/0315857 | A1 | 11/2013 | Kolls et al. |
| 2013/0344110 | A1 | 12/2013 | Selitrennikoff et al. |
| 2018/0153990 | A1 | 6/2018 | Gigliotti et al. |
| 2020/0222517 | A1 | 7/2020 | Norris et al. |

FOREIGN PATENT DOCUMENTS

| | | | |
|---|---|---|---|
| WO | 2004067709 | A2 | 8/2004 |
| WO | 2011087934 | A2 | 7/2011 |
| WO | 2017139679 | A1 | 8/2017 |
| WO | 2019067592 | A1 | 4/2019 |
| WO | 2021097021 | A2 | 5/2021 |

OTHER PUBLICATIONS

Office Action and English translation of Office Action dated Aug. 28, 2024 in corresponding Chinese Patent Application No. 202080024070.4 (10 pages).

Office Action dated May 23, 2024 in corresponding Chinese Patent Application No. 202080024070.4 (4 pages).

English translation of Office Action dated May 23, 2024 in corresponding Chinese Patent Application No. 202080024070.4 (5 pages).

International Search Report and Written Opinion in International Patent Application No. PCT/US2020/014805, mailed May 22, 2020 (14 pages).

Uniprot Accession A0A2I1C4F7. Pheromone processing endoprotease Kex2. (online) Jan. 19, 2019 [online]. [Retrieved Jul. 20, 2021]. Retrieved from the internet <URL: https://www.uniprot.org/uniprot/A0A2I1C4F7.txt?version=5.

Extended European Search Report dated Jan. 12, 2023 in corresponding European Patent Application No. 20744389.6 (10 pages).

Croix et al., "Alterations in T Lymphocyte Profiles of Bronchoalveolar Lavage Fluid from SIV- and Pneumocystis carinii—Coinfected Rhesus Macaques," AIDS Research and Human Retroviruses, 2002, vol. 18, No. 5, pp. 391-401.

(Continued)

*Primary Examiner* — Alana Harris Dent

(74) *Attorney, Agent, or Firm* — Greenberg Traurig, LLP; Melissa Hunter-Ensor; Leslie Serunian

(57) ABSTRACT

Described are immunogenic compositions comprising a non-naturally occurring pan-fungal Kex peptide, and methods of using such compositions for the treatment or prevention of infection and/or diseases associated with fungal pathogens (e.g., *Pneumocystis, Aspergillus, Candida*, or *Cryptococcus*) in the subject. Also provided are compositions and kits for detecting or quantifying the presence of antibodies directed against a non-naturally occurring pan-fungal Kex peptide in a subject.

15 Claims, 11 Drawing Sheets

Specification includes a Sequence Listing.

(56) References Cited

OTHER PUBLICATIONS

Centers for Disease Control and Prevention, "Medications that Weaken Your Immune System and Fungal Infections," Hindawi, Jan. 25, 2017, Webpage, Retrieved on Jan. 8, 2019; https://www.cdc.gov/fungal/infections/immune-system.html.
Eswarappa et al., "Unusual Fungal Infections in Renal Transplant Recipients," Case Reports in Transplantation, Feb. 2015, vol. 2015, Article ID 292307, pp. 1-4.
Gigliotti et al., "Passive Intranasal Monoclonal Antibody Prophylaxis against Murine Pneumocystis carinii Pneumonia," Infection and Immunity, Mar. 2002, vol. 70, No. 3, pp. 1069-1074.
Gruber et al., "Efficient Tumor Cell Lysis Mediated by a Bispecific Single Chain Antibody Expressed in *Escherichia coli*," The Journal of Immunology, 1994, vol. 152, pp. 5368-5374.
Holliger et al., "Diabodies': Small bivalent and bispecific antibody fragments," Proceedings of the National Academy of Sciences of the United States of America, Jul. 1993, vol. 90, No. 14, pp. 6444-6448.
Huston et al., "Protein engineering of antibody binding sites: Recovery of specific activity in an anti-digoxin single-chain Fv analogue produced in *Escherichia coli*," Proceedings of the National Academy of Sciences of the United States of America, Aug. 1988, vol. 85, pp. 5879-5883.
Kling et al., "Relationship of Pneumocystis jiroveci Humoral Immunity to Prevention of Colonization and Chronic Obstructive Pulmonary Disease in a Primate Model of HIV Infection," Infection and Immunity, Oct. 2010, vol. 78, No. 10, pp. 4320-4330.
Kling et al., Vaccine-Induced Immunogenicity and Protection Against Pneumocystis Pneumonia in a Nonhuman Primate Model of HIV and Pneumocystis Coinfection, The Journal of Infectious Diseases, May 15, 2016, vol. 213, pp. 1586-1595.
Kostelny et al., "Formation of a bispecific antibody by the use of leucine zippers," The Journal of Immunology, Mar. 1, 1992, vol. 148, No. 5, pp. 1547-1553.
Kutty et al., "A Single-Copy Gene Encodes Kex1, a Serine Endoprotease of Pneumocystis jiroveci," Infection and Immunity, Jan. 2003, vol. 71, No. 1, pp. 571-574.
Lee et al., "Molecular characterization of KEX1, a kexin-like protease in mouse *neumocystis carinii*," Gene, 2000, vol. 242, Nos. 1-2, pp. 141-150.
Lilly et al., "The β-Glucan Receptor Dectin-1 Promotes Lung Immunopathology during Fungal Allergy via IL-22," The Journal of Immunology, 2012, vol. 189, pp. 3653-3660.
Loftus et al., "The Genome of the Basidiomycetous Yeast and Human Pathogen *Cryptococcus neoformans*," Science, Feb. 25, 2005, vol. 307, No. 5713, pp. 1321-1324.
Nierman et al., "Genomic sequence of the pathogenic and allergenic filamentous fungus *Aspergillus fumigatus*," Nature, Dec. 2005, vol. 438, pp. 1151-1156.
Olafsen et al., "Covalent disulfide-linked anti-CEA diabody allows site-specific conjugation and radiolabeling for tumor targeting applications," Protein Engineering, Design and Selection, Jan. 2004, vol. 17, No. 1, pp. 21-27.
Power et al., "Generation of Recombinant Multimeric Antibody Fragments for Tumor Diagnosis and Therapy," Methods in Molecular Biology, 2003, vol. 207, pp. 335-350.
Rayens et al., "Vaccine-Induced Protection in Two Murine Models of Invasive Pulmonary Aspergillosis," Frontiers in Immunology, May 18, 2021, vol. 12, Article No. 670578, pp. 1-8.
Russian et al., "Characterization of a Multicopy Family of Genes Encoding a Surface-Expressed Serine Endoprotease in Rat *Pneumocystis carinii*," Proceedings of the Association of American Physicians, Jul./Aug. 1999, vol. 111, No. 4, pp. 347-356. [Abstract].
Savoia et al., "Detection of Pneumocystis carinii by DNA Amplification in Human Immunodeficiency Virus-Positive Patients," Diagnostic Microbiology and Infectious Disease, 1997, vol. 29, No. 2, pp. 61-65.
Soltysik et al., "Structure/function studies of QS-21 adjuvant: assessment of triterpene aldehyde and glucuronic acid roles in adjuvant function," Vaccine, 1995, vol. 13, No. 15, pp. 1403-1410.
Stolz et al., "Histological Quantification to Determine Lung Fungal Burden in Experimental Aspergillosis," Journal of Visualized Experiments, Mar. 2018, vol. 133, e57155, pp. 1-8.
Tutt et al., "Activation and preferential expansion of rat cytotoxic (CD8) T cells in vitro and in vivo with a bispecific (anti-TCR alpha/beta x anti-CD2) F(ab')2 antibody," The Journal of Immunology, 1995, vol. 155, pp. 2960-2971.
Wahl et al., "Improved Radioimaging and Tumor Localization with Monoclonal F(ab')2," The Journal of Nuclear Medicine, 1983, vol. 24, No. 4, pp. 316-325.
Wu et al., "High-resolution microPET imaging of carcinoembryonic antigen-positive xenografts by using a copper-64-labeled engineered antibody fragment," Proceedings of the National Academy of Sciences of the United States of America, Jul. 18, 2000, vol. 97, No. 15, pp. 8495-8500.
Zapata et al., "Engineering linear F(ab')2 fragments for efficient production in *Escherichia coli* and enhanced antiproliferative activity," Protein Engineering, 1995, vol. 8, No. 10, pp. 1057-1062.

FIG. 1

```
Pneumocystis Kex1 (Human)     DDDGKTVDGPSSLIVLRALINGVNNGRNGLGSIYVFASGNGGIYEDNCNFDGYANSVFTITIGGIDKHGKRLKYSEACSSQLAVTYAGGSA
Pneumocystis Kex1 (Macaque)   DDDGKTVDGPSPLVLRAFINGVNNGRNGLGSIYVFASGNGGIYDDNCNFDGYANSVFTITIGGIDKHGKRFAYSEACSSQLAVTYAGGSA
Aspergillus Kex               PDDGATMEGPGILIKRAFVNGVQNGRGGKGSIFVFAAGNGASFEDNCNFDGYTNSIYSITVGAIDREGNHPSYSESCSAQLVVAYSSGSG
Cryptococcus Kex              PDDGRSMEAPDGLILKAMVNGVQKGRDGKGSVFVFAAGNGGSDDQCNFDGYTNSIFSVTVGAVDRKGLHPYYSEMCAAMMVVAPSSGSG
Candida Kex                   TDNGKVLSEPDVIVKKAMIKGIQEGRDKKGAIYVFASGNGGRFGDSCNFDGYTNSIYSITVGAIDYKGLHPQYSEACSAVMVTYSSGSG
                              *:* :. *. :: .:*:::**.  *.:::.****:***.  *.:*******:**::::*::*. .*. .  *** *::..*: :.**..

Pan-fungal peptide 1          DDDGKTVDGPSPLVLRAFINGVNNGRNGLGSIYVFASGNGGIYEDNCNFDGYANSVFTITIGGIDKHGKRPKYSEACSSQLAVTYAGGSA
Pan-fungal peptide 2          PDDGKTMEGPDILVLRAFINGVQNGRDGKGSIYVFASGNGGFEDNCNFDGYTNSIYSITVGAIDRKGLHPSYSEACSAQLVVTYSSGSG
```

FIG. 2

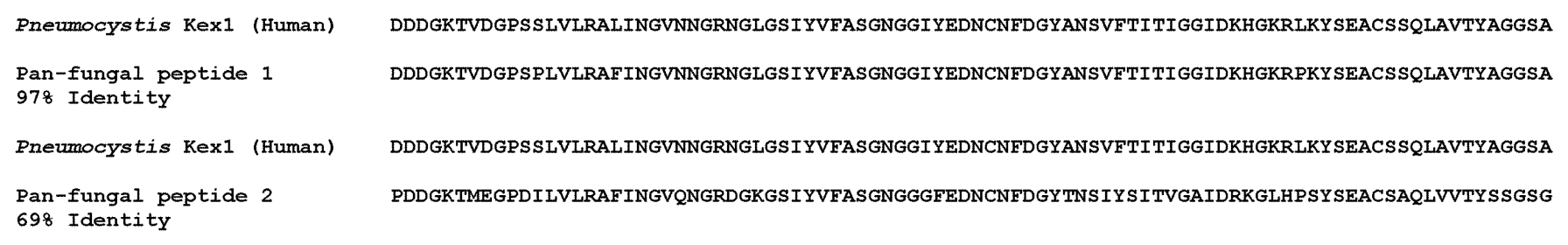

| | |
|---|---|
| *Pneumocystis* Kex1 (Human) | DDDGKTVDGPSSLVLRALINGVNNGRNGLGSIYVFASGNGGIYEDNCNFDGYANSVFTITIGGIDKHGKRLKYSEACSSQLAVTYAGGSA |
| Pan-fungal peptide 1<br>97% Identity | DDDGKTVDGPSPLVLRAFINGVNNGRNGLGSIYVFASGNGGIYEDNCNFDGYANSVFTITIGGIDKHGKRPKYSEACSSQLAVTYAGGSA |
| *Pneumocystis* Kex1 (Human) | DDDGKTVDGPSSLVLRALINGVNNGRNGLGSIYVFASGNGGIYEDNCNFDGYANSVFTITIGGIDKHGKRLKYSEACSSQLAVTYAGGSA |
| Pan-fungal peptide 2<br>69% Identity | PDDGKTMEGPDILVLRAFINGVQNGRDGKGSIYVFASGNGGGFEDNCNFDGYTNSIYSITVGAIDRKGLHPSYSEACSAQLVVTYSSGSG |

SEQUENCE LISTING

```
<160> NUMBER OF SEQ ID NOS: 11

<210> SEQ ID NO 1
<211> LENGTH: 90
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 1

Asp Asp Asp Gly Lys Thr Val Asp Gly Pro Ser Pro Leu Val Leu Arg
1               5                   10                  15

Ala Phe Ile Asn Gly Val Asn Asn Gly Arg Asn Gly Leu Gly Ser Ile
            20                  25                  30

Tyr Val Phe Ala Ser Gly Asn Gly Gly Ile Tyr Glu Asp Asn Cys Asn
        35                  40                  45

Phe Asp Gly Tyr Ala Asn Ser Val Phe Thr Ile Thr Ile Gly Gly Ile
    50                  55                  60

Asp Lys His Gly Lys Arg Pro Lys Tyr Ser Glu Ala Cys Ser Ser Gln
65                  70                  75                  80

Leu Ala Val Thr Tyr Ala Gly Gly Ser Ala
                85                  90


<210> SEQ ID NO 2
<211> LENGTH: 90
<212> TYPE: PRT
<213> ORGANISM: Artificial Sequence
<220> FEATURE:
<223> OTHER INFORMATION: Description of Artificial Sequence: Synthetic
      polypeptide
```

<400> SEQUENCE: 2

Pro Asp Asp Gly Lys Thr Met Glu Gly Pro Asp Ile Leu Val Leu Arg
1 5 10 15

Ala Phe Ile Asn Gly Val Gln Asn Gly Arg Asp Gly Lys Gly Ser Ile
20 25 30

Tyr Val Phe Ala Ser Gly Asn Gly Gly Gly Phe Glu Asp Asn Cys Asn
35 40 45

Phe Asp Gly Tyr Thr Asn Ser Ile Tyr Ser Ile Thr Val Gly Ala Ile
50 55 60

Asp Arg Lys Gly Leu His Pro Ser Tyr Ser Glu Ala Cys Ser Ala Gln
65 70 75 80

Leu Val Val Thr Tyr Ser Ser Gly Ser Gly
85 90

<210> SEQ ID NO 3
<211> LENGTH: 90
<212> TYPE: PRT
<213> ORGANISM: Pneumocystis carinii

<400> SEQUENCE: 3

Asp Asp Asp Gly Lys Thr Val Asp Gly Pro Ser Pro Leu Val Leu Arg
1 5 10 15

Ala Phe Ile Asn Gly Val Asn Asn Gly Arg Asn Gly Leu Gly Ser Ile
20 25 30

Tyr Val Phe Ala Ser Gly Asn Gly Gly Ile Tyr Asp Asp Asn Cys Asn
35 40 45

Phe Asp Gly Tyr Ala Asn Ser Val Phe Thr Ile Thr Ile Gly Gly Ile
50 55 60

Asp Lys His Gly Lys Arg Phe Ala Tyr Ser Glu Ala Cys Ser Ser Gln
65 70 75 80

Leu Ala Val Thr Tyr Ala Gly Gly Ser Ala
85 90

<210> SEQ ID NO 4
<211> LENGTH: 270
<212> TYPE: DNA
<213> ORGANISM: Pneumocystis carinii

<400> SEQUENCE: 4
gatgacgatg gaaaaaccgt tgatgggcct tctcctcttg ttcttagagc atttattaat 60
ggagtaaata atgggaggaa tgggttgggt tctatctatg tttttgcatc aggaaatggc 120
ggaatatacg atgacaactg taattttgat ggatatgcaa atagcgtgtt tactattact 180
attggtggta tagataaaca cggaaagcgc tttgcatatt ctgaagcgtg ttcttctcag 240
ttagctgtta catatgcagg cggaagtgca 270

<210> SEQ ID NO 5
<211> LENGTH: 844
<212> TYPE: PRT
<213> ORGANISM: Aspergillus fumigatus

<400> SEQUENCE: 5

Met Arg Phe Leu Gly Ser Ile Ala Leu Val Leu Ser Ser Ile Ser Val
1 5 10 15

Ala Ser Ala Asn Val Arg Ser Arg Ser Tyr Asp Thr His Glu Phe Phe
20 25 30

Ala Leu His Leu Asp Asp Ser Ala Ser Pro Ser His Val Ala Gln Leu

```
        35                  40                  45

Leu Gly Ala Arg His Glu Gly Gln Ile Gly Glu Leu Ala Asn His His
    50                  55                  60

Thr Phe Ser Ile Pro Arg Glu Arg Ser Ser Asp Leu Asp Ala Leu Leu
65                  70                  75                  80

Glu Arg Ala Arg Ala Ala Arg Lys Ile Arg Arg Arg Ala Arg Asp Asp
                85                  90                  95

Ala Thr Ser Gln Glu Gln His Asn Asp Ala Leu Gly Gly Ile Leu Trp
            100                 105                 110

Ser Gln Lys Leu Ala Pro Lys Lys Arg Leu Val Lys Arg Val Pro Pro
        115                 120                 125

Pro Glu Arg Leu Ala Arg Thr Phe Ala Thr Gly Lys Glu Asp Pro Val
    130                 135                 140

Ala Ala Gln Ser Gln Lys Arg Ile Ala Ser Thr Leu Gly Ile Thr Asp
145                 150                 155                 160

Pro Ile Phe Asn Gly Gln Trp His Leu Phe Asn Thr Val Gln Leu Gly
                165                 170                 175

His Asp Leu Asn Val Thr Gly Val Trp Met Glu Gly Ile Thr Gly Lys
            180                 185                 190

Gly Val Thr Thr Ala Val Val Asp Asp Gly Leu Asp Met Tyr Ser Asn
        195                 200                 205

Asp Leu Lys Pro Asn Tyr Phe Pro Glu Gly Ser Tyr Asp Phe Asn Asp
    210                 215                 220

His Thr Pro Glu Pro Arg Pro Arg Leu Ser Asp Asp Lys His Gly Thr
225                 230                 235                 240

Arg Cys Ala Gly Glu Ile Ala Ala Ala Arg Asn Asp Val Cys Gly Val
                245                 250                 255

Gly Val Ala Tyr Asp Ser Arg Val Ala Gly Val Arg Ile Leu Ser Lys
            260                 265                 270

Ala Ile Asp Asp Ala Asp Glu Ala Thr Ala Ile Asn Phe Ala Tyr Gln
        275                 280                 285

Glu Asn Asp Ile Phe Ser Cys Ser Trp Gly Pro Pro Asp Asp Gly Ala
    290                 295                 300

Thr Met Glu Gly Pro Gly Ile Leu Ile Lys Arg Ala Phe Val Asn Gly
305                 310                 315                 320

Val Gln Asn Gly Arg Gly Gly Lys Gly Ser Ile Phe Val Phe Ala Ala
                325                 330                 335

Gly Asn Gly Ala Ser Phe Glu Asp Asn Cys Asn Phe Asp Gly Tyr Thr
            340                 345                 350

Asn Ser Ile Tyr Ser Ile Thr Val Gly Ala Ile Asp Arg Glu Gly Asn
        355                 360                 365

His Pro Ser Tyr Ser Glu Ser Cys Ser Ala Gln Leu Val Val Ala Tyr
    370                 375                 380

Ser Ser Gly Ser Gly Asp Ala Ile His Thr Thr Asp Val Gly Thr Asp
385                 390                 395                 400

Lys Cys Tyr Ser Phe His Gly Gly Thr Ser Ala Ala Gly Pro Leu Ala
                405                 410                 415

Ala Gly Thr Val Ala Leu Ala Leu Ser Ala Arg Pro Glu Leu Thr Trp
            420                 425                 430

Arg Asp Ala Gln Tyr Leu Met Val Glu Thr Ala Val Pro Ile His Glu
        435                 440                 445

Asp Asp Gly Ser Trp Gln Val Thr Lys Ala Gly Arg Lys Phe Ser His
    450                 455                 460
```

```
Asp Trp Gly Tyr Gly Lys Val Asp Ala Tyr Ala Leu Val Gln Lys Ala
465                 470                 475                 480

Lys Thr Trp Glu Leu Val Lys Pro Gln Ala Trp Phe His Ser Pro Trp
                485                 490                 495

Leu Arg Val Gln His Lys Val Pro Gln Gly Asp Gln Gly Leu Ala Ser
            500                 505                 510

Ser Tyr Glu Val Thr Glu Gln Met Met Lys Asn Ala Asn Ile Ala Arg
        515                 520                 525

Leu Glu His Val Thr Val Thr Met Asn Val Asn His Thr Arg Arg Gly
    530                 535                 540

Asp Leu Ser Val Glu Leu Arg Ser Pro Glu Gly Ile Val Ser His Leu
545                 550                 555                 560

Ser Thr Thr Arg Lys Ser Asp Asn Glu Lys Ala Gly Tyr Val Asp Trp
                565                 570                 575

Thr Phe Met Thr Val Ala His Trp Gly Glu Ser Gly Val Gly Arg Trp
            580                 585                 590

Thr Val Ile Val Lys Asp Thr Asn Val Asn Glu Phe Thr Gly Glu Phe
        595                 600                 605

Ile Asp Trp Arg Leu Asn Leu Trp Gly Glu Ala Ile Asp Gly Ala Asn
    610                 615                 620

Gln Lys Pro His Pro Phe Pro Asp Glu His Asp Asp Asp His Ser Ile
625                 630                 635                 640

Glu Asp Ala Ile Val Ala Thr Thr Ser Val Glu Thr Gly Pro Thr Lys
                645                 650                 655

Thr Gly Val Pro Gly Ser Thr Asp Asp Thr Ile Asn Arg Pro Val Asn
            660                 665                 670

Ala Lys Pro Val Glu Thr Gln Thr Pro Ser Pro Ala Glu Thr Thr Ala
        675                 680                 685

Thr Lys Leu Ala Pro Pro Ala Glu Thr Arg Pro Ala Ala Thr Ala Thr
    690                 695                 700

Ser Ser Pro Thr Pro Pro Ala Ala Ser Asp Ser Phe Leu Pro Ser Phe
705                 710                 715                 720

Met Pro Thr Phe Gly Ala Ser Lys Arg Thr Gln Ile Trp Ile Tyr Ala
                725                 730                 735

Ala Ile Gly Ser Ile Ile Val Phe Cys Ile Gly Leu Gly Ile Tyr Phe
            740                 745                 750

Gln Val Gln Arg Arg Lys Arg Ile Leu Asn Asn Pro Arg Asp Asp Tyr
        755                 760                 765

Asp Phe Glu Met Ile Glu Asp Glu Asn Ala Leu His Gly Gly Asn Gly
    770                 775                 780

Arg Ser Gly Arg Thr Gln Arg Arg Gly Gly Glu Leu Tyr Asn Ala Phe
785                 790                 795                 800

Ala Gly Glu Ser Asp Glu Glu Glu Pro Leu Phe Ser Asp Glu Asp Asp
                805                 810                 815

Glu Pro Tyr Arg Asp Arg Ala Pro Ser Glu Asp Arg Leu Arg Asp Thr
            820                 825                 830

Ser Ser Asp Asp Arg Ser Leu Arg His Gly Asp His
        835                 840
```

<210> SEQ ID NO 6
<211> LENGTH: 924
<212> TYPE: PRT
<213> ORGANISM: Candida albicans

<400> SEQUENCE: 6

```
Met Leu Pro Ile Lys Leu Leu Ile Phe Ile Leu Gly Tyr Leu Leu Ser
1               5                   10                  15

Pro Thr Leu Gln Gln Tyr Gln Gln Ile Pro Pro Arg Asp Tyr Glu Asn
            20                  25                  30

Lys Asn Tyr Phe Leu Val Glu Leu Asn Thr Thr Asn Ser Gln Lys Pro
        35                  40                  45

Leu Ile Asp Phe Ile Ser His Tyr Arg Gly His Tyr Asn Phe Glu His
    50                  55                  60

Gln Leu Ser Ser Leu Asp Asn His Tyr Val Phe Ser Ile Asp Lys Ser
65                  70                  75                  80

His Pro His Asn Ser Phe Leu Gly Asn His Asn Ser Asn Glu Tyr Asn
                85                  90                  95

Leu Met Lys Arg Gln Leu Gly His Glu Gln Asp Tyr Asp Glu Leu Ile
            100                 105                 110

Ser His Val Glu Ser Ile His Leu Leu Pro Met Lys Lys Leu Ser Lys
        115                 120                 125

Arg Ile Pro Val Pro Ile Glu Met Glu Asp Val Val Phe Asp Asn Arg
    130                 135                 140

Asp Asp Thr Gly Ser Asp Asn His Glu Ala Thr Asp Glu Ala His Gln
145                 150                 155                 160

Lys Leu Ile Glu Ile Ala Lys Lys Leu Asp Ile His Asp Pro Glu Phe
                165                 170                 175

Thr Thr Gln Trp His Leu Ile Asn Leu Lys Tyr Pro Gly His Asp Val
            180                 185                 190

Asn Val Thr Gly Leu Trp Leu Glu Asp Ile Leu Gly Gln Gly Ile Val
        195                 200                 205

Thr Ala Leu Val Asp Asp Gly Val Asp Ala Glu Ser Asp Asp Ile Lys
    210                 215                 220

Gln Asn Phe Asn Ser Glu Gly Ser Trp Asp Phe Asn Asn Lys Gly Lys
225                 230                 235                 240

Ser Pro Leu Pro Arg Leu Phe Asp Asp Tyr His Gly Thr Arg Cys Ala
                245                 250                 255

Gly Glu Ile Ala Ala Val Lys Asn Asp Val Cys Gly Ile Gly Val Ala
            260                 265                 270

Trp Lys Ser Gln Val Ser Gly Ile Arg Ile Leu Ser Gly Pro Ile Thr
        275                 280                 285

Ser Ser Asp Glu Ala Glu Ala Met Val Tyr Gly Leu Asp Thr Asn Asp
    290                 295                 300

Ile Tyr Ser Cys Ser Trp Gly Pro Thr Asp Asn Gly Lys Val Leu Ser
305                 310                 315                 320

Glu Pro Asp Val Ile Val Lys Lys Ala Met Ile Lys Gly Ile Gln Glu
                325                 330                 335

Gly Arg Asp Lys Lys Gly Ala Ile Tyr Val Phe Ala Ser Gly Asn Gly
            340                 345                 350

Gly Arg Phe Gly Asp Ser Cys Asn Phe Asp Gly Tyr Thr Asn Ser Ile
        355                 360                 365

Tyr Ser Ile Thr Val Gly Ala Ile Asp Tyr Lys Gly Leu His Pro Gln
    370                 375                 380

Tyr Ser Glu Ala Cys Ser Ala Val Met Val Val Thr Tyr Ser Ser Gly
385                 390                 395                 400

Ser Gly Glu His Ile His Thr Thr Asp Ile Lys Lys Lys Cys Ser Ala
                405                 410                 415
```

-continued

```
Thr His Gly Gly Thr Ser Ala Ala Ala Pro Leu Ala Ser Gly Ile Tyr
            420                 425                 430

Ser Leu Ile Leu Ser Ala Asn Pro Asn Leu Thr Trp Arg Asp Val Gln
        435                 440                 445

Tyr Ile Ser Val Leu Ser Ala Thr Pro Ile Asn Glu Glu Asp Gly Asn
    450                 455                 460

Tyr Gln Thr Thr Ala Leu Asn Arg Lys Tyr Ser His Lys Tyr Gly Tyr
465                 470                 475                 480

Gly Lys Thr Asp Ala Tyr Lys Met Val His Phe Ala Lys Thr Trp Val
                485                 490                 495

Asn Val Lys Pro Gln Ala Trp Tyr Tyr Ser Asp Ile Ile Glu Val Asn
            500                 505                 510

Gln Thr Ile Thr Thr Thr Pro Glu Gln Lys Ala Pro Ser Lys Arg Asp
        515                 520                 525

Ser Pro Gln Lys Ile Ile His Ser Ser Val Asn Val Ser Glu Lys Asp
    530                 535                 540

Leu Lys Ile Met Asn Val Glu Arg Val Glu His Ile Thr Val Lys Val
545                 550                 555                 560

Asn Ile Asp Ser Thr Tyr Arg Gly Arg Val Gly Met Arg Ile Ile Ser
                565                 570                 575

Pro Thr Gly Val Ile Ser Asp Leu Ala Thr Phe Arg Val Asn Asp Ala
            580                 585                 590

Ser Thr Arg Gly Phe Gln Asn Trp Thr Phe Met Ser Val Ala His Trp
        595                 600                 605

Gly Glu Thr Gly Ile Gly Glu Trp Lys Val Glu Val Phe Val Asp Asp
    610                 615                 620

Ser Lys Gly Asp Gln Val Glu Ile Asn Phe Lys Asp Trp Gln Phe Arg
625                 630                 635                 640

Ile Phe Gly Glu Ser Ile Asp Gly Asp Lys Ala Glu Val Tyr Asp Ile
                645                 650                 655

Thr Lys Asp Tyr Ala Ala Ile Arg Arg Glu Leu Leu Glu Lys Glu Lys
            660                 665                 670

Gln Asn Ser Lys Ser Thr Thr Thr Thr Ser Ser Thr Thr Thr Ala Thr
        675                 680                 685

Thr Thr Ser Gly Gly Glu Gly Asp Gln Lys Thr Thr Thr Ser Ala Glu
    690                 695                 700

Asn Lys Glu Ser Thr Thr Lys Val Asp Asn Ser Ala Ser Ile Thr Thr
705                 710                 715                 720

Ser Gln Thr Ala Ser Leu Thr Ser Ser Asn Glu Gln His Gln Pro Thr
                725                 730                 735

Glu Ser Asn Ser Asp Ser Asp Ser Asp Thr Asp Asp Glu Asn Lys Gln
            740                 745                 750

Glu Gly Glu Glu Asp Asn Asp Asn Asp Asn Asp Asn Gly Asn Lys Lys
        755                 760                 765

Ala Asn Ser Asp Asn Thr Gly Phe Tyr Leu Met Ser Ile Ala Val Val
    770                 775                 780

Gly Phe Ile Ala Val Leu Leu Val Met Lys Phe His Lys Thr Pro Gly
785                 790                 795                 800

Ser Gly Arg Arg Arg Arg Arg Arg Asp Gly Tyr Glu Phe Asp Ile Ile
                805                 810                 815

Pro Gly Glu Asp Tyr Ser Asp Ser Asp Asp Asp Glu Asp Asp Ser Asp
            820                 825                 830
```

```
Thr Arg Arg Ala Asp Asp Asp Ser Phe Asp Leu Gly His Arg Asn Asp
        835                 840                 845

Gln Arg Val Val Ser Ala Ser Gln Gln Gln Arg Gln Tyr Asp Arg Gln
    850                 855                 860

Gln Asp Glu Ala Arg Asp Arg Leu Phe Asp Asp Phe Asn Ala Glu Ser
865                 870                 875                 880

Leu Pro Asp Tyr Glu Asn Asp Met Phe Lys Ile Gly Asp Glu Glu Glu
                885                 890                 895

Glu Glu Glu Glu Glu Glu Glu Gly Gln Gln Ser Ala Lys Ala Pro Ser
            900                 905                 910

Asn Ser Glu Gly Asn Ser Gly Thr Ser Thr Lys Lys
        915                 920
```

<210> SEQ ID NO 7
<211> LENGTH: 917
<212> TYPE: PRT
<213> ORGANISM: Cryptococcus neoformans

<400> SEQUENCE: 7

```
Met Arg Thr Leu Leu Ser Leu Trp Gly Ile Leu Leu Ala Leu Ile Val
1               5                   10                  15

Pro Pro Ser Leu Ala Leu Gln Arg Pro Gln Pro Arg Ser Tyr Asp Thr
            20                  25                  30

His Ala Tyr Tyr Ala Leu Glu Leu Asp Pro Ser Ile Ser Pro Ala Ala
        35                  40                  45

Ala Leu Gln Leu Ser Lys Ser Leu Gly Val Glu Leu Val Glu Arg Ile
    50                  55                  60

Gly Glu Leu Asp Gly His Trp Leu Val Arg Thr Glu Gly Trp Thr Pro
65                  70                  75                  80

Glu His Ala Ser Ile Thr Lys Arg Ser Val Ser His Asp Pro Ile Leu
                85                  90                  95

Lys Arg Trp Glu Ala Leu Pro Ser Ser Leu Gly Lys Lys Ser Leu Thr
            100                 105                 110

Pro Leu Ser Leu Lys Gln Arg Ala Lys Arg His Lys Ser Tyr Ser Pro
        115                 120                 125

Arg Ser Arg His Ser Arg Asp Asp Arg Thr Glu Leu Leu Tyr Ala Gln
    130                 135                 140

Asn Glu Leu His Leu Ala Asp Pro Met Leu Asp Gln Gln Trp His Leu
145                 150                 155                 160

Ile Asn Thr Gln Met Lys Asp Ile Glu Leu Asn Val Thr Gly Leu Trp
                165                 170                 175

Gly Arg Gly Ile Thr Gly Glu Gly Val His Val Val Ile Ile Asp Asp
            180                 185                 190

Gly Leu Asp Val Glu Ser Lys Asp Leu Lys Asp Asn Phe Phe Ala Glu
        195                 200                 205

Gly Ser Tyr Asp Phe Asn Asp His Thr Glu Leu Pro Ile Pro Arg Leu
    210                 215                 220

Lys Asp Asp Gln His Gly Thr Arg Cys Ala Gly Glu Ile Ala Ala Val
225                 230                 235                 240

Pro Asn Asp Val Cys Gly Val Gly Val Ala Tyr Asp Ser Lys Ile Ala
                245                 250                 255

Gly Val Arg Ile Leu Ser Ala Pro Ile Ser Asp Ala Asp Glu Ala Ala
            260                 265                 270

Ala Leu Asn Tyr Ala Tyr Gln Leu Asn Asp Ile Tyr Ser Cys Ser Trp
        275                 280                 285
```

```
Gly Pro Pro Asp Asp Gly Arg Ser Met Glu Ala Pro Asp Gly Leu Ile
    290                 295                 300

Leu Lys Ala Met Val Asn Gly Val Gln Lys Gly Arg Asp Gly Lys Gly
305                 310                 315                 320

Ser Val Phe Val Phe Ala Ala Gly Asn Gly Gly Gly Ser Asp Asp Gln
                325                 330                 335

Cys Asn Phe Asp Gly Tyr Thr Asn Ser Ile Phe Ser Val Thr Val Gly
            340                 345                 350

Ala Val Asp Arg Lys Gly Leu His Pro Tyr Tyr Ser Glu Met Cys Ala
        355                 360                 365

Ala Met Met Val Val Ala Pro Ser Ser Gly Ser Gly Asp His Ile His
    370                 375                 380

Thr Thr Asp Val Gly Lys Asp Lys Cys Ser His Ser His Gly Gly Thr
385                 390                 395                 400

Ser Ala Ala Ala Pro Leu Ala Val Gly Val Phe Ala Leu Ala Leu Ser
                405                 410                 415

Val Arg Pro Asp Leu Thr Trp Arg Asp Ile Gln His Leu Ala Val Arg
            420                 425                 430

His Ala Val Phe Phe Asn Pro Asp Asp Pro Ala Trp Glu Leu Thr Ala
        435                 440                 445

Ala Gly Arg His Phe Ser Tyr Lys Tyr Gly Tyr Gly Lys Leu Asp Ala
    450                 455                 460

Gly Leu Phe Val Glu Ala Ala Glu Lys Trp Gln Leu Val Lys Pro Gln
465                 470                 475                 480

Thr Trp Tyr Asp Ser Pro Ser Val Tyr Leu Pro Thr Thr Ser Pro Ala
                485                 490                 495

Asp Val Thr Arg Arg Gln Asp Glu Ala Ala Asp Gly Pro Thr Ser Ser
            500                 505                 510

Asp Glu Glu Thr Ser Asn Pro Pro Pro Val Val Glu Pro Ser Gly Ser
        515                 520                 525

Phe Ile Thr Glu Asp Gly Val Ile Ser Thr Tyr Glu Val Thr Gln Ser
    530                 535                 540

Met Leu Phe Asp Ala Asn Phe Glu Arg Leu Glu His Val Thr Val Arg
545                 550                 555                 560

Val Trp Ile Asp His Gln Arg Arg Gly Asp Val Glu Val Glu Leu Thr
                565                 570                 575

Ser Pro Asn Gly Val Val Ser Val Leu Cys Arg Gln Arg Arg Phe Asp
            580                 585                 590

Asn Ala Asp Ser Gly Phe Pro Gly Trp Lys Phe Met Ser Leu Lys His
        595                 600                 605

Trp Asp Glu Asn Pro Val Gly Thr Trp Thr Ile Lys Val Lys Asp Gln
    610                 615                 620

Val Asn Pro Asp Lys Thr Gly Arg Phe Val Ala Trp Ser Leu Gln Leu
625                 630                 635                 640

Trp Gly Glu Ser Val Asp Pro Ala Leu Ala Lys Leu Trp Ala Pro Ala
                645                 650                 655

Glu Glu Gly Gln Pro Asp Glu Glu Gln Thr Gly Ser Asn Pro Ser Thr
            660                 665                 670

Thr Val Ser Gln Lys Pro Lys Pro Thr Ala Leu Leu Pro Gly Asp His
        675                 680                 685

Gly Glu Ala Ser Gly Glu Ala Thr Gln Pro Gly Leu Gly Ser Ala Thr
    690                 695                 700
```

```
Ala His Pro Gln Pro Thr Ser Thr Thr Gly Asp Ala Gly Asn Val Ala
705                 710                 715                 720

Glu Pro Thr Gly Pro Thr Asp Ala Asp Ala Asp Glu Gly Phe Phe Ser
                725                 730                 735

Gly Ile Ser Asn Leu Ala Ser Ser Ser Thr Trp Leu Ala Gly Ala Gly
            740                 745                 750

Ala Ile Ile Ile Leu Ser Gly Ala Ala Ile Gly Ala Phe Phe Phe Ile
        755                 760                 765

Arg Ala Arg Arg Gln Lys Arg Asn Leu Phe Gly Leu Ser Asn Asn Gly
    770                 775                 780

Gln Gly Ala Arg Gly Ala Tyr Glu Pro Val Asp Asp Val Gln Met Ser
785                 790                 795                 800

Leu Leu Glu Arg Gly Arg Arg Lys Phe Gly Lys Ser Lys Ser Glu Ser
                805                 810                 815

Gln Gly Thr Lys Asp Leu Tyr Asp Ala Phe Gly Asp Gly Pro Ser Asp
            820                 825                 830

Glu Glu Glu Glu Asp Leu Asp Glu Arg Thr Ala Leu Arg Tyr His Asp
        835                 840                 845

Gly Phe Leu Glu Asp Asp Glu Pro Asn Glu Val Gly Pro Lys Thr Glu
    850                 855                 860

Tyr Lys Asp Glu Pro Glu Ser Glu Pro Glu Thr Phe Lys Asp Gly Glu
865                 870                 875                 880

Glu Thr Val Gly Thr Lys Asp Lys Gly Lys Gly Lys Gly Pro Ser Glu
                885                 890                 895

Gly Glu Ser Gly Ser Gly Ser Ser Ser Ser Trp Gln Asp Ala Ala Asp
            900                 905                 910

Glu Glu Ala Arg Val
        915


<210> SEQ ID NO 8
<211> LENGTH: 90
<212> TYPE: PRT
<213> ORGANISM: Pneumocystis sp.

<400> SEQUENCE: 8

Asp Asp Asp Gly Lys Thr Val Asp Gly Pro Ser Ser Leu Val Leu Arg
1               5                   10                  15

Ala Leu Ile Asn Gly Val Asn Asn Gly Arg Asn Gly Leu Gly Ser Ile
            20                  25                  30

Tyr Val Phe Ala Ser Gly Asn Gly Gly Ile Tyr Glu Asp Asn Cys Asn
        35                  40                  45

Phe Asp Gly Tyr Ala Asn Ser Val Phe Thr Ile Thr Ile Gly Gly Ile
    50                  55                  60

Asp Lys His Gly Lys Arg Leu Lys Tyr Ser Glu Ala Cys Ser Ser Gln
65                  70                  75                  80

Leu Ala Val Thr Tyr Ala Gly Gly Ser Ala
                85                  90


<210> SEQ ID NO 9
<211> LENGTH: 90
<212> TYPE: PRT
<213> ORGANISM: Aspergillus fumigatus

<400> SEQUENCE: 9

Pro Asp Asp Gly Ala Thr Met Glu Gly Pro Gly Ile Leu Ile Lys Arg
1               5                   10                  15
```

-continued

```
Ala Phe Val Asn Gly Val Gln Asn Gly Arg Gly Gly Lys Gly Ser Ile
            20                  25                  30

Phe Val Phe Ala Ala Gly Asn Gly Ala Ser Phe Glu Asp Asn Cys Asn
        35                  40                  45

Phe Asp Gly Tyr Thr Asn Ser Ile Tyr Ser Ile Thr Val Gly Ala Ile
    50                  55                  60

Asp Arg Glu Gly Asn His Pro Ser Tyr Ser Glu Ser Cys Ser Ala Gln
65                  70                  75                  80

Leu Val Val Ala Tyr Ser Ser Gly Ser Gly
                85                  90


<210> SEQ ID NO 10
<211> LENGTH: 90
<212> TYPE: PRT
<213> ORGANISM: Cryptococcus neoformans

<400> SEQUENCE: 10

Pro Asp Asp Gly Arg Ser Met Glu Ala Pro Asp Gly Leu Ile Leu Lys
1               5                   10                  15

Ala Met Val Asn Gly Val Gln Lys Gly Arg Asp Gly Lys Gly Ser Val
            20                  25                  30

Phe Val Phe Ala Ala Gly Asn Gly Gly Gly Ser Asp Asp Gln Cys Asn
        35                  40                  45

Phe Asp Gly Tyr Thr Asn Ser Ile Phe Ser Val Thr Val Gly Ala Val
    50                  55                  60

Asp Arg Lys Gly Leu His Pro Tyr Tyr Ser Glu Met Cys Ala Ala Met
65                  70                  75                  80

Met Val Val Ala Pro Ser Ser Gly Ser Gly
                85                  90


<210> SEQ ID NO 11
<211> LENGTH: 90
<212> TYPE: PRT
<213> ORGANISM: Candida albicans

<400> SEQUENCE: 11

Thr Asp Asn Gly Lys Val Leu Ser Glu Pro Asp Val Ile Val Lys Lys
1               5                   10                  15

Ala Met Ile Lys Gly Ile Gln Glu Gly Arg Asp Lys Lys Gly Ala Ile
            20                  25                  30

Tyr Val Phe Ala Ser Gly Asn Gly Gly Arg Phe Gly Asp Ser Cys Asn
        35                  40                  45

Phe Asp Gly Tyr Thr Asn Ser Ile Tyr Ser Ile Thr Val Gly Ala Ile
    50                  55                  60

Asp Tyr Lys Gly Leu His Pro Gln Tyr Ser Glu Ala Cys Ser Ala Val
65                  70                  75                  80

Met Val Val Thr Tyr Ser Ser Gly Ser Gly
                85                  90
```

TREATMENT AND DETECTION OF INFECTION AND DISEASE ASSOCIATED WITH DIFFERENT FUNGAL PATHOGENS

CROSS-REFERENCE TO RELATED APPLICATION

This application is the U.S. national phase application, pursuant to 35 U.S.C. § 371, of PCT International Application No. PCT/US2020/014805, filed Jan. 23, 2020, which claims priority to and benefit of U.S. Provisional Application No. 62/796,120, filed on Jan. 24, 2019, the entire contents of each of which are hereby incorporated by reference herein.

BACKGROUND

Pathogenic fungal organisms are universal in the environment and can cause global health threats. Pathogenic fungi are typically not harmful to individuals with healthy and normally functional immune systems even after exposure, for example, by inhalation. However, individuals with weakened or compromised immune systems, or those having pre-existing medical conditions, such as those with lung diseases or viral infections, such as HIV/AIDS infection, are at a higher risk of developing serious health problems and adverse reactions following exposure to and infection by fungal pathogens.

Because of the grave repercussions of infection by fungal organisms in individuals in poor medical health and in those with weakened immune systems, there is an ongoing and urgent need for methods and compositions for treating or preventing infection and associated diseases caused by these pathogens. Cost-effective and efficient methods of treatment of and protection from fungal pathogens are required, particularly in less affluent parts of the world. Effective methods and approaches for treating or preventing infection by fungal pathogens for which suitable therapies are currently nonexistent or inadequate are particularly desirable to alleviate fungal pathogens that pose ever-present threats to at-risk individuals worldwide.

SUMMARY

Methods for treating or preventing infection (e.g., opportunistic infection) by fungal pathogens, as well as treating or preventing pulmonary disease and poor pulmonary function associated with infection by fungal pathogens are provided and described herein.

In an aspect, an immunogenic peptide or a polynucleotide encoding an immunogenic peptide having at least about 95% or greater amino acid sequence identity to

```
(Pan-fungal peptide 2)
                                                SEQ ID NO: 2
PDDGKTMEGPDILVLRAFINGVQNGRDGKGSIYVFASGNGGGFEDNCNFD

GYTNSIYSITVGAIDRKGLHPSYSEACSAQLVVTYSSGSG;
or

(Pan-fungal peptide 1)
                                                SEQ ID NO: 1
DDDGKTVDGPSPLVLRAFINGVNNGRNGLGSIYVFASGNGGIYEDNCNFD

GYANSVFTITIGGIDKHGKRPKYSEACSSQLAVTYAGGSA,
```

or fragments thereof, is provided.

In another aspect is provided an immunogenic peptide or a polynucleotide encoding an immunogenic peptide comprising or consisting of

```
(Pan-fungal peptide 2)
                                                SEQ ID NO: 2
PDDGKTMEGPDILVLRAFINGVQNGRDGKGSIYVFASGNGGGFEDNCNFD

GYTNSIYSITVGAIDRKGLHPSYSEACSAQLVVTYSSGSG;
or

(Pan-fungal peptide 1)
                                                SEQ ID NO: 1
DDDGKTVDGPSPLVLRAFINGVNNGRNGLGSIYVFASGNGGIYEDNCNFD

GYANSVFTITIGGIDKHGKRPKYSEACSSQLAVTYAGGSA,
```

or fragments thereof.

In some embodiments, the immunogenic composition comprises an effective amount of an immunogenic peptide or a polynucleotide encoding an immunogenic peptide described supra and a pharmaceutically acceptable excipient. In some embodiments, the immunogenic composition further comprises an adjuvant. In an embodiment, the adjuvant is alpha-galactosylceramide (αGC). In an embodiment, the adjuvant is alum.

In another aspect, a method of eliciting an immune response in a subject is provided, in which the method comprises administering to the subject a peptide, polynucleotide, or immunogenic composition as described supra.

In another aspect, a method is provided herein for treating or protecting a subject against a fungal infection, the method comprising administering to the subject an immunogenic peptide, polynucleotide, or composition described supra.

Also provided herein are methods of treating or protecting a subject against a fungal infection, the methods comprising administering to the subject an immunogenic peptide, polynucleotide, or composition of any previous claim, an isolated antiserum comprising an antibody that specifically binds an immunogenic peptide of any previous claim or an antigen-binding fragment thereof, or an isolated or purified antibody or an antigen-binding fragment that specifically binds an immunogenic peptide of any previous claim in an amount effective to treat or protect a subject against a fungal infection. In some embodiments, the antibody is a monoclonal antibody, polyclonal antibody, or an antigen-binding fragment thereof.

In some embodiments of the methods disclosed herein, the fungal infection is associated with *Aspergillus, Candida*, and/or *Cryptococcus*. In some embodiments, the methods treat pulmonary disease, pulmonary dysfunction, or a symptom thereof. In some embodiments, the pulmonary disease or pulmonary dysfunction is *Pneumocystis* pneumonia. In some embodiments, the pulmonary disease or pulmonary dysfunction is aspergillosis.

In another aspect, method of treating or protecting a subject against fungal infection is provided, in which the method involves administering to the subject an immunogenic composition comprising SEQ ID NO: 2 or fragment thereof or a polynucleotide encoding SEQ ID NO: 2 or a fragment thereof in an amount effective to induce an immune response against one or more of *Pneumocystis, Aspergillus, Candida*, or *Cryptococcus* fungal pathogens.

In another aspect, a method of treating or protecting a subject against fungal infection is provided, in which the method comprises administering to the subject an effective amount of an antibody or an antigen-binding fragment thereof that specifically binds SEQ ID NO: 2. In some embodiments, the antibody or fragment thereof is present in or isolated from an antiserum derived from a donor subject. In some embodiments, the antibody or an antigen-binding fragment thereof specifically binds a Kex peptide of *Pneumocystis, Aspergillus, Candida*, or *Cryptococcus*.

In another aspect, a method is provided for eliciting an immune response in a subject, the method comprising administering to the subject a wildtype Kex peptide, or a polynucleotide encoding the same, and alpha-galactosylceramide (α-GC).

In yet another aspect, a method of treating or protecting a subject against a fungal infection is provided, the method comprising administering to the subject a wildtype Kex peptide, or a polynucleotide encoding the same, and alpha-galactosylceramide (α-GC). In some embodiments of this method, the fungal infection is associated with *Aspergillus, Candida*, and/or *Cryptococcus*. In some embodiments of this method or the method for eliciting an immune response in a subject comprising administering to the subject a wildtype Kex peptide or a polynucleotide encoding the same and α-GC, the method treats pulmonary disease, pulmonary dysfunction, or a symptom thereof.

Another aspect provides a method of treating or protecting a subject against fungal infection, in which the method comprises administering to the subject an immunogenic composition comprising a wildtype Kex peptide or a fragment thereof, or a polynucleotide encoding the same, and alpha-galactosylceramide (α-GC) in an amount effective to induce an immune response against one or more of *Pneumocystis, Aspergillus, Candida*, or *Cryptococcus* fungal pathogens.

In yet another aspect, a method of treating or protecting a subject against infection by *Aspergillus* or *Pneumocystis* fungal pathogens is provided, in which the method involves administering to the subject an immunogenic composition comprising a Kex peptide of SEQ ID NO: 2 (Pan-fungal peptide 2), or a fragment thereof, or a polynucleotide encoding the Pan-fungal peptide 2 peptide or the fragment thereof, in an amount effective to induce an immune response against *Pneumocystis* and *Aspergillus* fungal pathogens. In an embodiment of the method, the subject is also administered an adjuvant. In an embodiment, the adjuvant is alpha-galactosylceramide (α-GC). In another embodiment, the adjuvant is alum. In embodiments of the method, the induced immune response treats or protects the subject against pulmonary disease or pulmonary dysfunction and/or the symptoms thereof, or against *Aspergillus*-associated disease and/or the symptoms thereof. In an embodiment of the method, the subject has an immune deficiency disease or am acquired immune deficiency disease syndrome, e.g., HIV, AIDS, or SIV. In certain embodiments the pulmonary disease is *Pneumocystis* pneumonia (PCP) and/or the symptoms thereof, and the *Aspergillus*-associated disease is aspergillosis or Invasive Pulmonary Aspergillosis (IPA) and/or the symptoms thereof.

In some embodiments of any of the methods disclosed herein, the subject is a mammal, and in some embodiments, the subject is a human. In some embodiments, the subject is immunocompromised or immunosuppressed. In some embodiments, the immunocompromised or immunosuppressed subject is being treated for cancer, an immunodeficiency disease, a congenital disease, or an autoimmune disease. The immunocompromised or immunosuppressed subject in some embodiments is a pre-transplant subject or a post-transplant subject. In some embodiments, the immunocompromised or immunosuppressed subject is being treated for HIV, rheumatoid arthritis, or psoriasis.

Other features and advantages of the described embodiments will be apparent from the detailed description, and from the claims.

Definitions

Unless defined otherwise, all technical and scientific terms used herein have the meaning commonly understood by a person skilled in the art to which this invention belongs. The following references provide one of skill with a general definition of many of the terms used in the embodiments described herein: Singleton et al., Dictionary of Microbiology and Molecular Biology (2nd ed. 1994); The Cambridge Dictionary of Science and Technology (Walker ed., 1988); The Glossary of Genetics, 5th Ed., R. Rieger et al. (eds.), Springer Verlag (1991); and Hale & Marham, The Harper Collins Dictionary of Biology (1991). As used herein, the following terms have the meanings ascribed to them below, unless specified otherwise.

By "Kex1" or "Kexin" or "KEX" protein is meant a polypeptide or peptide fragment thereof having at least about 85% or greater amino acid identity to the amino acid sequence provided at GenBank Accession No. EU918304.1, at NCBI Accession No. XM_746441.1, at GenBank Accession No. AF022372.1, or at NCBI Accession No. XM_572303.1 and having immunogenic activity. In an embodiment, the Kex peptide is an antigenically stable active site peptide sequence. (Kutty, G. and Kovacs, J. A., 2003, Infect. Immun., 71(1):571-574; Lee. L. H. et al., 2000, Gene, 242(1-2):141-150; and Russian, D. A. et al., 1999, Proc. Assoc. Am. Physicians, 111(4):347-356). In one embodiment, a Kex peptide is a fragment of a naturally occurring Kexin protein or is a non-naturally occurring pan-fungal peptide or fragment thereof.

By "Pan-fungal peptide 1" is meant a KEX peptide comprising a sequence having 95, 96, 97, 98, 99, or 100% identity to the amino acid sequence of Pan-fungal peptide 1 and having immunogenic activity. In some embodiments, a Pan-fungal peptide 1 comprises 1, 2, or 3 additional amino acids at the carboxy and/or amino terminus of the peptide, which additional amino acids do not alter the peptide's ability to stimulate an immune response in a subject. The sequence of Pan-fungal peptide 1 follows:

```
(Pan-fungal peptide 1)
                                          SEQ ID NO: 1
DDDGKTVDGPSPLVLRAFINGVNNGRNGLGSIYVFASGNGGIYEDNCNFD

GYANSVFTITIGGIDKHGKRPKYSEACSSQLAVTYAGGSA
```

By "Pan-fungal peptide 2" is meant a KEX peptide comprising a sequence having 95, 96, 97, 98, or 99% identity to Pan-fungal peptide 2 and having immunogenic activity. In some embodiments, a Pan-fungal peptide 2 comprises 1, 2, or 3 additional amino acids at the carboxy and/or amino terminus, which do not change the peptide's immunogenicity. The sequence of Pan-fungal peptide 2 follows:

```
(Pan-fungal peptide 2)
                                          SEQ ID NO: 2
PDDGKTMEGPDILVLRAFINGVQNGRDGKGSIYVFASGNGGGFEDNCNFD

GYTNSIYSITVGAIDRKGLHPSYSEACSAQLVVTYSSGSG.
```

An exemplary Kex1 polypeptide fragment of *Pneumocystis* isolated from *Pneumocystis* colonized non-human primates (cynomolgus macaques) and having GenBank Accession No. EU918304.1 is provided below:

```
  1 DDDGKTVDGP SPLVLRAFIN GVNNGRNGLG SIYVFASGNG
    GIYDDNCNFD GYANSVFTIT

 61 IGGIDKHGKR FAYSEACSSQ LAVTYAGGSA
```

An exemplary polynucleotide sequence encoding the Kex1 polypeptide fragment provided at GenBank Accession No. EU918304.1 is provided below:

```
  1 gatgacgatg gaaaaaccgt tgatgggcct tctcctcttg
    ttcttagagc atttattaat

 61 ggagtaaata atgggaggaa tgggttgggt tctatctatg
    tttttgcatc aggaaatggc

121 ggaatatacg atgacaactg taattttgat ggatatgcaa
    atagcgtgtt tactattact

181 attggtggta tagataaaca cggaaagcgc tttgcatatt
    ctgaagcgtg ttcttctcag

241 ttagctgtta catatgcagg cggaagtgca
```

An exemplary Kex (KexB endoprotease) polypeptide sequence of *Aspergillus fumigatus* (Af293) having NCBI Accession No. XM_746441.1 is provided below:

MRFLGSIALVLSSISVASANVRSRSYDTHEFFALHLDDSASPSHVAQLLG

ARHEGQIGELANHHTFSIPRERSSDLDALLERARAARKIRRRARDDATSQ

EQHNDALGGILWSQKLAPKKRLVKRVPPPERLARTFATGKEDPVAAQSQK

RIASTLGITDPIFNGQWHLFNTVQLGHDLNVTGVWMEGITGKGVTTAVVD

DGLDMYSNDLKPNYFPEGSYDFNDHTPEPRPRLSDDKHGTRCAGEIAAAR

NDVCGVGVAYDSRVAGVRILSKAIDDADEATAINFAYQENDIFSCSWGPP

DDGATMEGPGILIKRAFVNGVQNGRGGKGSIFVFAAGNGASFEDNCNFDG

YTNSIYSITVGAIDREGNHPSYSESCSAQLVVAYSSGSGDAIHTTDVGTD

KCYSFHGGTSAAGPLAAGTVALALSARPELTWRDAQYLMVETAVPIHEDD

GSWQVTKAGRKFSHDWGYGKVDAYALVQKAKTWELVKPQAWFHSPWLRVQ

HKVPQGDQGLASSYEVTEQMMKNANIARLEHVTVTMNVNHTRRGDLSVEL

RSPEGIVSHLSTTRKSDNEKAGYVDWTFMTVAHWGESGVGRWTVIVKDTN

VNEFTGEFIDWRLNLWGEAIDGANQKPHPFPDEHDDDHSIEDAIVATTSV

ETGPTKTGVPGSTDDTINRPVNAKPVETQTPSPAETTATKLAPPAETRPA

ATATSSPTPPAASDSFLPSFMPTFGASKRTQIWIYAAIGSIIVFCIGLGI

YFQVQRRKRILNNPRDDYDFEMIEDENALHGGNGRSGRTQRRGGELYNAF

AGESDEEEPLFSDEDDEPYRDRAPSEDRLRDTSSDDRSLRHGDH

An exemplary Kex (Kex2 proteinase) polypeptide sequence of *Candida albicans* having GenBank Accession No. AF022372.1 is provided below:

MLPIKLLIFILGYLLSPTLQQYQQIPPRDYENKNYFLVELNTTNSQKPLI

DFISHYRGHYNFEHQLSSLDNHYVFSIDKSHPHNSFLGNHNSNEYNLMKR

QLGHEQDYDELISHVESIHLLPMKKLSKRIPVPIEMEDVVFDNRDDTGSD

NHEATDEAHQKLIEIAKKLDIHDPEFTTQWHLINLKYPGHDVNVTGLWLE

DILGQGIVTALVDDGVDAESDDIKQNFNSEGSWDFNNKGKSPLPRLFDDY

HGTRCAGEIAAVKNDVCGIGVAWKSQVSGIRILSGPITSSDEAEAMVYGL

DTNDIYSCSWGPTDNGKVLSEPDVIVKKAMIKGIQEGRDKKGAIYVFASG

NGGRFGDSCNFDGYTNSIYSITVGAIDYKGLHPQYSEACSAVMVVTYSSG

SGEHIHTTDIKKKCSATHGGTSAAAPLASGIYSLILSANPNLTWRDVQYI

SVLSATPINEEDGNYQTTALNRKYSHKYGYGKTDAYKMVHFAKTWVNVKP

QAWYYSDIIEVNQTITTTPEQKAPSKRDSPQKIIHSSVNVSEKDLKIMNV

ERVEHITVKVNIDSTYRGRVGMRIISPTGVISDLATFRVNDASTRGFQNW

TFMSVAHWGETGIGEWKVEVFVDDSKGDQVEINFKDWQFRIFGESIDGDK

AEVYDITKDYAAIRRELLEKEKQNSKSTTTTSSTTTATTTSGGEGDQKTT

TSAENKESTTKVDNSASITTSQTASLTSSNEQHQPTESNSDSDSDTDDEN

KQEGEEDNDNDNDNGNKKANSDNTGFYLMSIAVVGFIAVLLVMKFHKTPG

SGRRRRRRDGYEFDIIPGEDYSDSDDDEDDSDTRRADDDSFDLGHRNDQR

VVSASQQQRQYDRQQDEARDRLFDDFNAESLPDYENDMFKIGDEEEEEEE

EEEGQQSAKAPSNSEGNSGTSTKK

An exemplary Kex polypeptide sequence of *Cryptococcus neoformans* (JEC21) having NCBI Accession No. XM_572303.1 is provided below:

MRTLLSLWGILLALIVPPSLALQRPQPRSYDTHAYYALELDPSISPAAAL

QLSKSLGVELVERIGELDGHWLVRTEGWTPEHASITKRSVSHDPILKRWE

ALPSSLGKKSLTPLSLKQRAKRHKSYSPRSRHSRDDRTELLYAQNELHLA

DPMLDQQWHLINTQMKDIELNVTGLWGRGITGEGVHVVIIDDGLDVESKD

LKDNFFAEGSYDFNDHTELPIPRLKDDQHGTRCAGEIAAVPNDVCGVGVA

YDSKIAGVRILSAPISDADEAAALNYAYQLNDIYSCSWGPPDDGRSMEAP

DGLILKAMVNGVQKGRDGKGSVFVFAAGNGGGSDDQCNFDGYTNSIFSVT

VGAVDRKGLHPYYSEMCAAMMVVAPSSGSGDHIHTTDVGKDKCSHSHGGT

SAAAPLAVGVFALALSVRPDLTWRDIQHLAVRHAVFFNPDDPAWELTAAG

RHFSYKYGYGKLDAGLFVEAAEKWQLVKPQTWYDSPSVYLPTTSPADVTR

RQDEAADGPTSSDEETSNPPPVVEPSGSFITEDGVISTYEVTQSMLFDAN

FERLEHVTVRVWIDHQRRGDVEVELTSPNGVVSVLCRQRRFDNADSGFPG

WKFMSLKHWDENPVGTWTIKVKDQVNPDKTGRFVAWSLQLWGESVDPALA

KLWAPAEEGQPDEEQTGSNPSTTVSQKPKPTALLPGDHGEASGEATQPGL

GSATAHPQPTSTTGDAGNVAEPTGPTDADADEGFFSGISNLASSSTWLAG

AGAIIILSGAAIGAFFFIRARRQKRNLFGLSNNGQGARGAYEPVDDVQMS

LLERGRRKFGKSKSESQGTKDLYDAFGDGPSDEEEEDLDERTALRYHDGF

LEDDEPNEVGPKTEYKDEPESEPETFKDGEETVGTKDKGKGKGPSEGESG

SGSSSSWQDAADEEARV

By "agent" is meant a peptide, nucleic acid molecule, or small compound.

By "ameliorate" is meant decrease, suppress, attenuate, diminish, arrest, or stabilize the development or progression of a disease.

By "alteration" is meant a change (increase or decrease) in the expression levels or activity of a gene or polypeptide as detected by standard art known methods such as those described herein. As used herein, an alteration includes a 10% change in expression levels, preferably a 25% change, more preferably a 40% change, and most preferably a 50% or greater change in expression levels.

The term "antibody," as used herein, refers to an immunoglobulin molecule which specifically binds with an antigen. Methods of preparing antibodies are well known to those of ordinary skill in the science of immunology. Antibodies can be intact immunoglobulins derived from natural sources or from recombinant sources and can be immunoreactive portions of intact immunoglobulins. Antibodies are typically tetramers of immunoglobulin molecules. Tetramers may be naturally occurring or reconstructed from single chain antibodies or antibody fragments. Antibodies also include dimers that may be naturally occurring or constructed from single chain antibodies or antibody fragments. The antibodies of the described embodiments may exist in a variety of forms including, for example, polyclonal antibodies, monoclonal antibodies, Fv, Fab and $F(ab')_2$, as well as single chain antibodies (scFv), humanized antibodies, and human antibodies (Harlow et al., 1999, In: Using Antibodies: A Laboratory Manual, Cold Spring Harbor Laboratory Press, NY; Harlow et al., 1989, In: Antibodies: A Laboratory Manual, Cold Spring Harbor, New York; Houston et al., 1988, Proc. Natl. Acad. Sci. USA 85:5879-5883; Bird et al., 1988, Science 242:423-426).

The term "antibody fragment" refers to a portion of an intact antibody and refers to the antigenic determining variable regions of an intact antibody. Examples of antibody fragments include, but are not limited to, Fab, Fab', F(ab') 2, and Fv fragments, linear antibodies, scFv antibodies, single-domain antibodies, such as camelid antibodies (Riechmann, 1999, *Journal of Immunological Methods,* 231:25-38), composed of either a $V_L$ or a $V_H$ domain which exhibit sufficient affinity for the target, and multispecific antibodies formed from antibody fragments. The antibody fragment also includes a human antibody or a humanized antibody or a portion of a human antibody or a humanized antibody.

Antibodies can be made by any of the methods known in the art utilizing a polypeptide (e.g., a Kexin polypeptide), or immunogenic peptide fragments thereof, as an immunogen. One method of obtaining antibodies is to immunize suitable host animals with an immunogen and to follow standard procedures for polyclonal or monoclonal antibody production. The immunogen facilitates the presentation of the immunogenic fragments on the cell surface. Immunization of a suitable host can be carried out in a number of ways. Nucleic acid sequences encoding a polypeptide as described herein, or immunogenic fragments thereof, can be provided to the host in a delivery vehicle that is taken up by immune cells of the host. The cells will in turn express the receptor on the cell surface generating an immunogenic response in the host. Alternatively, nucleic acid sequences encoding the polypeptide, or immunogenic fragments thereof, can be expressed in cells in vitro, followed by isolation of the polypeptide and administration of the polypeptide to a suitable host in which antibodies are raised.

Alternatively, antibodies against the polypeptide may, if desired, be derived from an antibody phage display library. A bacteriophage is capable of infecting and reproducing within bacteria, which can be engineered, when combined with human antibody genes, to display human antibody proteins. Phage display is the process by which the phage is made to 'display' the human antibody proteins on its surface. Genes from the human antibody gene libraries are inserted into a population of phage. Each phage carries the genes for a different antibody and thus displays a different antibody on its surface.

Antibodies made by any method known in the art can then be purified from the host. Antibody purification methods may include salt precipitation (for example, with ammonium sulfate), ion exchange chromatography (for example, on a cationic or anionic exchange column preferably run at neutral pH and eluted with step gradients of increasing ionic strength), gel filtration chromatography (including gel filtration HPLC), and chromatography on affinity resins such as protein A, protein G, hydroxyapatite, and anti-immunoglobulin.

Antibodies can be conveniently produced from hybridoma cells engineered to express the antibody. Methods of making hybridomas are well known in the art. The hybridoma cells can be cultured in a suitable medium, and spent medium can be used as an antibody source. Polynucleotides encoding the antibody of interest can in turn be obtained from the hybridoma that produces the antibody, and then the antibody may be produced synthetically or recombinantly from these DNA sequences. To produce large amounts of antibody, it is generally more convenient to obtain an ascites fluid. The method of raising ascites generally comprises injecting hybridoma cells into an immunologically naive histocompatible or immunotolerant mammal, especially a mouse. The mammal may be primed for ascites production by prior administration of a suitable composition (e.g., Pristane).

By "anti-Kexin antibody," "anti-Kex antibody," or "anti-Kex1 antibody" is meant an antibody or an antigen binding fragment thereof that selectively binds a Kexin polypeptide or a peptide fragment thereof, including, for example, a Kex1 peptide fragment of a fungal pathogen, such as *Candida albicans, Pneumocystis hominis, Pneumocystis provecii* (aka *carinii*), *Aspergillus fumigatus* and *Cryptococcus neoformans* as described herein. In various embodiments, anti-Kexin antibody or anti-Kex1 antibody specifically binds a binding site of a Kexin protein or peptide. In specific embodiments, the anti-Kexin antibody or anti-Kex1 antibody specifically binds a binding site of a Kexin protein or peptide of a fungal pathogen, for example, one or more of a *Candida, Pneumocystis, Aspergillus* and/or *Cryptococcus* fungal pathogen.

An "antiserum" refers to blood serum that contains one or more antibodies directed against a specific antigen. Antiserum containing antibodies may be obtained from the blood or serum of an animal (a mammal), including a human, that has been immunized or inoculated with an immunogen (or an antigen material) either by injection, typically into the bloodstream or tissues, or by infection. In an embodiment, the animal (a mammal), including a human, may be immunized or inoculated with the blood or serum of an organism or individual whose immune system has been stimulated to generate an immune response (e.g., antibody production) by infection or natural contact with an antigenic material or immunogen. In this case, an antiserum contains anti-Kex peptide antibodies, e.g., polyclonal antibodies or populations of monoclonal antibodies, generated or produced by an immunized, inoculated, or exposed donor subject against a Kex peptide immunogen, or a polynucleotide encoding the Kex peptide immunogen, derived from a fungal pathogen, e.g., *Pneumocystis* (e.g., *Pneumocystis provecii*). Such antiserum, isolated (and/or purified) from the donor subject is used to immunize (i.e., administer to) another (unrelated) subject to provide immunity (acquired immunity) against infection or disease caused by or associated not only with the

*Pneumocystis* pathogen as original source of the immunogen, but also with other fungal pathogens that have a Kex peptide that is also targeted and recognized by the antibodies in the antiserum. In embodiments, the fungal pathogens include *Pneumocystis* species (spp.) and one or more of *Candida* spp. or *Candida albicans, Aspergillus* spp. or *Aspergillus fumigatus*, or *Cryptococcus* spp. or *Cryptococcus neoformans*. In this way, a subject who receives the antiserum, i.e., antibodies in the antiserum, is treated or protected against infection and/or disease caused by more than one fungal pathogen. Such antiserum-derived immunoprotection against multiple fungal pathogens constitutes an acquired or passive immunity obtained by the recipient subject and imparted from the donor subject's isolated antiserum. As will be appreciated by one skilled in the art, blood serum is the amber-colored, protein-rich liquid component of blood that separates from the clot when blood coagulates. The serum component containing one or more antibodies (cross-protective antibodies) is termed "antiserum." In an embodiment, the antiserum is an isolated antiserum, e.g., isolated from a donor subject. In an embodiment, an isolated antiserum may be processed by methods used by one skilled in the art, such as dilution, concentration (e.g., via filtration or centrifugation or both), chromatography, purification to remove ions or extraneous protein, and the like, prior to its use as a treatment or protective therapeutic as described herein. In an embodiment, an isolated antiserum may be further purified after isolation. In an embodiment, an isolated antiserum is not further processed or purified. In an embodiment, antibodies, or antigen-binding fragments thereof, contained in an isolated antiserum may be further isolated by methods practiced by those having skill in the art, such as, without limitation, by affinity chromatography, size exclusion chromatography, immunoprecipitation, dialysis, HPLC chromatography, etc.

By "biological sample" is meant any liquid, cell, or tissue obtained from a subject. In some embodiments, the biological sample is blood, serum, plasma, cerebrospinal fluid, bronchoalveolar lavage, sputum, tears, saliva, urine, semen, feces, etc.

In this disclosure, "comprises," "comprising," "containing" and "having" and the like can have the meaning ascribed to them in U.S. Patent law and can mean "includes," "including," and the like; "consisting essentially of" or "consists essentially" likewise has the meaning ascribed in U.S. Patent law and the term is open-ended, allowing for the presence of more than that which is recited so long as basic or novel characteristics of that which is recited is not changed by the presence of more than that which is recited, but excludes prior art embodiments.

"Detect" refers to identifying the presence, absence or amount of the analyte that is detected or that is to be detected.

By "disease" is meant any condition, dysfunction, or disorder that damages or interferes with the normal function of a cell, tissue, or organ. In various embodiments, the disease is a pulmonary (lung) disease or a brain disease, e.g., meningitis. Non-limiting examples of pulmonary diseases include Chronic Obstructive Pulmonary Disease (COPD), which is a progressive lung disease that includes emphysema, chronic bronchitis, refractory (non-reversible) asthma, pneumonia (e.g., *Pneumocystis* pneumonia) and some forms of bronchiectasis.

By "effective amount" is meant the amount of a required to ameliorate the symptoms of a disease relative to an untreated patient. The effective amount of active compound(s) used to practice the methods as described herein for therapeutic treatment of a disease varies depending upon the manner of administration, the age, body weight, and general health of the subject. Ultimately, the attending physician or veterinarian will decide the appropriate amount and dosage regimen. Such amount is referred to as an "effective" amount. An immunologically effective amount of an isolated antiserum as described herein is an amount required to treat a fungal infection or disease associated with one or more of the fungal pathogens described herein. By way of example, an effective amount of an isolated antiserum may be determined by measuring the amount or titer of antibodies directed against the desired immunogen present in the serum by methods known and practiced in the art. The range of typical dosages for passive immunotherapy (i.e., the administration of antiserum containing antibodies) includes about 0.3 mg to about 100 mg/kg of total body weight. Following passive immunotherapy, treatment efficacy is typically conducted, as individual patients respond differently to therapies. Adjustment of the dosage may be modified as needed. Treatment regimens can be determined by methods known and practiced by those having skill in the art. In one embodiment, the amount is sufficient to induce an immune response.

By "fragment" is meant a portion of a polypeptide or nucleic acid molecule. This portion contains, preferably, at least 10%, 20%, 30%, 40%, 50%, 60%, 70%, 80%, or 90% of the entire length of the reference nucleic acid molecule or polypeptide. A fragment may contain 10, 20, 30, 40, 50, 60, 70, 80, 90, or 100, 200, 300, 400, 500, 600, 700, 800, 900, or 1000 nucleotides or amino acids.

By "genetic vaccine" is meant an immunogenic composition comprising a polynucleotide encoding an antigen.

By "immune response" is meant is any activity of the immune system that is generated against an antigen. In some embodiments, the immune response is an innate or an adaptive immune response that protects a subject from infection with a pathogen (e.g., fungal pathogen) or treats a pathogen infection. In some embodiments, an immune response involves the generation of antibodies against an antigen.

The term "immunocompromised" refers to a subject having a weakened or impaired immune system and/or associated immune response to a pathogen, pathogenic antigen, disease, etc. A subject may be immunocompromised as a consequence of taking immunosuppressive drugs, or by being afflicted with a disease or pathology that affects the subject's immune system, such as certain congenital diseases. The term "immunosuppressed" refers to a subject whose immune system and associated immune response to pathogens, pathogenic antigens, disease, etc. is partially or completely suppressed, for example, by a reduction in the activity or efficiency in the immune system. Immunosuppression of a subject's immune system or immune response may occur naturally due to a disease or disorder in the subject, or may be induced in the subject by the administration of immunosuppressive agents, drugs, e.g., anti-cancer drugs, compounds, and the like. In some cases, a subject who is immunosuppressed or is undergoing immunosuppression, or who has a weakened immune system due to a disease or condition (e.g., chemotherapy or an immune deficiency disease) is said to be immunocompromised.

By "immunogenic composition" is meant a composition comprising an antigen or immunogen or a polynucleotide encoding the antigen or immunogen, wherein the composition elicits an immune response in an immunized subject.

The terms "isolated," "purified," or "biologically pure" refer to material that is free to varying degrees from components which normally accompany it as found in its native state or environment. "Isolate" denotes a degree of separation from original source or surroundings. "Purify" denotes a degree of separation that is higher than isolation. A "purified" or "biologically pure" protein is sufficiently free of other materials such that any impurities do not materially affect the biological properties of the protein or cause other adverse consequences. That is, a nucleic acid or peptide as described herein is purified if it is substantially free of cellular material, viral material, or culture medium when produced by recombinant DNA techniques, or chemical precursors or other chemicals when chemically synthesized. Purity and homogeneity are typically determined using analytical chemistry techniques, for example, polyacrylamide gel electrophoresis or high-performance liquid chromatography. The term "purified" can denote that a nucleic acid or protein gives rise to essentially one band in an electrophoretic gel. For a protein that can be subjected to modifications, for example, phosphorylation or glycosylation, different modifications may give rise to different isolated proteins, which can be separately purified.

By "isolated polynucleotide" is meant a nucleic acid (e.g., a DNA) that is free of the genes which, in the naturally-occurring genome of the organism from which the nucleic acid molecule is derived, flank the gene. The term therefore includes, for example, a recombinant DNA that is incorporated into a vector; into an autonomously replicating plasmid or virus; or into the genomic DNA of a prokaryote or eukaryote; or that exists as a separate molecule (for example, a cDNA or a genomic or cDNA fragment produced by PCR or restriction endonuclease digestion) independent of other sequences. In addition, the term includes an RNA molecule that is transcribed from a DNA molecule, as well as a recombinant DNA that is part of a hybrid gene encoding additional polypeptide sequence.

By an "isolated polypeptide" or "isolated peptide" is meant a polypeptide or peptide that has been separated from components that naturally accompany it. Typically, the polypeptide is isolated when it is at least 60%, by weight, free from the proteins and naturally-occurring organic molecules with which it is naturally associated. Preferably, the preparation is at least 75%, more preferably at least 90%, and most preferably at least 99%, by weight, a polypeptide or peptide as described herein. An isolated polypeptide or peptide as described herein may be obtained, for example, by extraction from a natural source, by expression of a recombinant nucleic acid encoding such a polypeptide; or by chemically synthesizing the protein. Purity can be measured by any appropriate method, for example, column chromatography, polyacrylamide gel electrophoresis, or by HPLC analysis.

As used herein, "obtaining" as in "obtaining an agent" includes synthesizing, purchasing, or otherwise acquiring the agent.

By "opportunistic infection" is meant an infection caused by pathogens such as fungal pathogens, bacteria, viruses, protozoa, or parasites that take advantage of an opportunity to infect a subject (host) that is not normally available, for example, a host having a weakened immune system, an immunocompromised host, an immunosuppressed host, a host with altered microbiota or microflora, or a host having protective integumentary barriers that have been damaged or breached. In an embodiment, an opportunistic infection is caused by one or more fungal pathogens as described herein.

By "reduces" or "diminishes' is meant a negative alteration of at least 10%, 25%, 50%, 75%, or 100%.

By "reference" is meant a standard or control condition. A "reference sequence" is a defined sequence used as a basis for sequence comparison. A reference sequence may be a subset of or the entirety of a specified sequence; for example, a segment of a full-length cDNA or gene sequence, or the complete cDNA or gene sequence. For polypeptides, the length of the reference polypeptide sequence will generally be at least about 16 amino acids, preferably at least about 20 amino acids, more preferably at least about 25 amino acids, and even more preferably about 35 amino acids, about 50 amino acids, or about 100 amino acids. For nucleic acids, the length of the reference nucleic acid sequence will generally be at least about 50 nucleotides, preferably at least about 60 nucleotides, more preferably at least about 75 nucleotides, and even more preferably about 100 nucleotides or about 300 nucleotides or any integer thereabout or therebetween.

By "specifically binds" is meant a compound or antibody or antigen binding fragment thereof that recognizes and binds a polypeptide or peptide, but which does not substantially recognize and bind other molecules in a sample, for example, a biological sample, which naturally includes a polypeptide or peptide as described herein. Cross-reactive binding includes specific binding (e.g., by an antibody or an antigen binding fragment thereof) to an original polypeptide or peptide antigen/immunogen as well as binding to a polypeptide or peptide other than the original antigen/immunogen.

Nucleic acid molecules useful in generating a recombinant immunogen or a vaccine include any nucleic acid molecule that encodes a polypeptide or a peptide fragment thereof, such as a Kex wildtype or pan-fungal polypeptide or Kex wildtype or pan-fungal peptide described herein. Such nucleic acid molecules need not be 100% identical with an endogenous nucleic acid sequence, but will typically exhibit substantial identity to an endogenous sequence. Polynucleotides having "substantial identity" to an endogenous sequence are typically capable of hybridizing with at least one strand of a double-stranded nucleic acid molecule. Nucleic acid molecules may include any nucleic acid molecule that encodes a polypeptide or a peptide fragment thereof. Polynucleotides having "substantial identity" to an endogenous sequence are typically capable of hybridizing with at least one strand of a double-stranded nucleic acid molecule. By "hybridize" is meant pair to form a double-stranded molecule between complementary polynucleotide sequences (e.g., a gene described herein), or portions thereof, under various conditions of stringency. (See, e.g., Wahl, G. M. and S. L. Berger (1987) Methods Enzymol. 152:399; Kimmel, A. R. (1987) Methods Enzymol. 152: 507).

By "substantially identical" is meant a polypeptide or nucleic acid molecule exhibiting at least 50% identity to a reference amino acid sequence (for example, any one of the amino acid sequences described herein) or nucleic acid sequence (for example, any one of the nucleic acid sequences described herein). Preferably, such a sequence is at least 60%, more preferably 80% or 85%, and more preferably 90%, 95% or even 99% identical at the amino acid level or nucleic acid to the sequence used for comparison.

Sequence identity is typically measured using sequence analysis software (for example, Sequence Analysis Software Package of the Genetics Computer Group, University of Wisconsin Biotechnology Center, 1710 University Avenue, Madison, Wis. 53705, BLAST, BESTFIT, GAP, or PILEUP/PRETTYBOX programs). Such software matches identical or similar sequences by assigning degrees of homology to various substitutions, deletions, and/or other modifications. Conservative substitutions typically include substitutions within the following groups: glycine, alanine; valine, isoleucine, leucine; aspartic acid, glutamic acid, asparagine, glutamine; serine, threonine; lysine, arginine; and phenylalanine, tyrosine. In an exemplary approach to determining the degree of identity, a BLAST program may be used, with a probability score between $e^{-3}$ and $e^{-100}$ indicating a closely related sequence.

By "subject" is meant a mammal, including, but not limited to, a human or non-human mammal, such as a non-human primate, or a murine, bovine, equine, canine, ovine, or feline mammal. In an embodiment, the subject is a human. In an embodiment, a subject is a human patient who is undergoing treatment for infection or disease caused by one or more pathogenic fungi, such as *Pneumocystis, Aspergillus, Candida*, or *Cryptococcus*. In an embodiment as subject is a human patient who is at risk of infection (e.g., opportunistic infection) or disease caused by one or more pathogenic fungi, such as *Pneumocystis, Aspergillus, Candida*, or *Cryptococcus*. In an embodiment, a subject is a mammalian (e.g., a human; a non-human primate) donor subject from whom antiserum containing anti-fungal Kex peptide antibodies is obtained or isolated. In an embodiment, a subject is a mammalian (e.g., a human; a non-human primate) recipient subject who receives an isolated antiserum and acquires protective immunity (and treatment) against multiple fungal pathogens.

As used herein, a "vector" refers to a nucleic acid (polynucleotide) molecule into which foreign nucleic acid can be inserted without disrupting the ability of the vector to replicate in and/or integrate into a host cell. A vector can include nucleic acid sequences that permit it to replicate in a host cell, such as an origin of replication. An insertional vector is capable of inserting itself into a host nucleic acid. A vector can also include one or more selectable marker genes and other genetic elements. An expression vector is a vector that contains the necessary regulatory sequences to allow transcription and translation of inserted gene or genes in a host cell. One skilled in the art will recognize that depending on the expression vector used, additional nucleotides may need to be added to the 5' end of the foreign nucleic acid to be inserted into the vector to maintain the proper reading frame.

By "vaccine" is meant a preparation of immunogenic material (e.g., protein or nucleic acid; vaccine) capable of stimulating (eliciting) an immune response, administered to a subject to treat a disease, condition, or pathology, or to prevent a disease, condition, or pathology, such as an infectious disease (caused by Dengue virus infection, for example). The immunogenic material may include, for example, attenuated or killed microorganisms (such as attenuated viruses), or antigenic proteins, peptides or DNA derived from such microorganisms. Vaccines may elicit a prophylactic (preventative) immune response in the subject; they may also elicit a therapeutic response immune response in a subject. As mentioned above, methods of vaccine administration vary according to the vaccine, and can include routes or means, such as inoculation (intravenous or subcutaneous injection), ingestion, inhalation, or other forms of administration. Inoculations can be delivered by any number of routes, including parenteral, such as intravenous, subcutaneous or intramuscular. Vaccines may also be administered with an adjuvant to boost the immune response.

Ranges provided herein are understood to be shorthand for all the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50.

As used herein, the terms "treat," treating," "treatment," and the like refer to reducing, abating, diminishing, or ameliorating a disease, disorder and/or symptoms associated therewith. It will be appreciated that, although not precluded, treating a disease, disorder and/or symptoms associated therewith does not require that the disease, disorder, condition or symptoms associated therewith be eliminated.

As used herein, a therapeutic that "prevents" a disorder or condition refers to a compound or material that, in a statistical sample, reduces the occurrence of the disorder or condition in the treated sample relative to an untreated control sample, or delays the onset or reduces the severity of one or more symptoms of the disorder or condition relative to an untreated control sample. In an embodiment, a preventive therapeutic is an antibody or an antigen binding fragment thereof. In a particular embodiment, a preventive therapeutic is an isolated antiserum containing anti-Kex peptide antibodies or antigen binding fragments thereof as described herein.

Unless specifically stated or obvious from context, as used herein, the term "or" is understood to be inclusive. Unless specifically stated or obvious from context, as used herein, the terms "a," "an," and "the" are understood to be singular or plural.

Unless specifically stated or obvious from context, as used herein, the term "about" is understood as within a range of normal tolerance in the art, for example within 2 standard deviations of the mean. About can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

Any compositions or methods provided herein can be combined with one or more of any of the other compositions and methods provided herein.

BRIEF DESCRIPTION OF THE DRAWINGS

Exemplary embodiments as described herein are provided below as drawings and figures related to the described embodiments in their various and nonlimiting aspects.

FIG. 1 presents a multisequence alignment comparing the amino acid sequences of two pan-fungal Kex peptides, Pan-fungal peptide 1 and Pan-fungal peptide 2 derived from *Pneumocystis* (Human and Macaque) with the amino acid sequences of human *Pneumocystis* Kex1 peptide, macaque *Pneumocystis* Kex1 peptide, *Aspergillus* Kex peptide, *Cryptococcus* Kex peptide, and *Candida* Kex peptide.

FIG. 2 presents a multisequence alignment comparing the amino acid sequences of Pan-fungal peptide 1 and Pan-fungal peptide 2 with the amino acid sequence of human *Pneumocystis* Kex1 peptide. Pan-fungal peptide 1 shows 97% amino acid sequence identity to the human *Pneumocystis* Kex1 peptide, and Pan-fungal peptide 2 shows 69% amino acid sequence identity to the human *Pneumocystis* Kex1 peptide. As described herein (e.g., Example 1), Pan-fungal peptide 1 and Pan-fungal peptide 2 comprise the amino acid sequences shown in FIGS. 1 and 2, respectively, and as shown supra.

FIG. 3A is a timeline describing the administration and challenge schedule used to determine the immunogenicity of the pan-fungal 2 peptide in macaques. FIGS. 3B-3E graphically illustrate reciprocal endpoint titers (RETs) obtained by ELISA analysis of sera samples collected from a macaque monkey that had been immunized with Pan-fungal peptide 2 and alum adjuvant prior to SIV infection and challenge with *Pneumocystis* fungal pathogen, to determine serum immunoglobulin (IgG) titer against *Cryptococcus* Kex, *Pneumocystis* Kex1, and *Aspergillus* Kex as targets. For these figures, the arrows indicate when the test subject was immunized with Pan-fungal peptide 2 and when the test subject received the boost. The dotted vertical line shows when the test subject was infected with simian immunodeficiency virus (SIV). FIG. 3B is a graph of the RET measured via ELISA analysis of the Pan-fungal peptide 2. FIG. 3C is a graph of the RET measured via ELISA analysis for *Cryptococcus* Kex. FIG. 3D is a graph of the RET measured via ELISA analysis for *Pneumocystis* Kex1. FIG. 3E is a graph of the RET measured via ELISA analysis for *Aspergillus* Kex. FIG. 3F is a graph showing the percentage of *Pneumocystis* pneumonia (PcP) observed in animals vaccinated with pan-fungal 2 peptide (n=1) or a sham vaccine (n=7) up to 40 weeks after SIV infection.

FIG. 4A is a timeline describing the administration and challenge schedule used to study the effectiveness of *Pneumocystis* Kex1 prophylactic vaccination with alum as adjuvant and therapeutic vaccination with αGC as adjuvant. FIG. 4B is a graph of the RET measured via ELISA analysis of serum immunoglobulin G (IgG) titer against the target *Pneumocystis* Kex1. FIG. 4C is a graph showing the percentage of *Pneumocystis* pneumonia (PcP) observed in animals vaccinated with *Pneumocystis* Kex1 and alum adjuvant and boosted with *Pneumocystis* Kex1 with αGC adjuvant (n=6) or a sham vaccine (n=7) after SIV infection.

FIG. 5A is a timeline describing the administration and challenge schedule used to study the immunogenicity of *Pneumocystis* Kex1 therapeutic vaccination with αGC. FIG. 5B is a graph of the RET measured via ELISA analysis serum immunoglobulin G (IgG) titer against the target *Pneumocystis* Kex1 during the late chronic phase of SIV infection.

FIG. 6A depicts the immunization (vaccination) study design. CF-1 mice (7/group) were immunized with Pan-fungal peptide 2+adjuvant (TiterMax) or PBS+TiterMax (sham vaccination). Blood was collected for serologic analyses at 0, 14, and 28 days post-immunization. FIG. 6B is a graph illustrating the mean plasma reciprocal endpoint titer (RET) of Pan-fungal peptide 2-specific immunoglobulin G (IgG) titer, as determined by enzyme-linked immunosorbent assay (ELISA) of a single vaccination with Pan-fungal peptide 2+TiterMax1 or PBS+TiterMax. Pan-fungal peptide 2-vaccinated animals achieved a mean peak RET of $5\times10^5$ compared with that of sham-vaccinated animals (**p=0.002).

FIG. 9A is a diagram depicting the vaccination study design. In this study, fifteen (15) Rhesus macaques (n=7 Pan-fungal peptide 2-vaccinated, n=8 sham-vaccinated) were immunized and boosted with Pan-fungal peptide 2+adjuvant (alum) or PBS+alum. Blood was collected for serologic analyses at 1, 2, 4, 6, and 8 weeks following each vaccination. Eight (8) weeks following the second vaccination, all animals were SIV infected and continuously exposed to *Pneumocystis* by co-housing. All animals were monitored monthly for *Pneumocystis* infection. FIG. 9B is a graph showing the mean plasma reciprocal endpoint titer (RET) of Pan-fungal peptide 2-specific immunoglobulin G (IgG) titer, as determined by enzyme-linked immunosorbent assay (ELISA). Timing of the first and second sets of immunizations are indicated by arrows. Pan-fungal peptide 2-immunized (vaccinated) macaques achieved a mean peak RET of $4\times10^5$ two weeks after the second immunization was given (post vaccination 2 (2wpv2)) compared with sham-vaccinated animals (*p=0.019).

DETAILED DESCRIPTION OF THE EMBODIMENTS

Figure 3A:
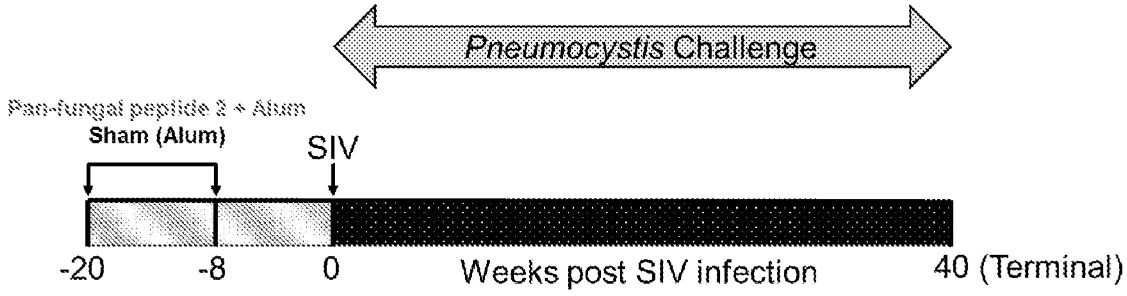
FIGS. 3A-3F illustrate pan-fungal peptide 2 prophylactic vaccination in SIV-infected Rhesus macaque.
Figure 3B:
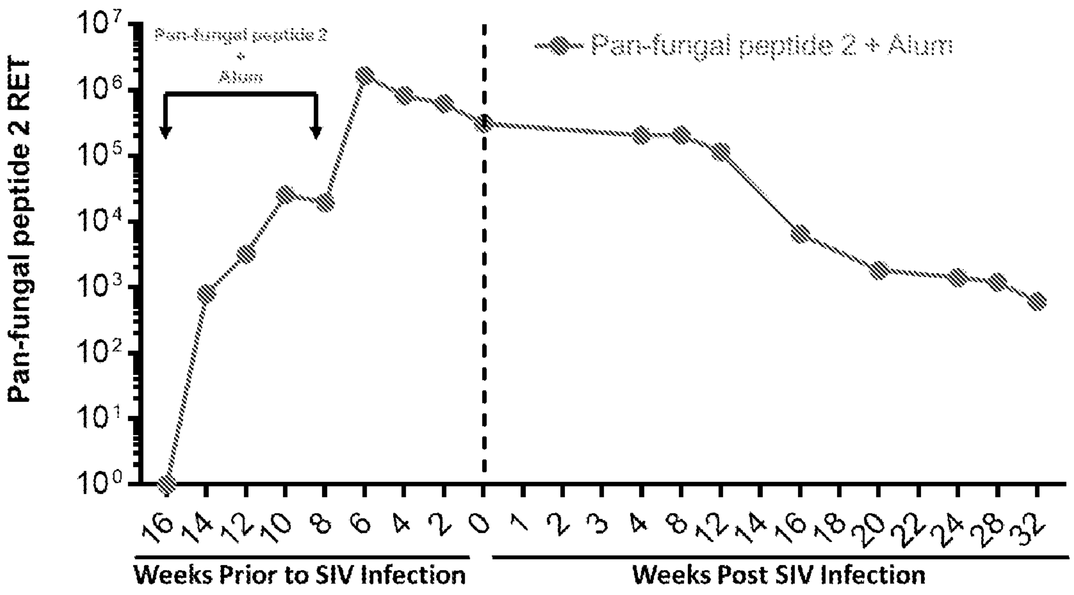
Figure 3C:
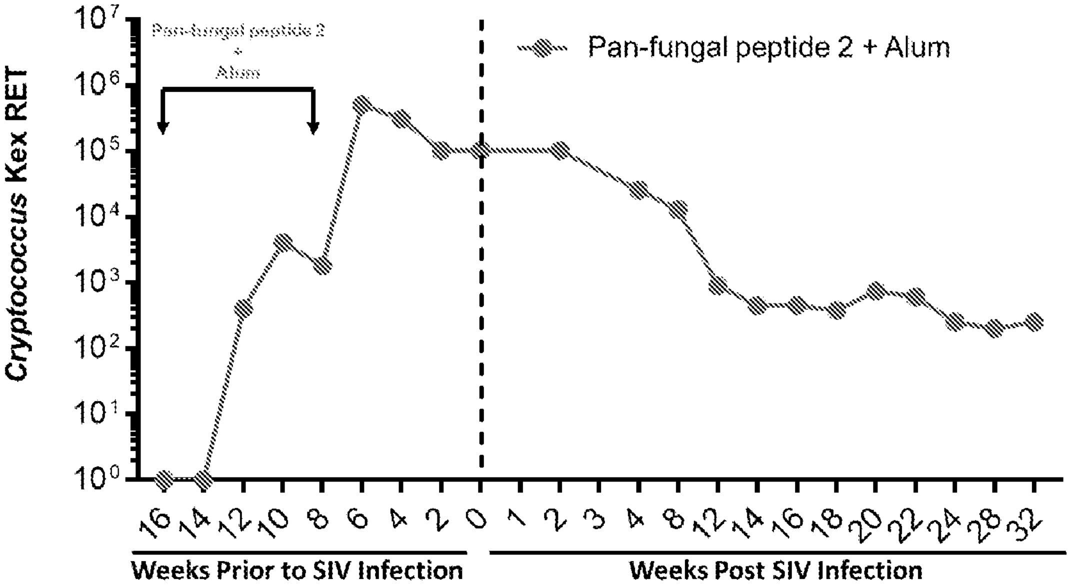
Figure 3D:
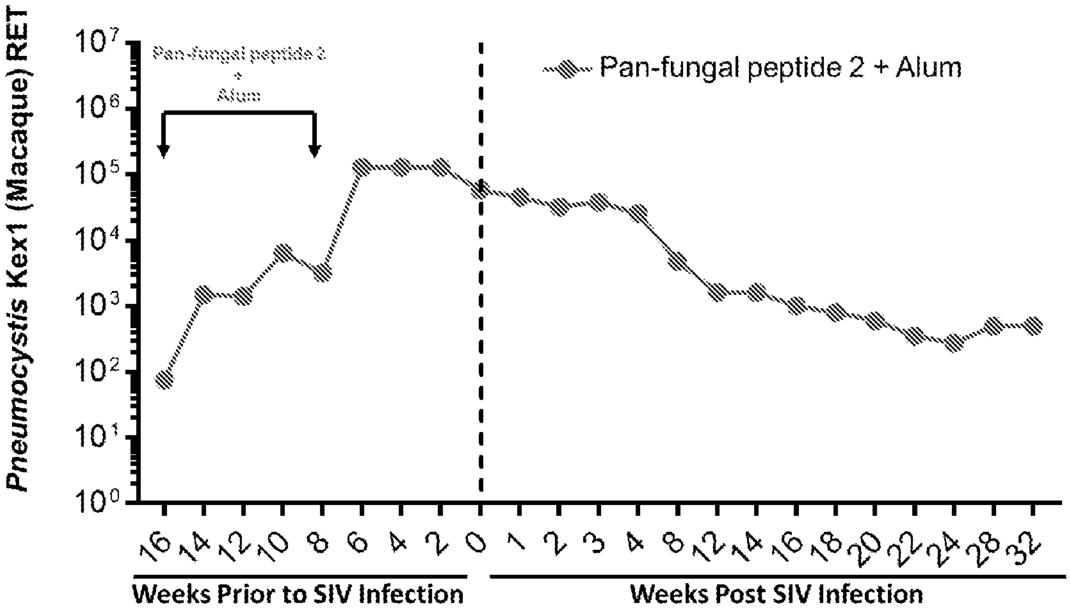
Figure 3E:
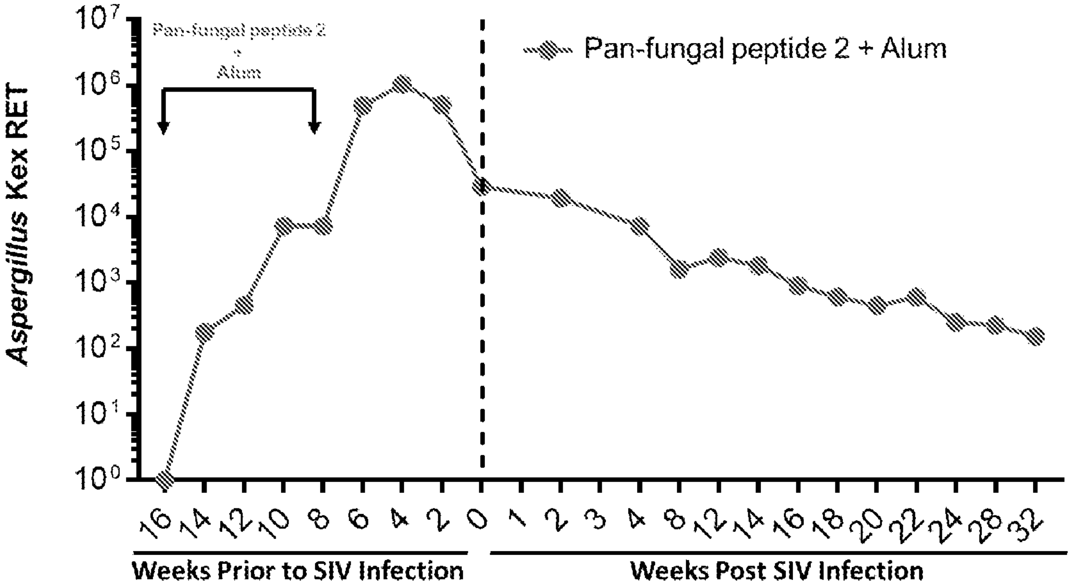

Featured herein are methods for treating or preventing infection by one or more fungal pathogens, or disease associated with infection by more than one fungal pathogen, in which the pathogens are of different etiologies. By way of specific example, disease-causing fungal pathogens include *Pneumocystis*, which colonizes lung tissue and causes severe pneumonia after infection; *Aspergillus*, a common mold, which causes aspergillosis, allergic reactions, lung infections and other health problems; *Candida*, which typically reside in the intestinal tract and mucous membranes and can cause thrush, infections and invasive candidiasis upon systemic infection, especially in those in poor health or with weak immune systems; and *Cryptococcus*, which can infect the lungs, where it can cause pneumonia-like illness, and the brain, where it can cause meningitis.

The described embodiments are based, at least in part, on the discovery that mammalian subjects, immunized with a non-naturally occurring peptide (referred to herein as a pan-fungal peptide) having sequence similarity to the Kexin (Kex or Kex1) protein generated antibodies that specifically bound Kex peptides of a number of distinct fungal pathogens, including *Pneumocystis, Candida, Aspergillus*, and *Cryptococcus*. Accordingly, pan-fungal peptides as described herein are useful for treating or preventing fungal infections by any one or more of *Pneumocystis, Candida, Aspergillus* and *Cryptococcus*.

Antibody-containing antiserum generated in response to administration of a non-naturally occurring pan-fungal Kex peptide, or a polynucleotide encoding the pan-fungal Kex peptide, can also serve as a treatment for infection and/or disease caused by more than one fungal pathogen and can provide immunity against multiple fungal pathogens in another or unrelated subject (i.e., a recipient subject) who receives the antiserum via a suitable mode and route of administration. It will be appreciated by the skilled practitioner that, as used herein, a subject from whom an antiserum is obtained or isolated is a "donor subject," and a subject to whom the isolated antiserum is administered or provided is a "recipient subject." In embodiments, a subject is a mammal, particularly a human being or a non-human primate. A recipient subject may be a patient or an individual in need of treatment for or protection from infection or disease caused by one or more of the *Pneumocystis, Candida, Aspergillus* and/or *Cryptococcus* fungal pathogens.

The production of such immunologically cross reactive antisera (and antibodies therein) produced in subjects (e.g., donor subjects) immunized with, or exposed to, a pan-fungal Kex peptide, or a polynucleotide encoding the pan-fungal Kex peptide, such as a non-naturally occurring consensus Kex1 peptide, that reacted with the Kex peptides of multiple fungal pathogens, such as *Candida, Aspergillus* and *Cryptococcus* fungal pathogens as described herein, was surprising and unexpected, particularly in view of the low amount of amino acid sequence identity (about 48%-70% variability) among the Kex peptides of the *Pneumocystis, Candida, Aspergillus* and *Cryptococcus* fungal pathogens, and in view of the overall amount of variability in the amino acid sequences (ranging from about 70% to 96% variability) between the Kex1 peptide of *Pneumocystis* and the Kex peptides of the *Candida, Aspergillus* and *Cryptococcus* fungal organisms.

Also embraced herein is an immunogenic composition comprising a pan-fungal peptide, or a polynucleotide encoding the pan-fungal peptide, that elicits a potent immune response in a subject following administration of the composition and the production of antiserum in the subject that contains one or more antibodies or antigen binding fragments thereof that reacts not only with the immunizing antigen, but also with a similar, but nonidentical, antigen found in other, distinct fungal pathogens.

One benefit of the described methods is the provision of treatment or prevention of infection by and disease associated with several different fungal pathogens using only one therapeutic agent, i.e., a composition comprising a non-naturally occurring pan-fungal Kex peptide, or a polynucleotide encoding the pan-fungal Kex peptide, or an antiserum (isolated antiserum) generated in response to administration of the non-naturally occurring pan-fungal Kex peptide or polynucleotide encoding the pan-fungal Kex peptide, that cross-protects against multiple fungal organisms and treats or prevents diseases and symptoms thereof, for example, pulmonary disease and poor pulmonary performance, associated with infection (and colonization) by the different fungal pathogens, e.g., at least two or more fungal pathogens. In an embodiment, the different fungal pathogens include *Pneumocystis, Aspergillus, Candida*, and *Cryptococcus*, particularly, at least two or more thereof. In one embodiment, a composition is provided that comprises a non-naturally occurring pan-fungal Kex peptide, or a polynucleotide encoding the pan-fungal Kex peptide, that elicits production of antibodies that specifically react with a Kex peptide derived from one or more of *Pneumocystis* (*Pneumocystis jirovecii*), *Aspergillus* (*Aspergillus fumigatus*), *Candida* (*Candida albicans*), or *Cryptococcus* (*Cryptococcus neoformans*). Another embodiment provides an antiserum produced in a subject immunized with a non-naturally occurring pan-fungal Kex peptide, or a polynucleotide encoding the pan-fungal Kex peptide, that contains antibodies that also specifically react with a Kex peptide derived from one or more of *Pneumocystis* (*Pneumocystis jirovecii*), *Aspergillus* (*Aspergillus fumigatus*), *Candida* (*Candida albicans*), or *Cryptococcus* (*Cryptococcus neoformans*). Accordingly, the antiserum is cross-protective (e.g., cross-reactive with Kex peptides in multiple fungal types) and affords treatment and/or protection against infection and/or disease associated with multiple fungal organisms when provided to another (e.g., unrelated) subject in need thereof. In an embodiment, the antiserum is an isolated antiserum. In an embodiment, the isolated antiserum is administered in a pharmaceutically acceptable composition.

The methods and compositions described herein offer economic, medical and practical benefits in the treatment and prevention of fungal infection and disease, such as pulmonary disease, or types of brain infections, associated with infection and colonization by different types of fungal pathogens

Therapeutic Methods

The methods and compositions provided herein can be used to treat or prevent infection and/or associated disease caused by the fungal pathogens *Pneumocystis, Aspergillus, Candida*, and *Cryptococcus*, and, in particular, *Pneumocystis hominis* or *jirovecii, Aspergillus fumigatus, Candida albicans*, or *Cryptococcus neoformans*. The methods and compositions provided herein can provide immune protection in a subject against infection and disease caused by at least one, and particularly more than one, of these fungal organisms. The methods and compositions provided herein can immunize a recipient subject against infection by at least one and particularly by more than one of these fungal organisms. In general, an immunogenic composition comprising a non-naturally occurring pan-fungal Kex peptide, a polynucleotide encoding the pan-fungal Kex peptide, or an isolated antiserum containing one or more antibodies generated against the non-naturally occurring pan-fungal Kex peptide can be administered therapeutically and/or prophylactically to provide immunity against other pathogenic fungal organisms that express a Kex protein or peptide antigen. The methods include administering an immunologically effective amount of the immunogenic composition comprising a pan-fungal Kex peptide, a polynucleotide encoding the pan-fungal Kex peptide, an isolated antiserum, or immune serum or immune plasma, described herein to an individual, alone, or in a physiologically acceptable carrier, excipient, or diluent. In an embodiment, the immunogenic composition comprising a pan-fungal Kex peptide, a polynucleotide encoding the pan-fungal Kex peptide, or isolated antiserum is in a pharmaceutically acceptable composition.

Provided and described herein are methods of treating or preventing an infection by one or more fungal pathogens (e.g., one or more of *Pneumocystis, Aspergillus, Candida*, or *Cryptococcus*, more specifically, *Pneumocystis hominis* or *jirovecii, Aspergillus fumigatus, Candida albicans*, or *Cryptococcus neoformans* fungi), and/or diseases, disorders, or symptoms thereof, which comprise administering a therapeutically effective amount of an immunogenic composition comprising a non-naturally occurring pan-fungal Kex peptide, a polynucleotide encoding the pan-fungal Kex peptide, or an isolated antiserum generated in response to the non-naturally occurring pan-fungal Kex peptide as described herein to a recipient subject (e.g., a mammal such as a human patient) in need thereof. In an embodiment, the antiserum contains antibodies that specifically target the Kexin protein or a Kex peptide thereof to neutralize the activity of Kex proteinase. In an embodiment, the isolated antiserum allows the recipient subject to achieve and passively acquire protective immunity against multiple fungal pathogens.

In an embodiment, a method as described herein involves treating a subject suffering from or susceptible to an infection by *Pneumocystis, Aspergillus, Candida*, or *Cryptococcus*, or disease or symptom thereof caused by one or more of these fungal pathogens (e.g., pulmonary disease or COPD). The method includes the step of administering to the subject (e.g., a mammal or human patient) a therapeutic amount of an immunogenic composition comprising a pan-fungal Kex peptide, a polynucleotide encoding the pan-fungal Kex peptide, or an isolated antiserum generated against the non-naturally occurring pan-fungal Kex peptide that is sufficient to treat an infection, disease, disorder, or symptom thereof, caused by one or more different types of fungal organism under conditions such that the infection, disease, disorder, or symptom thereof, is treated. In an embodiment, the isolated antiserum is in a pharmaceutically acceptable composition.

Also provided and described are methods of treating or preventing infection by more than one type of fungal pathogen, and/or diseases or disorders or symptoms thereof, which comprise administering a therapeutically effective amount of an immunogenic composition comprising a non-naturally occurring pan-fungal Kex peptide, a polynucleotide encoding the pan-fungal Kex peptide, or an isolated antiserum generated in response to the non-naturally occurring pan-fungal Kex peptide as described herein (e.g., comprising one or more antibodies or an antigen binding fragment thereof), to a subject (e.g., a mammal such as a human). In various embodiments, the method prevents infection by more than one fungal pathogen selected from *Pneumocystis, Aspergillus, Candida*, or *Cryptococcus* in a subject susceptible to infection, disease or symptom thereof (e.g., COPD, lung/pulmonary disease, poor pulmonary function, or symptoms thereof). In an embodiment, the method includes the step of administering to a recipient mammal a therapeutic amount of an immunogenic composition comprising a non-naturally occurring pan-fungal Kex peptide, a polynucleotide encoding the pan-fungal Kex peptide, or an isolated antiserum generated in response to the non-naturally occurring pan-fungal Kex peptide sufficient to treat the infection, disease, disorder, or symptom thereof, under conditions such that the infection, disease disorder, or symptom thereof is treated. In an embodiment, the method includes the step of administering to a recipient mammal a prophylactic or preventive amount of an immunogenic composition comprising a non-naturally occurring pan-fungal Kex peptide, a polynucleotide encoding the pan-fungal Kex peptide, or an antiserum generated in response to the non-naturally occurring pan-fungal Kex peptide sufficient to prevent the infection, disease, disorder, or symptom thereof, under conditions such that the infection, disease disorder, or symptom thereof is prevented. In an embodiment, the isolated antiserum is in a pharmaceutically acceptable composition. In an embodiment, the recipient mammal is a human patient in need of treatment.

Treatment will be suitably administered to subjects, particularly humans, suffering from, having, susceptible to, or at risk for infection by, more than one fungal organism, in particular, more than one of *Pneumocystis, Aspergillus, Candida*, or *Cryptococcus*, and in particular, *Pneumocystis hominis* or *jirovecii, Aspergillus fumigatus, Candida albicans*, or *Cryptococcus neoformans*, or a disease, pathogenic condition, or symptom thereof. Determination of those subjects who are "at risk" can be made by any objective or subjective determination by a diagnostic test or opinion of a subject or health care provider (e.g., genetic test, enzyme test or assay, or protein marker (such as levels of anti-Kex antibodies, e.g., in serum), family history, and the like). The methods herein also include administering to the recipient subject (including a subject identified as in need of such treatment or as being at risk of infection) an effective amount of an anti-fungal pathogen immunogenic composition comprising a non-naturally occurring pan-fungal Kex peptide, a polynucleotide encoding the pan-fungal Kex peptide, or an antiserum generated in response to the non-naturally occurring pan-fungal Kex peptide and isolated from a donor subject as described herein. Identifying a subject in need of such treatment can involve the judgment of the recipient subject or a health care or medical professional and can be subjective (e.g., opinion) or objective (e.g., measurable by a test or diagnostic method). In an embodiment, the isolated antiserum is provided in a pharmaceutically acceptable composition.

In some aspects, methods of treating or preventing a fungal infection or fungal pathogen-associated disease or condition (e.g., pulmonary infection, pulmonary disease or disorder, pneumonia, COPD, and the like) in a subject are featured, in which the methods involve administering to a subject in need thereof an effective amount of an immunogenic composition comprising a non-naturally occurring pan-fungal Kex peptide, a polynucleotide encoding the pan-fungal Kex peptide, or an isolated antiserum generated in response to the non-naturally occurring pan-fungal Kex peptide and obtained from an individual who has produced an antibody immune response against the non-naturally occurring pan-fungal Kexin peptide as described herein, such that the subject is therapeutically and/or prophylactically treated against infection or disease associated with a different fungal pathogen.

Provided in another aspect are methods of treating or preventing fungal infection and/or disease in a patient who is receiving or who has received immune suppressive drugs or medication and who, as a result of drug-induced immune system suppression, is susceptible to or may become susceptible to (or at risk of) infection by a pathogenic fungus, such as one or more of the *Pneumocystis, Aspergillus, Candida*, or *Cryptococcus* fungal pathogens, either in or outside of a nosocomial environment. By way of example, such a patient may be preparing to undergo a transplant (a pre-transplant patient) or may have received a transplant (a post-transplant patient) and is administered one or more immunosuppressive drugs or medications (anti-rejection medications) and/or is otherwise treated with drugs to reduce the likelihood of rejection of the transplanted organ or tissue, thereby making the patient more vulnerable, susceptible to, or at risk of infection and/or disease caused by one or more of the *Pneumocystis, Aspergillus, Candida*, or *Cryptococcus* fungal pathogens. Patients having other types of diseases and conditions, such as rheumatoid arthritis or psoriasis, and the like, may also be administered medications having an immune suppressive effect to treat or manage their conditions and thus suffer from, or be at risk of, infection by one or more fungal pathogens. Non-limiting classes of immune suppressive drugs and medications include, for example, corticosteroids, such as prednisone (e.g., DELATSONE, ORASONE); budesonide (ENTOCORT EC), or prednisolone (MLLIPRED) calcineurin inhibitors, such as cyclosporine (NEORAL, SANDIMMUNE, SANGCYA); or tacrolimus (ASTAGRAF XL, ENVARSUS XR, PROGRAF); mTOR inhibitors, such as sirolimus (RAPAMUNE), everolimus (AFINITOR, ZORTRESS); Inosine Monophosphate Dehydrogenase (IMDH) inhibitors, such as azathioprine (AZASAN, IMURAN), leflunomide (ARAVA), mycophenolate (CELLCEPT, MYFORTIC); Biologics and monoclonal antibodies or monoclonal antibody-based antibodies or antigen binding fragments thereof, such as abatacept (ORENCIA); adalimumab (HUMIRA); anakinra (KINERET); certolizumab (CIMZIA); etanercept (ENBREL); golimumab (SIMPONI); infliximab (REMICADE); ixekizumab (TALTZ); natalizumab (TYSABRI); rituximab (RITIXAN); secukinumab (COSENTYX); tocilizumab (ACTEMRA); ustekinumab (STELARA); and vedolizumab (ENTYVIO). In an embodiment, the patient is to receive or has received a transplant of an organ selected from kidney, liver, heart, bone marrow, pancreas, lung, gall bladder, bladder, etc.

Immunogenic compositions comprising a non-naturally occurring pan-fungal Kex peptide, a polynucleotide encoding the pan-fungal Kex peptide, or antibodies directed against the non-naturally occurring pan-fungal Kex peptide (or antiserum containing such antibodies) can be administered to the patient who is receiving transplant rejection medication, or other immune suppressive medication, in an effective amount to heighten the immune response against infection by one or more, two or more, three or more, or all four of these fungal pathogens in the immune suppressed patient. In an embodiment, the patient receiving immune suppressing drugs can be evaluated and monitored during treatment with immune suppressive drugs for the presence of antibodies (and antibody titers) against one or more of the fungal pathogens by employing the methods and kits as described herein.

Optionally, an immunogenic composition comprising a non-naturally occurring pan-fungal Kex peptide, a polynucleotide encoding the pan-fungal Kex peptide, or an isolated antiserum generated in response to the non-naturally occurring pan-fungal Kex peptide as described herein may be administered in combination with one or more of any other treatment or therapy, e.g., anti-fungal therapies. For example, an immunogenic composition comprising a non-naturally occurring pan-fungal Kex peptide, a polynucleotide encoding the pan-fungal Kex peptide, or an isolated antiserum or immune plasma generated in response to the non-naturally occurring pan-fungal Kex peptide containing anti-Kex non-naturally occurring pan-fungal peptide antibody or an antigen binding fragment thereof as described herein may be administered in combination with other antibodies or antibody cocktails with anti-fungal activity (including, for example, immune plasma), or in combination with one or more drugs, for examples, one or more drugs having anti-fungal activity (e.g., trimethoprim-sulfamethoxazole, azithromycin-sulfamethoxazole, clarithromycin-sulfamethoxazole, atovaquone, sulfadoxine-pyrimethamine, erythromycin-sulfisoxazole, PS-15, and dapsone-trimethoprim, as well as intravenous pentamidine and clindamycin-primaquine), to provide protective immunity in the recipient against *Pneumocystis, Aspergillus, Candida*, or *Cryptococcus* fungal organisms. In an embodiment of any of the foregoing, the immunogenic composition comprising a non-naturally occurring pan-fungal Kex peptide, a polynucleotide encoding the pan-fungal Kex peptide, or an isolated antiserum generated in response to the non-naturally occurring pan-fungal Kex peptide is provided in a pharmaceutically acceptable composition.

In an embodiment of any of the foregoing aspects, the immunogenic composition comprising a non-naturally occurring pan-fungal Kex peptide, a polynucleotide encoding the pan-fungal Kex peptide, or the antiserum generated in response to the non-naturally occurring pan-fungal Kex peptide and isolated from a donor subject immunized, inoculated, or exposed to a *Pneumocystis, Aspergillus, Candida*, or *Cryptococcus* fungal pathogen, e.g., a Kex peptide expressed by such fungal pathogens) allows the recipient subject to acquire immune protection, including memory immune protection, against infection or disease caused by more than one of these fungal pathogens.

Methods for administering both single and combination therapies (e.g., concurrently or otherwise) are known to those skilled in the art and are described, for example, in Remington's Pharmaceutical Sciences, 12$^{th}$ edition, Edited by E. W. Martin, Mack Publishing Co. In an embodiment, the antiserum provides a therapeutic, antibody-containing composition that treats infection or disease caused by one or more fungal pathogens as described herein. In another embodiment, the antiserum provides prophylactic, antibody-containing composition that prevents and protects against infection or disease caused by one or more fungal pathogens as described herein. In an embodiment, the isolated antiserum is in a pharmaceutically acceptable composition.

Additional Methods

At present, there is a dearth of methods as well as reagents to determine if a patient who is asymptomatic for infection by one or more, two or more, three or more, or each of *Pneumocystis, Aspergillus, Candida*, or *Cryptococcus* fungal pathogens is susceptible, vulnerable, or at risk for infection by one or more of these pathogens. It is currently difficult to plate out these fungal organisms as they may be present in very low amounts, or they do not grow under the culture conditions available for assessing their presence in a subject. Consequently, it is difficult for a medical practitioner and the patient to know whether the patient is actually infected with one or more of *Pneumocystis, Aspergillus, Candida*, or *Cryptococcus*, or if they are likely to become infected, for example, after a medical procedure, surgery, or transplant.

It is also difficult to identify, qualify, or stratify patients who are or may be susceptible to infection by one or more fungal pathogen and to monitor patients for changes in susceptibility over time, e.g., during recovery from surgery or during immunosuppressive therapies, for example, following organ transplantation, or during other chemotherapy treatments, or for reduction or elimination of infection in a patient undergoing treatment for a fungal infection or associated disease over time. The methods described herein provide a viable solution for such medical needs. In addition, methods are provided that allow a patient to be treated with the appropriate or a more directed fungal therapy by stratifying patients based on whether they possess or do not possess antibodies specific for a particular fungal pathogen, thereby deterring infection, or based on whether they have or do not have anti-fungal Kex peptide antibodies that are specific for a given type of pathogenic fungus.

In an embodiment, a method is provided for detecting antibodies against a non-naturally occurring Kex protein or peptide in a sample obtained from a subject, in which the method comprises: (a) contacting a biological sample obtained from the subject with a non-naturally occurring Kex peptide and (b) detecting the binding of the non-naturally occurring Kex peptide to antibodies in the sample which specifically bind to the Kex peptide, said detection of binding being indicative of the presence of antibodies against the Kex peptide of the fungal organisms in the subject's sample. In an embodiment, the Kex peptide is attached to a solid support or substrate. In an embodiment, the binding is detected by performing an immunoassay, e.g., an enzyme linked immunosorbent assay.

In another embodiment, a method of monitoring or detecting antibodies to fungal organisms associated with infection in a subject who has undergone a transplant or who is to undergo a transplant procedure to determine, for example, whether the subject is protected or will be protected from infection by one or more fungal pathogens selected from *Pneumocystis, Aspergillus, Candida*, or *Cryptococcus*, in which the method comprises: (a) measuring at a first time point the level of antibodies that bind to a non-naturally occurring pan-fungal Kex protein or peptide in a sample obtained from the subject prior to undergoing transplant surgery; (b) measuring the levels of antibodies that bind to the non-naturally occurring pan-fungal Kex protein or peptide in a sample obtained from the subject at one or more time points after the subject has undergone transplant surgery; and (c) detecting that the subject sample contains a level of antibodies that specifically bind to the non-naturally occurring pan-fungal Kex peptide relative to a predetermined or threshold level or to a control level, wherein a high level of antibodies that bind to the non-naturally occurring pan-fungal Kex peptide in the subject's sample indicates that the subject has produced an immune response against the fungal organism. In an embodiment, antibodies detected in the subject's sample that bind to the non-naturally occurring pan-fungal Kex peptide may serve to protect the subject from infection by *Pneumocystis, Aspergillus, Candida*, or *Cryptococcus*, according to the present described methods and compositions.

Repeating the practice of the above-described method over time (at different time intervals or different time periods) allows monitoring of the subject's antibody levels against the non-naturally occurring pan-fungal Kex peptide (i.e., the levels of antibodies that bind the non-naturally occurring Kex peptide) and can inform the medical practitioner or clinician as to whether continued, new, or different treatment of the subject with an appropriate anti-fungal drug or therapy is needed or warranted, or whether no or less anti-fungal treatment is warranted, based on the measured titers of antibodies in the subject's sample.

Other embodiments also provide methods for detecting in a subject's biological sample, e.g., blood, serum, plasma, lymph, bronchoalveolar lavage fluid, the presence of antibodies that bind a non-naturally occurring pan-fungal Kex peptide, wherein the levels of antibodies against the non-naturally occurring pan-fungal Kex peptide in the biological sample are determined simultaneously. For example, in one embodiment, the method comprises: (a) contacting a biological sample obtained from the subject with a non-naturally occurring pan-fungal Kex peptide that selectively binds to a plurality of antibodies in the subject's sample for a period of time sufficient to form bound Kex peptide-antibody complexes; (b) detecting binding of the Kex peptides to the plurality of antibodies in the subject's sample, thereby determining the levels of antibodies to the Kex peptides in the sample; and (c) comparing the levels of the plurality of antibodies in the sample with predetermined threshold values, wherein levels of antibodies that bind to at least one of the plurality of Kex peptides above or below the predetermined threshold values indicates, for example, that the subject has an antibody titer and has generated an immune response against the Kex peptide derived from one or more of the fungal organisms. Accordingly, the subject having a measured antibody response to the Kex peptide is protected from infection and disease associated with one or more of the *Pneumocystis, Aspergillus, Candida*, or *Cryptococcus* fungal organisms.

In another embodiment, methods for assessing antibodies that bind to the Kex peptide of one or more of the fungal organisms *Pneumocystis, Aspergillus, Candida*, or *Cryptococcus* in a subject are provided, in which the methods comprise: (a) contacting a biological sample obtained from the subject with a composition comprising one or more (a plurality of) Kex peptides derived from *Pneumocystis, Aspergillus, Candida*, or *Cryptococcus* for a period of time sufficient to form antibody-Kex peptide complexes; (b) detecting binding of the plurality of the Kex peptides to antibodies in the sample, thereby detecting the level or titer of anti-Kex peptide antibodies in the sample; and (c) comparing the level or titer of the anti-Kex peptide antibodies in the biological sample with predetermined threshold values or control values, wherein levels of at least one of the anti-Kex peptide antibodies above or below the predetermined threshold values indicates that the subject has or does not have, respectively, an adequate immune response (antibody response) to prevent infection by the one or more fungal organisms.

In another embodiment, a composition is provided, which comprises a solid substrate and a plurality of Kex peptides derived from one or more of *Pneumocystis, Aspergillus, Candida*, or *Cryptococcus* immobilized on the substrate. In an embodiment, a Kex peptide from each of *Pneumocystis, Aspergillus, Candida*, or *Cryptococcus* is immobilized at a different, indexable, location on the substrate. In other embodiments, a mixture of Kex peptides from two or more, three or more, or all four of *Pneumocystis, Aspergillus, Candida*, or *Cryptococcus* is immobilized at a different, indexible, location on the substrate. The binding of anti-Kex peptide antibodies from a sample obtained from a subject previously vaccinated with a non-naturally occurring pan-fungal Kex peptide can be measured or detected by measuring or detecting complexes of the anti-Kex peptide antibodies bound to the Kex peptides localized on the substrate. In an embodiment, the composition is contained in a kit for performing an immunoassay to detect and/or measure the antibody-peptide complexes, as well as determine or measure the level or amount of antibody present in the subject's sample.

Antibodies

As described herein, antisera comprising antibodies that specifically bind a non-naturally occurring Kexin peptide and that cross-react with a Kexin peptide of one or more different fungal organisms, such as one or more of *Pneumocystis, Aspergillus, Candida*, or *Cryptococcus*, to provide immune protection against infection and disease caused by two or more of these fungal pathogens are useful in therapeutic methods. For example, isolated antiserum containing antibodies that target and/or inhibit or neutralize the activity of the non-naturally occurring pan-fungal Kexin peptide and that cross-reacts with two or more of these fungal pathogens is particularly useful in the methods as described herein. In particular embodiments, methods of using isolated antiserum (or immune plasma) comprising antibodies, or antigen binding fragments thereof, that specifically bind the non-naturally occurring pan-fungal Kex peptide and that cross-react with *Pneumocystis, Aspergillus, Candida*, or *Cryptococcus* Kexin polypeptides are provided for the treatment or prevention of infection by these fungal pathogens and/or their associated diseases and conditions, such as pulmonary diseases and disorders of various types, pneumonia, COPD, invasive pulmonary aspergillosis (IPA), etc.

Methods of preparing antibodies are well known to those of ordinary skill in the science of immunology. As used herein, the term "antibody" means not only intact antibody molecules, but also fragments of antibody molecules that retain immunogen-binding ability. Such fragments are also well known in the art and are regularly employed both in vitro and in vivo. Accordingly, as used herein, the term "antibody" means not only intact immunoglobulin molecules but also the well-known active fragments $F(ab')_2$, and Fab. $F(ab')_2$, and Fab fragments that lack the Fc fragment of an intact antibody, clear more rapidly from the circulation, and may have less nonspecific tissue binding than an intact antibody (Wahl et al., J. Nucl. Med. 24:316-325 (1983)). The antibodies may comprise whole native antibodies, bispecific antibodies; chimeric antibodies; Fab, Fab', single chain V region fragments (scFv), fusion polypeptides, and unconventional antibodies.

Unconventional antibodies include, but are not limited to, nanobodies, linear antibodies (Zapata et al., Protein Eng. 8(10): 1057-1062, (1995)), single domain antibodies, single chain antibodies, and antibodies having multiple valencies (e.g., diabodies, tribodies, tetrabodies, and pentabodies). Nanobodies are the smallest fragments of naturally occurring heavy-chain antibodies that have evolved to be fully functional in the absence of a light chain. Nanobodies have the affinity and specificity of conventional antibodies although they are only half of the size of a single chain Fv fragment. The consequence of this unique structure, combined with their extreme stability and a high degree of homology with human antibody frameworks, is that nanobodies can bind therapeutic targets not accessible to conventional antibodies. Recombinant antibody fragments with multiple valencies provide high binding avidity and unique targeting specificity to cancer cells. These multimeric scFvs (e.g., diabodies, tetrabodies) offer an improvement over the parent antibody, because small molecules of ~60-100kDa in size provide faster blood clearance and rapid tissue uptake. See, e.g., Power et al., (Generation of recombinant multimeric antibody fragments for tumor diagnosis and therapy, Methods Mol Biol, 207, 335-50, (2003); and Wu et al., Anti-carcinoembryonic antigen (CEA) diabody for rapid tumor targeting and imaging, Tumor Targeting, 4, 47-58, (1999)).

Various techniques for making and using unconventional antibodies have been described. Bispecific antibodies produced using leucine zippers are described by Kostelny et al. (J. Immunol. 148(5):1547-1553, (1992)). Diabody technology is described by Hollinger et al. (Proc. Natl. Acad. Sci. USA 90:6444-6448, (1993)). Another strategy for making bispecific antibody fragments using single-chain Fv (sFv) diners is described by Gruber et al. (J. Immunol. 152:5368, (1994)). Trispecific antibodies are described by Tutt et al. (J. Immunol. 147:60, (1991)). Single chain Fv polypeptide antibodies include a covalently linked VH::VL heterodimer which can be expressed from a nucleic acid including $V_H$- and $V_L$-encoding sequences either joined directly or joined by a peptide-encoding linker as described by Huston, et al. (Proc. Nat. Acad. Sci. USA, 85:5879-5883, (1988)). See, also, U.S. Pat. Nos. 5,091,513, 5,132,405 and 4,956,778; and U.S. Patent Publication Nos. 20050196754 and 20050196754.

In various embodiments, an antiserum (isolated antiserum) contains antibodies, or antigen binding fragments thereof, that specifically bind the non-naturally occurring Kex peptide that are monoclonal or polyclonal. Also encompassed are methods of obtaining or isolating the antibodies from immune serum (antiserum) or immune plasma and producing hybrid or chimeric antibodies therefrom. In such hybrid or chimeric antibodies one pair of heavy and light chains is obtained from a first antibody, while the other pair of heavy and light chains is obtained from a different second antibody. Such hybrids or chimeric antibodies may also be formed using humanized heavy and light chains. Methods for isolating antibodies and producing hybrid or chimeric antibodies are known and practiced by those having skill in the art.

In general, intact antibodies are said to contain "Fc" and "Fab" regions. The Fc regions are involved in complement activation and are not involved in antigen binding. An antibody from which the Fc region has been enzymatically cleaved, or which has been produced without the Fc region, designated an "$F(ab')_2$" fragment, retains both antigen binding sites of the intact antibody. Similarly, an antibody from which the Fc region has been enzymatically cleaved, or which has been produced without the Fc region, designated an "Fab" fragment, retains one of the antigen binding sites of the intact antibody. Fab fragments consist of a covalently bound antibody light chain and a portion of the antibody heavy chain, denoted "Fd." The Fd fragments are the major determinants of antibody specificity (a single Fd fragment may be associated with up to ten different light chains without altering antibody specificity). Isolated Fd fragments retain the ability to specifically bind to immunogenic epitopes.

Antibodies (and immune serum or plasma containing antibodies) can be produced or generated by any of the methods known in the art utilizing soluble polypeptides, or immunogenic fragments thereof, (e.g., a Kex pan-fungal peptide) as an immunogen. One method of obtaining antibodies is to immunize suitable host animals or subjects with an immunogen, a polynucleotide encoding the pan-fungal Kex peptide, and to follow standard procedures for polyclonal or monoclonal antibody production. In brief, the immunogen will facilitate presentation of the immunogen (or immunogenic fragments of the immunogen) on the cell surface. Immunization of a suitable host can be carried out in a number of ways. By way of example, nucleic acid sequences encoding immunogenic pan-fungal Kexin peptides can be provided to the host in a delivery vehicle (or a molecular expression construct) that is taken up by immune cells of the host. The cells will, in turn, process and appropriately express the pan-fungal Kex peptide in a manner that generates an immunogenic response in the host. In embodiments, non-naturally occurring pan-fungal Kex peptides may be expressed by the delivery vehicle or expression construct. In other exemplary embodiments, nucleic acid sequences encoding non-naturally occurring pan-fungal Kex peptides may be expressed in cells in vitro, and the expressed, recombinant pan-fungal Kex peptide products may be isolated and used as immunogens to raise anti-Kex peptide antibodies and to generate an anti-Kex antiserum in a suitable immunized host.

Alternatively, antibodies against non-naturally occurring pan-fungal Kex peptides may, if desired, be derived from an antibody phage display library. A bacteriophage is capable of infecting and reproducing within bacteria, which can be engineered, when combined with human immunoglobulin (antibody) genes, to display human antibody proteins. Phage display is the process by which the phage is made to 'display' the human antibody proteins on its surface. Genes from the human antibody gene libraries are inserted into a population of phage. Each phage carries the genes for a different antibody and thus displays a different antibody on its surface.

Antibodies made by any method known in the art can then be purified from an immunized host. Antibody purification methods include, without limitation, salt precipitation (for example, with ammonium sulfate), ion exchange chromatography (for example, on a cationic or anionic exchange column, preferably run at neutral pH and eluted with step gradients of increasing ionic strength), gel filtration chromatography (including gel filtration HPLC) and chromatography on affinity resins such as protein A, protein G, hydroxyapatite, or anti-immunoglobulin.

In certain aspects, antibodies can be conveniently produced from hybridoma cells engineered to express the antibody. Methods of making hybridomas are well known in the art. The hybridoma cells can be cultured in a suitable medium, and spent medium can be used as an antibody source. Polynucleotides encoding the antibody of interest can, in turn, be obtained from the hybridoma that produces the antibody, and then the antibody may be produced synthetically or recombinantly from these nucleic acid sequences. To produce large amounts of antibody, it is generally more convenient to obtain an ascites fluid. The method of raising ascites fluid generally comprises injecting hybridoma cells into an immunologically naive histocompatible or immunotolerant mammal, especially a mouse. The mammal may be primed for ascites production by prior administration of a suitable composition (e.g., Pristane). Ascites fluid containing antibodies, typically in high concentration, can be obtained from the peritoneal fluid of the animal that harbors the injected hybridoma cells.

Monoclonal antibodies (Mabs can also be "humanized" by methods known in the art. "Humanized" antibodies are antibodies in which at least part of the sequence has been altered from its initial form to render it more like immunoglobulins derived from a human source. Techniques to humanize antibodies are particularly useful when antibodies are generated in a non-human animal (e.g., mice, rats). Nonlimiting examples of methods for humanizing a murine antibody are provided in U.S. Pat. Nos. 4,816,567, 5,530,101, 5,225,539, 5,585,089, 5,693,762 and 5,859,205.

In an embodiment of the foregoing, one or more antibodies or antigen binding fragments thereof generated against non-naturally occurring Kex peptides can be used in a pharmaceutical composition alone or in combination to provide immune protection against disease or infection caused by one or more of these fungal pathogens in a subject in need thereof. Such antibodies may be isolated or purified from an antiserum as described herein, or they may be generated, e.g., by recombinant molecular biology techniques, purified and formulated for pharmaceutical use in a subject in need. Such a formulation of antibodies may have immune protective properties similar to those afforded by an isolated antiserum comprising anti-fungal Kex peptide antibodies as described herein.

Vaccines

A vaccine is a biological preparation that provides active, acquired immunity (e.g., protective immunity) in a subject to a particular disease. A vaccine typically contains an agent that resembles a disease-causing pathogenic agent, e.g., a microorganism, a fungus, etc., and is often made from a weakened or killed form of the agent, or a toxin or surface protein or peptide of the agent. After administration of the vaccine to a subject, the agent is expressed and recognized as foreign (or "non-self") to the subject and stimulates the subject's immune system to mount an immune response (a B cell (antibody) and/or a T cell (cellular) immune response) and to destroy the agent. In addition, cells (e.g., B cells) of the immune system that are exposed to the vaccinating agent retain a memory of the agent, such that the agent is recognized and destroyed by the memory cells upon a later or subsequent encounter. Vaccines can be prophylactic (e.g., to prevent or ameliorate the effects of a future infection by a pathogen), or therapeutic (e.g., to treat disease or infections caused by or associated with pathogens or disease-causing agents upon or after a subject has been infected with or encountered a pathogen).

While many vaccines are prepared from an attenuated version of a pathogen or from inactivated disease-causing organisms, or a suitable part of such pathogens or organisms, such as a toxin, protein/peptide, or deleterious enzyme, the antigen to which the immune system responds frequently constitutes a relatively small number of amino acids, such as a peptide (e.g., a non-naturally occurring pan-fungal Kex peptide). A protein or peptide part of a pathogen may constitute a vaccine. A peptide vaccine is any peptide which serves to immunize an organism (elicit an immune response or a protective immune response, such as an antibody (B cell) response and/or an immune cell (T cell) response in the immunized organism) against a pathogen. In embodiments, the peptide antigen may be a non-naturally occurring pan-fungal Kex peptide. In an embodiment, a vaccine comprising a non-naturally occurring Kex peptide antigen may be used to provide immune protection against each of the other fungal organisms following administration to a recipient subject in need.

For non-attenuated vaccines, the peptide sequences that trigger a protective immune response are identified, and synthetic (or recombinantly-produced) versions of the peptides are employed as the vaccine substance. Because they are non-naturally occurring and synthetic, peptide vaccines pose little to no risk of mutation or reversion, and little or no risk of contamination by pathogenic or toxic substances. Moreover, chemical manipulation or modification of the peptide structure may result in increased stability and decreased unwanted side effects or adverse effects that may be associated with a native protein or peptide sequence.

Synthetically or recombinantly produced peptide antigens can be readily prepared in large amounts as components of vaccines. Such substances may also expose parts of a protein antigen that are not recognized by the immune system during a natural infection, possibly as a result of masking or post-translational modifications of proteins. Sequencing new strains and serotypes of microorganisms, fungal pathogens and other pathogenic organisms allows for rapid modification of peptide antigens to generate strain-specific immune responses, particularly against an antigenic epitope that is recognized and targeted by antibodies and cells of the host's or recipient's immune system. In some cases, modelling of three-dimensional epitopic or antigenic sites of a pathogen may be employed to generate synthetically the correct epitopic or antigenic site(s) on peptide antigens.

In an aspect, a vaccine (or an immunogenic composition) is provided, which comprises a synthetically (recombinantly) produced peptide, i.e., a pan-fungal Kexin peptide, that is nonidentical, but immunologically targetable, among several different types of fungal pathogens (e.g., the *Pneumocystis, Aspergillus, Candida* and *Cryptococcus* fungal pathogens) and is useful for treating or preventing infection or disease caused by or associated with the multiple fungal pathogens after administration (immunization) to a subject. In an embodiment, a peptide vaccine or immunogenic composition from a non-naturally occurring pan-fungal Kex peptide, when used to immunize an individual, elicits an immune response in the form of the production of antiserum (or immune plasma) containing cross-reactive antibodies which protect against all of the etiologically distinct fungal pathogens *Pneumocystis, Aspergillus, Candida* and *Cryptococcus*, and in particular, *Pneumocystis hominis, Aspergillus fumigatus, Candida albicans* and *Cryptococcus neoformans*. Accordingly, an antiserum or immune plasma generated by a vaccine or immunogenic composition comprising a non-naturally occurring pan-fungal Kex peptide may be used as a sole therapeutic or protective agent needed to treat or prevent infection or disease caused by or associated with more than one different fungal pathogen, namely, the *Pneumocystis, Aspergillus, Candida* and/or *Cryptococcus* fungal pathogens, and in particular, infection or disease caused by or associated with *Pneumocystis hominis, Aspergillus fumigatus, Candida albicans* and/or *Cryptococcus neoformans*. In an embodiment, the antiserum generated by such as peptide vaccine is isolated. In an embodiment, the isolated antiserum is used in a pharmaceutical composition.

In some aspects, a genetic vaccine is provided. A genetic vaccine is any vaccine that comprises a polynucleotide sequence encoding an immunogen, wherein the immunogen, once expressed, serves to immunize an organism. Administration of a genetic vaccine elicits an immune response or a protective immune response, such as an antibody (B cell) response and/or an immune cell (T cell) response in the immunized organism against a pathogen after the immunogen is expressed in a cell. In some embodiments, the genetic vaccine provides a polynucleotide sequence encoding a Kex peptide, such as a pan-fungal or wildtype peptide. In some embodiments, the peptide is a non-naturally occurring peptide. In some embodiments, the genetic vaccine provides a polynucleotide sequence encoding more than one Kex peptide. In some embodiments, the polynucleotide encoding the Kex peptide resides in a vector having elements, such as promoters and enhancers, to facilitate expression of the encoded Kex peptide. The nucleic acid in a genetic vaccine may be integrated into the subject's genome, wherein expression of the immunogen may be driven by an endogenous promoter or a promoter encoded by the inserted nucleic acid. The polynucleotide encoding the immunogen in a genetic vaccine may be a DNA polynucleotide or a RNA polynucleotide. The polynucleotide may include a nucleotide analog, which can inhibit degradation of the polynucleotide.

Pharmaceutical Compositions

Also featured herein are methods for treating or preventing infection and disease associated with infection of a subject by one or more fungal pathogens. The methods include administering to a subject in need thereof an immunologically effective amount of an immunogenic composition comprising a non-naturally occurring pan-fungal Kex peptide, a polynucleotide encoding the pan-fungal Kex peptide, or an isolated antiserum generated in response to the non-naturally occurring pan-fungal Kex peptide which cross-treats and/or protects the subject from infection by and/or disease associated with infection by and/or disease associated with one or more different fungal pathogens selected from *Pneumocystis, Aspergillus, Candida*, or *Cryptococcus*. In an embodiment, the isolated antiserum is used in a pharmaceutical composition.

Typically, the carrier or excipient for an immunogenic composition or vaccine as described herein is a pharmaceutically acceptable carrier or excipient, such as sterile water, aqueous saline solution, aqueous buffered saline solutions, aqueous dextrose solutions, aqueous glycerol solutions, ethanol, or combinations thereof. The preparation of such solutions ensuring sterility, pH, isotonicity, and stability is affected according to protocols established in the art. Generally, a carrier or excipient is selected to minimize allergic and other undesirable effects, and to suit the particular route of administration, e.g., subcutaneous, intramuscular, intranasal, and the like. Such methods also include administering an adjuvant, such as an oil-in-water emulsion, a saponin, a cholesterol, a phospholipid, a CpG, a polysaccharide, variants thereof, and a combination thereof, with a composition as described herein. Optionally, a formulation for prophylactic administration also contains one or more adjuvants for enhancing the immune response to an antigen or immunogen, such as a pan-fungal Kex peptide antigen or immunogen. Suitable adjuvants include, without limitation, complete Freund's adjuvant, incomplete Freund's adjuvant, saponin, alpha-galactosylceramide (α-GC), mineral gels such as aluminum hydroxide, surface active substances such as lysolecithin, pluronic polyols, polyanions, peptides, oil or hydrocarbon emulsions, bacille Calmette-Guerin (BCG), Corynebacterium parvum, and the synthetic adjuvants QS-21 and MF59. In an embodiment, the isolated antiserum is used in a pharmaceutical composition.

The administration of an immunogenic composition comprising a non-naturally occurring pan-fungal Kex peptide, a polynucleotide encoding the pan-fungal Kex peptide, or an antiserum, such as an isolated antiserum, monoclonal or polyclonal antibodies against the non-naturally occurring pan-fungal Kexin protein or peptide as a therapeutic for the treatment or prevention of an infection by a fungal pathogen as described herein or a fungal pathogen-associated disease or condition (e.g., pulmonary infection or disease, poor pulmonary function, COPD, pneumonia, etc.) may be by any suitable means that results in a concentration of the therapeutic that, combined with other components, if desired, is effective in ameliorating, reducing, eliminating, abating, or stabilizing disease or disease symptoms in a subject. The therapeutic may be administered systemically, for example, formulated in a pharmaceutically-acceptable composition or buffer such as physiological saline. Preferable routes of administration include, for example, subcutaneous, intravenous, intraperitoneally, intramuscular, intrathecal, or intradermal injections that provide continuous, sustained levels of the therapeutic in the subject. The amount of the therapeutic to be administered varies depending upon the manner of administration, the age and body weight of the subject, and with the clinical symptoms of the fungal infection or associated disease. Generally, amounts will be in the range of those used for other agents used in the treatment of pulmonary disease or dysfunction, although in certain instances lower amounts may be suitable because of the increased range of protection and treatment afforded by the therapeutic. A composition is administered at a dosage that ameliorates, decreases, diminishes, abates, alleviates, or eliminations the effects of the fungal pathogen infection or disease (e.g., pulmonary infection and disease and the symptoms thereof) as determined by a method known to one skilled in the art. In an embodiment, the isolated antiserum is administered or provided to a recipient subject at or near a site of the infection or colonization by the pathogenic fungal organism or organisms.

In embodiments, a therapeutic or prophylactic treatment agent may be contained in any appropriate amount in any suitable carrier substance, and is generally present in an amount of 1-95% by weight of the total weight of the composition. The composition may be provided in a dosage form that is suitable for parenteral (e.g., subcutaneous, intravenous, intramuscular, intrathecal, or intraperitoneal) administration route. The pharmaceutical compositions may be formulated according to conventional pharmaceutical practice (see, e.g., Remington: The Science and Practice of Pharmacy (20th ed.), ed. A. R. Gennaro, Lippincott Williams & Wilkins, 2000 and Encyclopedia of Pharmaceutical Technology, eds. J. Swarbrick and J. C. Boylan, 1988-1999, Marcel Dekker, New York).

Pharmaceutical compositions may in some cases be formulated to release the active agent substantially immediately upon administration or at any predetermined time or time period after administration. The latter types of compositions are generally known as controlled release formulations, which include (i) formulations that create a substantially constant concentration of a therapeutic agent or drug within the body over an extended period of time; (ii) formulations that after a predetermined lag time create a substantially constant concentration of a therapeutic agent or drug within the body over an extended period of time; (iii) formulations that sustain action during a predetermined time period by maintaining a relatively, constant, effective level in the body with concomitant minimization of undesirable side effects associated with fluctuations in the plasma level of the active substance (sawtooth kinetic pattern); (iv) formulations that localize action by, e.g., spatial placement of a controlled release composition adjacent to or in contact with an organ, such as the heart; (v) formulations that allow for convenient dosing, such that doses are administered, for example, once every one or two weeks; and (vi) formulations that target a disease using carriers or chemical derivatives to deliver the therapeutic agent or drug to a particular cell type. For some applications, controlled release formulations obviate the need for frequent dosing during the day to sustain a therapeutic level in plasma, serum, or blood. In an embodiment, an isolated antiserum may be formulated with one or more additional components for administration to a subject.

Any of a number of strategies can be pursued to obtain controlled release in which the rate of release outweighs the rate of metabolism of the therapeutic agent or drug in question. In one example, controlled release is obtained by appropriate selection of various formulation parameters and ingredients, including, e.g., various types of controlled release compositions and coatings. Thus, the therapeutic agent or drug may be formulated with appropriate excipients into a pharmaceutical composition that, upon administration, releases the therapeutic agent or drug in a controlled manner. Examples include single or multiple unit tablet or capsule compositions, oil solutions, suspensions, emulsions, microcapsules, microspheres, molecular complexes, nanoparticles, patches, and liposomes.

A pharmaceutical composition may be administered parenterally by injection, infusion or implantation (subcutaneous, intravenous, intramuscular, intraperitoneal, intrathecal, or the like) in dosage forms, formulations, or via suitable delivery devices or implants containing conventional, non-toxic pharmaceutically acceptable carriers and adjuvants. The formulation and preparation of such compositions are well known to those skilled in the art of pharmaceutical formulation. Formulations can be found in Remington: The Science and Practice of Pharmacy, noted supra.

Compositions for parenteral use may be provided in unit dosage forms (e.g., in single-dose ampules), or in vials containing several doses and in which a suitable preservative may be added (see below). The composition may be in the form of a solution, a suspension, an emulsion, an infusion device, or a delivery device for implantation, or it may be presented as a dry powder to be reconstituted with water or another suitable vehicle before use. Apart from the active agent that reduces or ameliorates a disease or dysfunction, such as pulmonary disease or dysfunction, the composition may include suitable parenterally acceptable carriers and/or excipients. In some cases, an active therapeutic agent(s) may be incorporated into microspheres, microcapsules, nanoparticles, liposomes, or the like for controlled release. Furthermore, the composition may include suspending, solubilizing, stabilizing, pH-adjusting agents, tonicity adjusting agents, and/or dispersing, agents.

In some embodiments, a pharmaceutical composition comprising an active therapeutic (e.g., an immunogenic composition comprising a non-naturally occurring pan-fungal Kex peptide, a polynucleotide encoding the pan-fungal Kex peptide, or an isolated anti-fungal antiserum generated in response to the non-naturally occurring pan-fungal Kex peptide as described herein) is formulated for intravenous delivery, e.g., intravenous, injection, or intrathecal delivery. In an embodiment, the antiserum is an isolated antiserum. To prepare such a composition, the suitable therapeutic(s) are dissolved or suspended in a parenterally acceptable liquid vehicle, excipient, or solvent. Among acceptable vehicles and solvents that may be employed are, for example, water; water adjusted to a suitable pH by the addition of an appropriate amount of hydrochloric acid, sodium hydroxide or a suitable buffer; 1,3-butanediol; Ringer's solution; and isotonic sodium chloride solution and dextrose solution. The aqueous formulation may also contain one or more preservatives (e.g., methyl, ethyl or n-propyl p-hydroxybenzoate). In cases in which one of the agents is only sparingly or slightly soluble in water, a dissolution enhancing or solubilizing agent can be added, or the solvent may include 10-60% w/w of propylene glycol or the like.

Kits and Compositions for Detecting and/or Quantifying Antibodies that React with Fungal-Derived Kex Peptides In another embodiment, kits and compositions are provided that advantageously allow for the detection and/or quantification of the presence of antibodies directed against the Kex protein or peptide of one or more of *Pneumocystis, Aspergillus, Candida*, or *Cryptococcus* fungal pathogens, or the levels of such one or more antibodies that may be present, in a subject's sample (e.g., blood or serum). In an embodiment, the subject is a human patient. In an embodiment, the patient has undergone a transplant, e.g., an organ or tissue transplant, or is to undergo a transplant, and thus may be at higher risk for infection by one or more fungal pathogens. In an embodiment, the transplant patient, or the patient to undergo a transplant, is immunosuppressed and/or is otherwise treated with drugs to reduce the likelihood of rejection of the transplanted organ or tissue, thereby making the patient more vulnerable or susceptible to infection and/or disease caused by one or more of the *Pneumocystis, Aspergillus, Candida*, or *Cryptococcus* fungal pathogens. In an embodiment, the patient has received, or is to receive, a transplant of an organ selected from kidney, liver, heart, bone marrow, pancreas, lung, etc.

Such kits as described herein fulfill a long-felt need in the art for detecting or qualifying whether any patient, but particularly a transplant patient, has adequate levels (titer) of anti-fungal pathogen antibodies to ensure that the patient does not become infected with one or more fungal pathogens as described herein, for example, during a hospital stay, or during or following a medical procedure or treatment (e.g., surgery or transplant), performed either on in-patient or an out-patient basis. At present, because of a lack of appropriate reagents and assays, it is difficult to assess whether a patient who is to undergo a medical procedure or surgery, in particular, an immunosuppressed patient who is to undergo a transplant procedure, or a patient who is to initiate other immunosuppressive therapies, will contract a fungal infection, e.g., infection and/or disease caused by one or more of the *Pneumocystis, Aspergillus, Candida*, or *Cryptococcus* fungal pathogens following or during immunosuppressive therapies and treatments. The use of a kit with which a patient's sample can be tested to determine if the patient has an antibody titer against one or more of these fungal pathogens (e.g., a high or a low antibody titer against one or more of the fungal pathogens) would greatly enhance the success of the patient's post-surgical or post-transplant recovery and directed treatment. For example, if, following testing of a patient's sample (e.g., a blood or serum sample from a transplant patient) using a kit as described herein, the patient is determined to have a low, negligible, or no antibody (antiserum) titer against one or more of the fungal pathogens, in particular, against the Kex peptide of one or more of the fungal pathogens, it could be surmised that the patient would not be naturally protected against a possible or real infection by one or more of the *Pneumocystis, Aspergillus, Candida*, or *Cryptococcus*.

A kit as described herein would allow the tester and the patient to determine and know if the patient's sample (serum sample) contains antibodies against one or more, two or more, three or more, or four of Kex protein/peptide of the *Pneumocystis, Aspergillus, Candida*, or *Cryptococcus* organisms. Should the results obtained from the use of the kit indicate that the patient has no specific anti-fungal Kex peptide antibodies, or a low titer of such antibodies (e.g., no specific anti-fungal Kex peptide antibodies in serum), directed to a specific anti-fungal Kex peptide, the patient would be identified as potentially vulnerable or susceptible to infection to (a) particular fungal pathogen(s) and could then be administered the appropriate anti-fungal treatment for the specific fungal pathogen(s) against which the patient has no, or negligible, specific antibodies, or a reduced antibody titer. In an embodiment, the patient is administered a prophylactic anti-fungal treatment or therapy. In an embodiment, the treatment comprises administering to the patient an appropriate drug or medication that is best designed to treat infection or disease associated with infection by a specific fungal pathogen or by two or more fungal pathogens, namely, *Pneumocystis, Aspergillus, Candida*, or *Cryptococcus*. In an embodiment, the treatment comprises administering to the patient a composition as described herein comprising a non-naturally occurring pan-fungal Kex peptide or a polynucleotide encoding the pan-fungal Kex peptide to generate a cross-reactive (cross-protective) antibody immune response in the patient, thereby reducing or eliminating one or more of the *Pneumocystis, Aspergillus, Candida*, or *Cryptococcus* organisms associated with the infection. Antibodies produced against a non-naturally occurring pan-fungal Kex peptide of one of the fungal organisms can recognize a Kex peptide of the other fungal organisms as described herein, thereby conferring protection (cross-protection) against more than one of the fungal organisms in the patient.

In an embodiment, a kit is provided for detecting, or qualifying the levels of, antibodies directed against the non-naturally occurring pan-fungal Kex protein or peptide and that cross-react with one, two, three, or four of *Pneumocystis, Aspergillus, Candida*, or *Cryptococcus* organisms in a patient sample, in which the kit comprises a substrate having attached thereto a non-naturally occurring pan-fungal Kex peptide derived from one or more, two or more, three or more, or each of *Pneumocystis, Aspergillus, Candida*, or *Cryptococcus* fungal organisms for measuring the level of antibodies in the sample which bind or immunologically react with the peptide, onto which a biological sample obtained from a patient is applied; and a labeled detection molecule for detecting and measuring the level of antibodies that bind to the Kex peptides on the substrate. In an embodiment, detecting anti-fungal Kex peptide antibodies in the sample or the measuring the level of such antibodies present in the patient's sample is compared to a positive and/or a negative control. In an embodiment, detecting anti-fungal Kex peptide antibodies in the sample or the measuring the level of such antibodies present in the patient's sample is compared to a cutoff value. In an embodiment, the substrate has attached thereto a non-naturally occurring pan-fungal Kex peptide and a Kex peptide derived from each of *Pneumocystis, Aspergillus, Candida*, and *Cryptococcus*. In an embodiment, the substrate has attached thereto a non-naturally occurring pan-fungal Kex peptide and Kex peptides derived from one of *Pneumocystis, Aspergillus, Candida*, and *Cryptococcus*. In an embodiment, the substrate has attached thereto non-naturally occurring pan-fungal Kex peptide and Kex peptides derived from *Pneumocystis* and *Aspergillus*. In an embodiment, the substrate has attached thereto a non-naturally occurring pan-fungal Kex peptide and Kex peptides derived from *Pneumocystis* and *Candida*. In an embodiment, the substrate has attached thereto a non-naturally occurring pan-fungal Kex peptide and Kex peptides derived from *Pneumocystis* and *Cryptococcus*. In an embodiment, the substrate has attached thereto a non-naturally occurring pan-fungal Kex peptide and Kex peptides derived from *Candida* and *Aspergillus*. In an embodiment, the substrate has attached thereto a non-naturally occurring pan-fungal Kex peptide and Kex peptides derived from *Cryptococcus* and *Aspergillus*. In an embodiment, the substrate has attached thereto a non-naturally occurring pan-fungal Kex peptide and Kex peptides derived from *Candida* and *Cryptococcus*. In an embodiment, the substrate has attached thereto a non-naturally occurring pan-fungal Kex peptide and Kex peptides derived from *Pneumocystis, Aspergillus* and *Candida*. In an embodiment, the substrate has attached thereto a non-naturally occurring pan-fungal Kex peptide and Kex peptides derived from *Pneumocystis, Aspergillus* and *Candida*. In an embodiment, the substrate has attached thereto a non-naturally occurring pan-fungal Kex peptide and Kex peptides derived from

*Pneumocystis, Aspergillus* and *Cryptococcus*. In an embodiment, the substrate has attached thereto a non-naturally occurring pan-fungal Kex peptide and Kex peptides derived from *Pneumocystis, Cryptococcus* and *Candida*. In an embodiment, the substrate has attached thereto a non-naturally occurring pan-fungal Kex peptide and Kex peptides derived from *Aspergillus, Cryptococcus* and *Candida*. In an embodiment, the pan-fungal Kex peptides are recombinantly produced. In an embodiment, the detection of antibodies in the sample that bind to the fungal-derived Kex peptide is performed using an immunoassay, such as an ELISA. In an embodiment, the ELISA detects a complex between a Kex peptide bound to an anti-fungal Kex peptide antibody present in the sample. In an embodiment, the detection of antibodies in the sample that bind to the fungal-derived Kex peptide is performed using an immunosorbent assay, by immunoprecipitation, by immunoblotting, or a combination thereof.

Also provided are kits comprising reagents that allow for assessing, measuring, evaluating or detecting antibodies directed against a non-naturally occurring Kex peptide. Such antibodies may be contained in a biological sample obtained from a subject undergoing testing, assessment, or evaluation using the kit. In particular, the biological sample may be a blood, serum, plasma, urine, cerebrospinal fluid, sputum, bronchiolar lavage, tears, saliva, or semen sample, or tissue or cell sample obtained from a subject. In particular, the reagents of the kit comprise non-naturally occurring Kex peptides.

In a specific embodiment, the kit is provided as an enzyme linked immunosorbent assay (ELISA) kit comprising a non-naturally occurring pan-fungal Kex peptide. In other embodiments, the provided kit allows for the detection of cross-reactive antibodies, wherein the antibodies are produced by immunization with a non-naturally occurring pan-fungal Kex peptide. In such embodiments, the kit is provided as an ELISA kit comprising the Kex peptides of *Pneumocystis, Aspergillus, Candida*, or *Cryptococcus* attached to a solid support or substrate. The peptides attached to the substrate thus perform as “capture” reagents that bind to antibodies present in the sample obtained from a subject undergoing testing. By way of example, the ELISA kit may comprise a solid support, such as a chip, microtiter plate comprising many wells (e.g., a 96-well plate), bead, or resin having the peptide capture reagents attached thereon. In one embodiment, the kit comprises a Kex peptide derived from each of *Pneumocystis, Aspergillus, Candida*, or *Cryptococcus* as described herein attached independently to discrete areas or components of solid substrates or supports, for example, the Kex peptides of each fungal organism are attached to separate and discrete wells of a microtiter plate or are independently attached to beads to produce populations of beads having the Kex peptides from each of *Pneumocystis, Aspergillus, Candida*, or *Cryptococcus* attached. In another embodiment, the kit comprises a combination or mixture of the Kex peptides derived from *Pneumocystis, Aspergillus, Candida*, or *Cryptococcus* attached to an area or component of the solid substrate or support, for example, the Kex peptides of all of *Pneumocystis, Aspergillus, Candida*, or *Cryptococcus* are attached to a single well of a microtiter plate or to a single bead. In a further embodiment, the kit comprises a combination of one, two or more, three or more, or four of the Kex peptides derived from *Pneumocystis, Aspergillus, Candida*, or *Cryptococcus* attached to a given area of a solid substrate or support, such as a single well of a microtiter plate.

In embodiments, in the ELISA platform, a well of a microtiter plate may have attached thereto a non-naturally occurring pan-fungal Kex peptide, an *Aspergillus* Kex peptide, a *Candida* Kex peptide, or a *Cryptococcus* Kex peptide. In the ELISA platform, a well of a microtiter plate may have attached thereto a *Pneumocystis* Kex peptide and an *Aspergillus* Kex peptide. In the ELISA platform, a well of a microtiter plate may have attached thereto a *Pneumocystis* Kex peptide and a *Candida* Kex peptide. In the ELISA platform, a well of a microtiter plate may have attached thereto a *Pneumocystis* Kex peptide and a *Cryptococcus* Kex peptide. In the ELISA platform, a well of a microtiter plate may have attached thereto an *Aspergillus* Kex peptide and a *Candida* Kex peptide. In the ELISA platform, a well of a microtiter plate may have attached thereto an *Aspergillus* Kex peptide and a *Cryptococcus* Kex peptide. In the ELISA platform, a well of a microtiter plate may have attached thereto a *Candida* Kex peptide and a *Cryptococcus* Kex peptide. In the ELISA platform, an individual well of a microtiter plate may have attached thereto a *Pneumocystis* Kex peptide, an *Aspergillus* Kex peptide and a *Candida* Kex peptide. In the ELISA platform, an individual well of a microtiter plate may have attached thereto a *Pneumocystis* Kex peptide, an *Aspergillus* Kex peptide and a *Cryptococcus* Kex peptide. In the ELISA platform, an individual well of a microtiter plate may have attached thereto a *Pneumocystis* Kex peptide, a *Candida* Kex peptide and a *Cryptococcus* Kex peptide. In the ELISA platform, an individual well of a microtiter plate may have attached thereto an *Aspergillus* Kex peptide, a *Candida* Kex peptide and a *Crytococcus* Kex peptide.

The kit may further comprise a means for detecting the peptides or any antibodies bound thereto, e.g., detectable antibodies, a secondary antibody-signal complex, such as horseradish peroxidase (HRP)-conjugated goat anti-rabbit IgG antibody or tetramethyl benzidine (TMB) as a substrate for HRP.

In another embodiment, the kit may be provided as an immunochromatography strip comprising a membrane on which the one, two, three, or four Kex peptides are immobilized, either at discrete loci on the membrane or in combination at one locus of the membrane, and a means for detecting the binding of antibody in a test sample, e.g., detectably labeled peptides, or gold particle bound secondary antibodies, in which the membrane may be a nitrocellulose-based (NC) membrane, a PVDF membrane, or other suitable type of membrane used in the art. The kit may comprise a plastic plate or substrate onto which a sample is applied and immobilized detection agents, such as detectably labeled Kex peptides, e.g., gold particle-bound peptides temporally spaced and immobilized on the substrate, e.g., a glass fiber filter or a nitrocellulose membrane, or a labeled detection agent that can detect a complex of antibody bound to Kex peptide in one or more bands on the substrate. In such a platform, a continuous capillary flow of sample, e.g., blood or serum, is maintained over the detection reagents immobilized on the substrate such that sample antibody bound to labeled Kex peptide or sample antibody complexed to Kex peptide reagent may be detected. In general, ELISA assays and immunosorbent assays, including ELISA membrane-based immunosorbent assays, as well as variations of these assays, are known and practiced by those having skill in the art.

Solid or solid phase substrates, or carriers, that can be effectively used in such assays are well known to those of skill in the art and include, for example, 96-well microtiter plates, glass, paper, and microporous membranes constructed, for example, of nitrocellulose, nylon, polyvinylidene difluoride, polyester, cellulose acetate, mixed cellulose esters and polycarbonate. Suitable microporous membranes include, for example, those described in U.S. Patent Application Publication No. US 2010/0093557 A1. Methods for the automation of immunoassays are well known in the art and include, for example, those described in U.S. Pat. Nos. 5,885,530, 4,981,785, 6,159,750 and 5,358,691.

In an embodiment, a multiplex assay, such as a multiplex ELISA, can be used to detect simultaneously different specific antibodies in a test sample. In embodiments, such methods employ an array, wherein multiple binding agents (for example capture antibodies) specific for multiple antibodies are immobilized on a substrate, such as a membrane, with each capture agent being positioned at a specific, pre-determined, location on the substrate. Methods for performing assays employing such arrays include those described, for example, in U.S. Patent Application Publication Nos. US 2010/0093557A1 and US 2010/0190656A1, the disclosures of which are specifically incorporated by reference herein. If flow cytometry, chemiluminescence, or electron-chemiluminescence technology is employed, multiplex arrays can be used in several different formats. Illustratively, flow cytometric multiplex arrays, also known as bead-based multiplex arrays, include the Cytometric Bead Array (CBA) system from BD Biosciences (Bedford, MA) and multi-analyte profiling (xMAP®) technology from Luminex Corp. (Austin, TX), both of which employ bead sets which are distinguishable by flow cytometry.

In another embodiment, a multiplex ELISA from Quansys Biosciences (Logan, UT) involves coating multiple specific capture reagents at multiple spots (one reagent at one spot) in the same well on a 96-well microtiter plate. Chemiluminescence technology is then used to detect multiple antibodies that bind at the corresponding spots on the plate.

In certain embodiments, a patient can be diagnosed by adding a biological sample (e.g., blood or serum) from a patient to the kit, or components thereof, and detecting the relevant sample antibodies that specifically bind to the Kex peptide reagents. By way of example, the method comprises: (i) collecting blood or serum sample from the subject; (ii) adding subject's sample to the components in the kit, e.g., a holding tube or a substrate; and (iii) detecting the peptide reagents to which the sample antibodies have bound. In this method, the subject's sample, e.g., blood or serum, is brought into contact with the Kex peptide reagent(s). If the anti-Kex peptide antibody(ies) are present in the sample, the antibodies will bind to the Kex peptide reagents, or a subset thereof. In other kit and diagnostic embodiments, blood is not collected from the patient (i.e., it is already collected), and is assayed for the presence of antibodies against the non-naturally occurring Kex peptide. In some embodiments, the antibodies against the non-naturally occurring pan-fungal Kex peptide cross-reacts with one or more, two or more, three or more, or four of the *Pneumocystis, Aspergillus, Candida*, or *Cryptococcus* organisms using the kit. Moreover, in other embodiments, the sample may comprise a tissue sample or a clinical sample, which can be processed, e.g., homogenized and/or suspended in medium or buffer, prior to assay. In embodiments, any antibody(ies) found to be present in a test sample from a subject may be isolated, or isolated and purified, and further characterized.

The kit can also comprise a washing solution or instructions for making a washing solution, in which the combination of the capture reagents and the washing solution allows capture of anti-Kex antibodies on the solid support for subsequent detection by, e.g., secondary antibodies, labeled reagent peptides, or mass spectrometry. In a further embodiment, a kit can comprise instructions for suitable operational parameters in the form of a label or separate insert (package insert). For example, the instructions may inform a consumer or user about how to collect the sample, how to wash the anti-Kex peptide antibody and Kex peptide reagent complex after binding has occurred, how to interpret the results, etc. In yet another embodiment, the kit can comprise one or more containers with appropriate positive and negative controls or control samples, to be used as standard(s) for detection, calibration, or normalization.

In another aspect, kits are provided for the treatment or prevention of an infection or disease caused by or associated with two or more of *Pneumocystis, Aspergillus, Candida*, or *Cryptococcus* fungal pathogens. In some embodiments, the kit includes an effective amount of a therapeutic or prophylactic antiserum, which contains anti-Kex peptide antibodies or antigen binding fragments thereof that bind/react with a non-naturally occurring Kex peptide. In some embodiments, these antibodies cross react with one or more of *Pneumocystis, Aspergillus, Candida*, or *Cryptococcus*, in unit dosage form. In an embodiment, the antiserum is an isolated antiserum. In other embodiments, the kit includes a therapeutic or prophylactic composition containing an effective amount of an anti-fungal immunoprotective agent such as antiserum in unit dosage form. In some embodiments, the kit comprises a device (e.g., nebulizer, metered-dose inhaler) for dispersal of the composition or a sterile container which contains a pharmaceutical composition; such containers can be boxes, ampoules, bottles, vials, tubes, bags, pouches, blister-packs, or other suitable container forms known in the art. Such containers can be made of plastic, glass, laminated paper, metal foil, or other materials suitable for holding medicaments.

If desired, a pharmaceutical composition is provided together with instructions for administering the pharmaceutical composition containing isolated antiserum to a subject having or at risk of contracting or developing a fungal infection, particularly infection and disease and the symptoms thereof caused by *Pneumocystis, Aspergillus, Candida*, or *Cryptococcus* fungal organisms. The instructions will generally include information about the use of the composition for the treatment or prevention of an infection by one or more of *Pneumocystis, Aspergillus, Candida*, or *Cryptococcus* fungal organisms. In other embodiments, the instructions include at least one of the following: description of the therapeutic/prophylactic agent; dosage schedule and administration for treatment or prevention of infection or symptoms thereof caused by one or more of *Pneumocystis, Aspergillus, Candida*, or *Cryptococcus* fungal organisms; precautions; warnings; indications; counter-indications; overdosage information; adverse reactions; animal pharmacology; clinical studies; and/or references. The instructions may be printed directly on the container (when present), or as a label applied to the container, or as a separate sheet, pamphlet, card, or folder supplied in or with the container.

The practice of the presently described embodimentsemploys, unless otherwise indicated, conventional techniques of molecular biology (including recombinant techniques), microbiology, cell biology, biochemistry and immunology, which are well within the purview of the skilled artisan. Such techniques are explained fully in the literature, such as, "Molecular Cloning: A Laboratory Manual", second edition (Sambrook, 1989); "Oligonucleotide Synthesis" (Gait, 1984); "Animal Cell Culture" (Freshney, 1987); "Methods in Enzymology" "Handbook of Experimental Immunology" (Weir, 1996); "Gene Transfer Vectors for Mammalian Cells" (Miller and Calos, 1987); "Current Protocols in Molecular Biology" (Ausubel, 1987); "PCR: The Polymerase Chain Reaction", (Mullis, 1994); "Current Protocols in Immunology" (Coligan, 1991). These techniques are applicable to the production of the polynucleotides and polypeptides such as those described herein, and, as such, may be considered in making and practicing the aspects and embodiments described herein. Particularly useful techniques for particular embodiments will be discussed in the sections that follow.

EXAMPLES

The following examples are put forth to provide those of ordinary skill in the art with a complete disclosure and description of how to make and use the assay, screening, and therapeutic methods as described herein, and are not intended to limit the scope of the described aspects and embodiments.

Example 1: Identification of Pan-Fungal Consensus Sequences of Kex1

To identify Pan-fungal consensus sequences of Kex1, multisequence alignments of KEX1 peptide sequences from *Pneumocystis* (Accession No. EU918304.1) (isolated from macaque) *Aspergillus fumigatus* Kexin (Accession no. XM746441), *Candida albicans* Kexin (Accession no. AF022372), and *Cryptococcus neoformans* Kexin (Accession no. XP572303.1) were performed using Clustal Omega available through web and programmatic interfaces of the EMBL-EBI Job Dispatcher sequence analysis tools framework) to analyze sequence identity and similarity (FIG. 1). The resulting 90-mer pan-fungal consensus KEX1 peptides (Pan-fungal peptide 1 and Pan-fungal peptide 2) shown in FIG. 2 have approximately 97% and 69% amino acid sequence identities, respectively, with the amino acid sequence of *Pneumocystis* KEX1 isolated from humans. The corresponding DNA sequence of the Pan-fungal 2 consensus Kex1 peptides were cloned in an *E. coli* expression vector and the recombinant protein was produced, isolated and purified.

Example 2: Generation of Recombinant Kexin Proteins

*Aspergillus* Kex, *Cryptococcus* Kex, *Candida* Kex, Pan-fungal Kex peptides 1 and 2 amino acid sequences shown in FIG. 1 were back-translated available through web and programmatic interfaces of the EMBL-EBI Job Dispatcher back translation sequence analysis tools framework) with an *Escherichia coli* K-12 codon bias and inserted into the expression vector pET-28b (+) using NcoI and BamHI restriction sites (GenScript). *Pneumocystis* Kex1 was cloned using the Genbank: EU918304.1 sequence. Each insert contained an additional GC 5' to the Kex sequences followed by CG to keep the Kex sequence inserts in frame. Plasmids were transformed into *Escherichia coli* BL21 (DE3) cells and plated on LB agar supplemented with 40 μg/mL kanamycin to select for transformed clones. All recombinant Kexin proteins were expressed and purified as described in Example 3 below.

Example 3: Procedures for the Purification of Recombinant Kexin Proteins

This example describes a protocol for purifying a recombinantly produced (pET28b vector), (Millipore-Sigma, US), *Pneumocystis* Kex1, *Aspergillus* Kex, *Cryptococcus* Kex, *Candida* Kex, Pan-fungal Kex peptides 1 and 2 that are histidine tagged. Elution conditions differ for *Aspergillus* Kex and *Cryptococcus* Kex proteins due to the insoluble nature of these recombinant proteins.

Materials and Equipment

A. LB (Lysogeny Broth) growth medium with kanamycin (40 μg/mL), typically in a 1 L volume, pH to 7.5. 10 g NaCl, 5 g Yeast Extract, and 10 g Tryptone Peptone are admixed; the volume is brought to 1 L with distilled/deionized $H_2O$.

B. 1 M IPTG solution.

C. Extraction buffer: (sterile filtered), 50 mM Sodium Phosphate, 300 mM NaCl, 10 mM imidazole, 6 M Guanidine-HCl, pH 7.4.

D. Wash buffer: (sterile filtered) 50 mM Sodium Phosphate, 300 mM NaCl, 10 mM imidazole pH 7.4.

E. 1 M imidazole solution in 50 mM Sodium Phosphate, 300 mM NaCl, pH 7.4) and 0.2 μm sterile filter (sterile filtered).

F. HisPur™ Cobalt resin (ThermoFisher#89966)

G. Disposable 5 mL polypropylene column (Thermo P#29922).

H. His-tag protease inhibitor cocktail (PIC) (Sigma P#8849).

I. Bradford Dye (Bio Rad P#500-0006).

J. Bovine Serum Albumin Standard (ThermoFisher#23209).

K. Coomassie Blue stain containing 0.2% Coomassie Blue, 7.5% acetic acid and 50% ethanol.

L. Coomasie Blue destain containing 50% methanol, 10% acetic acid and 40% $dH_2O$.

M. Acrylamide Bis 30% (Sigma P#1001356385)

N. N,N,N',N'-Tetramethylethylenediamine (TEMED) (Sigma P#1001434505).

O. Sodium dodecyl sulfate (SDS) (10% stock solution).

P. Ammonium persulfate (APS) (10% stock solution).

Q. 1.5 Tris buffer pH 8.8 (187 g Tris Base into 1 L $dH_2O$, bring pH to 8.8).

R. 0.5 Tris buffer pH 6.5 (60.5 g Tris Base into 1 L $dH_2O$, bring pH to 6.5).

S. Spectra™ Multicolor Ladder-Broad range stained (Thermo P#22634).

T. SDS-PAGE sample buffer (4X).

U. Hoefer gel casting system (model SE250).

The procedure used is as follows:

A. Culture and induce protein expression in *E. coli:*

- a. Streak Kexin construct on pET28b(+) onto LB KAN agar plate and incubate at 37° C. overnight (ON) or at RT on the bench top until adequate bacterial growth/colonization is obtained. (Plates can be stored at 4° C. for ~1 month)
- b. Inoculate a single colony into 10 mL liquid LB KAN 40 (10 μL of 40 mg/mL KAN per 10 mL LB), (allowing ~1:5 liquid to air ratio), and grow at 37° C. overnight with shaking.
- c. Following overnight incubation, dilute culture 1:50 into liquid LB KAN 40 (4 mL of overnight culture into 196 mL of fresh medium) and leave at 37° C. on shaker.
- d. Grow cultures to an $OD_{600}$ 0.5 and then add 1 mM IPTG to induce expression; leave at 37° C. on shaker for 4-5 hours.
- e. Split total volume of culture among five 50 mL Oakridge tubes (~40 mL culture per tube). For scaling up: can use 250 mL Oakridge tubes for larger volumes.
- f. Harvest cells by centrifugation at 6,000× g and 4° C. for 25 minutes (Can use SS-34 or SLA-1500 rotor).

g. Pour off supernatant and freeze cell pellets at −80° C. until time of use. Do not store *E. coli* pellets for longer than two weeks prior to protein extraction.

B. Protein purification using Talon metal affinity resin:

a. Thaw pellet on ice and re-suspend cell pellet in 10 mL extraction buffer+200 μL PIC.

b. Incubate at 4° C. for 2 hours minutes on nutator.

c. Centrifuge suspension at 10,000× g and 4° C. for 20 minutes (use SS-34 rotor).

d. Collect supernatant and keep on ice until Talon resin is prepared.

e. Prepare polypropylene elution column by suspending column in the upright position; adding a few drops of wash buffer to a porous disc, then using reverse end of a Pasteur pipette to depress disc evenly to the bottom of the column.

f. Prepare Talon resin: Resuspend Talon resin by gently shaking and add 3.5 mL of resin to a 15-mL conical tube and spin for 5 minutes at 500× g. Carefully remove ethanol layer without disturbing resin. Add 10 mL of deionized water to wash resin and spin again for 5 minutes at 500× g. Remove supernatant carefully and discard. Equilibrate resin in 10 mL of extraction buffer and spin for 5 minutes at 500× g. Remove supernatant carefully and discard.

g. Batch bind clarified lysate and equilibrated resin by mixing together and nutating for 1 hour at 4° C.

h. Add lysate and resin suspension to the prepared polypropylene elution column. Discard flow through.

i. Wash resin with 15 column volumes of extraction buffer followed by 15 column volumes of wash buffer.

j. Elution of *Pneumocystis* Kex1, *Candida* Kex, and Pan-fungal peptide 2. Elute in 1.5 mL fractions with increasing imidazole concentration in wash buffer and collect elution fractions.

Elution gradients a. Add 1.5 mL of 75 mM imidazole in wash buffer and collect fraction.

b. Add 1.5 mL of 100 mM imidazole in wash buffer and collect fraction.

c. Add 1.5 mL of 125 mM imidazole in wash buffer and collect fraction.

d. Add 1.5 mL of 150 mM imidazole in wash buffer and collect fraction.

e. Add 1.5 mL (×2) of 175 mM imidazole in wash buffer and collect fraction.

f. Add 1.5 mL (×3) of 200 mM imidazole in wash buffer and collect fraction.

j. Elution of *Pneumocystis* Kex1, Pan-fungal peptide 2.

k. Elution of *Aspergillus* Kex and *Crytococcus* Kex (Insoluble proteins)

a. Resuspend resin in 1.5 mL of 1% SDS and transfer into two 1.5 mL tubes.

b. Boil suspension in a heating block 95° C.

c. Centrifuge suspension for 5 minutes at 500× g.

d. Collect supernatant fraction containing denatured protein.

e. Repeat steps a-d three times to recover additional protein.

l. Add 20 μL PIC to each fraction of interest and store at 4° C. (Imidazole solutions should be stored on ice prior to use.)

C. Quantification of protein in elution fractions (Bradford Assay-low concentration standard curve):

a. Remove BSA-100 μg/mL from freezer (4° C.) and thaw on ice.

b. Set up cuvettes for standard curve and add the specified amounts of both the thawed BSA/d$H_2O$ from the below table (Table 1).

TABLE 1

| Final Conc. (μg/mL) | d$H_2O$ (μL) | BSA-100 μg/mL (μL) |
|---|---|---|
| 0 | 200 | 0 |
| 0.25 | 197.5 | 2.5 |
| 0.5 | 195 | 5 |
| 1 | 190 | 10 |
| 2 | 180 | 20 |
| 4 | 160 | 40 |
| 8 | 120 | 80 |

c. Add an additional cuvette for each fraction and dilute samples 1:50 (20 μL sample+180 μL d$H_2O$).

d. Prepare Bradford dye 1:4 in d$H_2O$ (10 mL dye+30 mL d$H_2O$) and add 800 μL to each cuvette (final volume 1 mL).

e. Mix cuvettes individually via inversion and incubate at RT for 15 minutes.

f. After incubation, add 200 μL of the 0 μg/mL BSA standard in replicate to wells A1 and A2 of 96 well flat bottom plate followed by the addition 0.25 μg/mL BSA standard to B1 and B2. Continue to add the BSA standard in increasing concentration to the plate in the same order.

g. Once the entirety of the BSA standard is added to the plate, load samples in replicate into the wells immediately below until no rows remain and then proceed to the top row of the next two columns.

h. After all samples are loaded onto the plate read at 595 nm—"Low-conc. Std. Curve."

i. Record the linear regression ($R^2$) and BSA standard curve values (Data obtained from assays with $R^2$<0.95 should not be used). Raw values for samples represent a 1:50 dilution and should therefore be multiplied by 50 in order to convert back into μg/mL. Once the concentrations of protein have been determined, fractions intended for plate coating (e.g., ELISA/ELISPOT), injection, etc. must be run on a 15% 2 mm SDS-PAGE gel to evaluate purity.

D. Identification of protein via SDS-PAGE gel Coomassie Blue staining:

a. For each gel, wash 1× glass cover plate, 1× white aluminum backing plate, 2× black plate spacers, and 1× white 10 lane stacking comb with d$H_2O$. Rinse with 70% ethanol solution. Confirm that all solidified gel residue from previous use is removed before casting.

b. After all materials have air-dried, take the backing plate and lay it flat on the bench top and place a spacer on each side of the plate before sandwiching with the clear glass cover plate. Confirm that the notches of the spacer are properly aligned to the edges of both plates.

c. Loosen all screws on the casting block and slide the sandwiched plates with spacers into the caster. Confirm that all plates and spacer are even and aligned. Leave ~3 mm of the sandwiched plates protruding from the bottom of the casting block before carefully tightening the screws so as not to crack the plates.

d. Place the casting block into the holder and set the black plastic plugs into the holder. Turn plugs to depress casting block into the black rubber mat of the holder. Confirm that the bottom of the plates is well sealed by the rubber of the holder in order to avoid leaks.

e. Prepare separating/running gel according to the recipe below for a 15%-SDS PAGE gel and add solution to the cavity between aluminum backing plate and glass cover plate. Allow ~1.5-2 cm of space at the top of the sandwiched plates for stacking gel. Add ~1 mL of $dH_2O$ to casting block. The gel will begin to polymerize once the APS/TEMED are added to the solution.

| Separating Gel | 15% |
|---|---|
| Acrylamide Bis 30% | 5 mL |
| Water ($dH_2O$) | 2.34 mL |
| 1.5 Tris Buffer pH 8.8 | 2.5 mL |
| SDS (10%) | 100 μL |
| APS (10%) | 50 μL |
| TEMED | 10 μL |

f. Once the gel has hardened (approximately 35 minutes), remove the layer of water and prepare the stacking gel solution from the recipe below. Add solution quickly.

| Stacking Gel | 15% |
|---|---|
| Acrylamide Bis 30% | 700 μL |
| Water ($dH_2O$) | 3.2 μL |
| 0.5 Tris Buffer pH 6.5 | 1250 μL |
| SDS (10%) | 50 μL |
| APS (10%) | 60 μL |
| TEMED | 20 μL |

g. Immediately place the white 10 lane stacking comb into the stacking gel and allow to fully polymerize (about 10 minutes).
h. Prepare samples to run on gel: (5 μg protein per well)
  i. If the fraction concentration is <165 μg/mL, use 22.5 μL of sample+7.5 μL 4X Sample Buffer;
  ii. If the fraction concentration is >165 μg/mL=>sample vol.=5 μg/(conc. (μg/mL)/1000) & 4X Sample Buffer vol.=(⅓)*sample vol.
i. Heat-inactivate all samples for 10 minutes at 56° C. in the water bath.
j. Remove 15% SDS-PAGE gel from casting block and attach to the running apparatus with 2× red clips. Fill the cavity of the running apparatus and the bottom tray with 1× SDS-PAGE running buffer. The stacking comb can now be removed. Add 10 μL of the Broad Range stained (P# 26634) SPECTRA™ Multicolor Ladder to first well of the gel followed by 30 μL of the prepared samples to the subsequent wells.
k. Once all samples are loaded, attach the electrodes to their appropriate terminals and turn on the power supply (red to red, black to black). Allow the gel to run at ~80-120 volts for 1.5-2.5 hours until the dye band runs of the bottom of the gel. At that point turn off the machine and disconnect the electrodes (Note: Lower voltages and lower time intervals increase the quality of the resulting gel.).
l. Drain the running buffer from the running apparatus. Remove the red clips, spacers, and gently detach the glass cover plate from the gel casting frame. Use the hard plastic straight edge of the gel scraper to cleave the stacking gel off and into the trash. Divide gel as necessary for further assays, i.e. Western Blot, etc. (it is not necessary to notch a corner of the gel to establish orientation because of the stained ladder used.).
m. For the separating gel that will be stained, wash 3× w $dH_2O$ for 15 minutes. Add ~25 mL of Coomassie Blue stain to the gel for 2+ hours or overnight if necessary. Destain with Coomassie Blue de-stain until optimal band color/gel transparency is obtained. Take a picture and save as JPG/TIF file.

Example 4: Generation of Immune Sera

Immunization of Rhesus Macaque with Recombinant Pan-Fungal 2 Peptide (Study Design FIG. 3A)

Figure 3F:
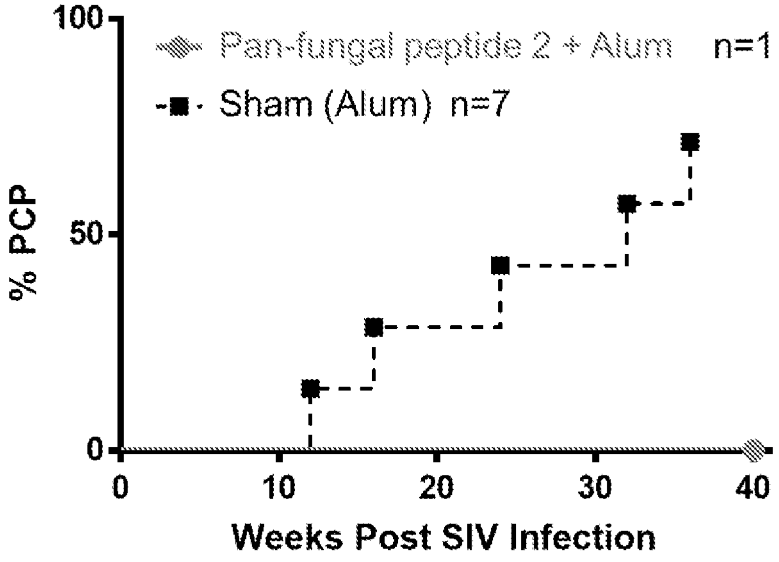

An adult Rhesus macaque (monkey subject number 2116) was intramuscularly immunized with 100 μg of Pan-fungal peptide 2. The monkey received a booster at 8 weeks post administration and was infected with SIV 8 weeks post boost. Referring to FIGS. 3B-3E, ELISA analysis of serum samples collected from monkey subject number 2116 was used to determine the reciprocal endpoint titers (RET) with Pan-fungal peptide 2, *Cryptococcus* Kex, *Pneumocystis* Kex1, and *Aspergillus* Kex as targets. As used herein, RET is the reciprocal of the highest analyte (e.g., antibody or antiserum) dilution that gives a reading above the cutoff value. For the RET analyses, serum obtained from the test animal is assayed to determine the presence of immunoglobulin (IgG) that is directed to, binds, and/or has activity against the target protein(s). The peak titers for each target was greater than $10^5$, which demonstrates the presence of primary antibodies that recognize kexin peptides from multiple fungal species. As illustrated in FIG. 3F, more than half of the of the monkeys receiving sham vaccination developed *Pneumocystis* pneumonia, while the monkey receiving the Pan-fungal vaccination did not.

Example 5: Kex Peptide Enzyme Linked Immunosorbent Assay (ELISA)

This example describes a protocol for performing an ELISA immunoassay utilizing the *Pneumocystis* Kex1 protein, the Pan-fungal peptide 2, or a Kex peptide derived from one or more of *Pneumocystis, Aspergillus, Candida*, or *Cryptococcus*. The ELISA is conducted to detect (and quantify) the presence of anti-fungal Kex peptide antibodies in a sample, e.g., blood, plasma, serum, bronchoalveolar lavage, or biological fluid sample. The anti-Kex peptide antibodies to be detected (and quantified) can be directed against, reactive with and/or bind to the Pan-fungal peptide 2 or to the Kex peptide of one or more of the *Pneumocystis, Aspergillus, Candida*, or *Cryptococcus* Kex peptides.

Materials and Equipment

A. KEX1 protein, which may be purified as described in Example 2

B. 1× PBS

C. Immulon high-binding (4HBX) Flat bottom microtiter plates (Thermo #3855)

D. Blocking buffer: 5% skim milk in 1× PBS

E. Wash buffer: 1× Phosphate-buffered Saline (PBS)+0.05% Tween-20

F. Secondary Antibody: Goat anti-human immunoglobulin-conjugated horseradish peroxidase (1:10,000 for IgG; Sigma-Aldrich).

G. Normal human plasma (Atlanta Biologicals, Inc., Lawrenceville, Ga). Negative/normal control plasma with undetectable absorbance at $OD_{450}$ (i.e., equal to or less than dilution buffer alone) in KEX-ELISA at a dilution of 1:100 is used as negative controls.

H. Substrate: 3,3',5,5'-Tetramethylbenzidine (TMB) peroxidase substrate (such as SureBlue TMB substrate, 1-component; KPL, Inc.)

I. Stop solution: 1M $H_2SO_4$

J. Adhesive sealing film for microplates (Plate sealers) (such as SealPlate non-sterile films from Excel Scientific, cat# 100-SEAL-PLT)

K. 96-well plate reader (any system capable of reading OD at a wavelength of 450 nm).

The procedure for performing the ELISA is as follows:

A. Coating/blocking ELISA plates with Kex1 protein:

a. Prepare mkKex protein in 1× PBS at 5 μg/mL. Add 50 μL of diluted KEX1 per well of Immulon 4HBX flat-bottom ELISA plates. Cover plates tightly with Parafilm or plate sealers and incubate overnight at 4° C.

b. Following overnight incubation, remove buffer by flicking into sink or bucket and tap plate onto absorbant pad or paper towels to remove excess. Wash plates 2× with wash buffer (PBS 0.05% Tween-20) (approximately 200 μL wash buffer per well for each wash, flicking and tapping plate between washes).

c. Add 100 μL of blocking buffer (5% milk/PBS) to each well and incubate for 1 hour at 37° C.

d. Empty plates, wash 2× with wash buffer. The plates can be sealed and frozen at −20° C. at this step, until ready for use.

B. Handling of plasma or other infectious fluids (e.g., bronchoalveolar lavage (BAL) fluid supernatant, etc.)—First-time use.

a. Remove plasma aliquot from −80° C. freezer.

b. Option 1: Heat-inactivate entire aliquot at 56° C. for 30 minutes. Option 2: If heat inactivation of the plasma sample would be detrimental to other potential uses, thaw sample at 4° C. or on ice. Remove an aliquot (~100 μL), transfer to a new tube, and heat inactivate (30 minutes, 56° C.). Return the remaining sample to the −80° C. freezer, noting that it has been thawed 1×.

c. Centrifuge sample at >10,000×g for 1-2 minutes to pellet aggregates prior to use.

d. To prevent contamination in storage, add ~0.01 to 0.02% $NaN_3$. Store sample aliquot for up to 6 months at 4° C. For subsequent assays, no further heat inactivation is needed; however, the sample should be centrifuged briefly prior to each use.

C. ELISA for endpoint titer determination (plasma):

a. Dilute plasma 1:100 in blocking buffer. Add 50 μL of diluted plasma and make serial 2× (or 4×, if needed) dilutions directly in the plate (final volume in each well should be 50 μL) for generation of endpoint titers. Perform assay in duplicate; set up enough plates for all isotypes of interest, e.g., if there are 10 samples and endpoint titers are to be generated for both IgG and IgM-KEX1 antibodies, this would require setting up 4 plates (duplicate plates for both IgG and IgM). Include a negative/normal control on each plate. Cover plates with plate sealers and incubate overnight at 4° C.

b. Empty plate (flicking and tapping), wash 4× w/ wash buffer.

c. Add 50 μL of secondary antibody (diluted in block) to each well (see appropriate dilutions under Materials and Equipment above). Incubate 1 hour at 37° C.

d. Empty the plate and wash 6× with wash buffer.

e. Add 100 μL of TMB to each well, protect from light and incubate for 30 minutes at 37° C.

f. Add 25-50 μL of stop solution (1M $H_2SO_4$) to each well.

g. Read OD of plates (on any standard plate reader) at 450 nm within 20 minutes of adding stop solution.

The majority of healthy adults (both humans and non-human primates) have circulating antibodies to *Pneumocystis*; therefore, when selecting a control sample to be used for calculating endpoint titers, plasma samples must be screened from healthy donors to determine and obtain an appropriate control. In plasma from an appropriate normal/negative control, the KEX1 $OD_{450}$ at a 1:100 dilution should be not more than 0.1; however, the lower the OD of the normal/negative control plasma, the better the control is. To control for plate-to-plate variability, the same normal/negative control should be used on all plates following the selection of an appropriate normal/negative control.

D. ELISA for endpoint titer determination (BAL Supernatant).

a. Dilute BAL supernatant 1:100 in normal saline.

i. Determine the urea concentration of the BAL supernatant and corresponding plasma sample using QuantiChrom Urea assay (BioAssay Systems Cat# DIUR-500).

1. Follow instructions on kit insert, diluting plasma 1:10 in distilled water and using BAL supernatant without dilution.

2. Plate plasma samples in the wells of a 96-well plate adding 5 μL of standard (1:10 dilution), blank (distilled water) and sample (1:10 dilution) in duplicates.

3. Plate BAL supernatant in the wells of a 96-well plate adding 50 μL of standard (diluted to 5 mg/dL), blank (distilled water) and sample (undiluted).

4. Add 200 μL working reagent (included in kit) and tap lightly to mix.

5. Incubate plasma plate for 20 minutes at room temperature (RT) and read at $OD_{520}$ on a spectrophotometer.

6. Incubate BAL supernatant plate for 50 minutes at RT and read at $OD_{430}$.

7. Calculate urea concentrations ([urea]) for plasma and BAL supernatant as follows: [urea]=(ODsample−ODblank)/(ODstandard−ODblank)*[standard]. The concentration of standard for plasma will be 50 mg/dL and will be 5 mg/dL for the BAL supernatant.

8. Calculate 1:100 dilution of BAL supernatant as follows:

a. Find the 1:100 dilution factor of bal to plasma i. Dilution factor=100/(plasma [urea]/bal [urea])

b. Calculate volumes for dilution for 500ul total sample i. Volume of sample=500 μL/dilution factor ii. Volume of saline=500 μL−volume of sample 9. Add the volume of sample and volume of saline to make 1:100 diluted BAL supernatant sample.

b. Add 50 μL of diluted BAL supernatant and make serial 2× (or 4×, if needed) dilutions directly in the plate with normal saline (final volume in each well should be 50 μL) for generation of endpoint titers. Perform assay in duplicate; set up enough plates for all isotypes of interest, e.g., if there are 10 samples and endpoint titers are to be generated for both IgG and IgM-KEX1 antibodies, this would require setting up 4 plates (duplicate plates for both IgG and IgM). Include a negative/normal control in each plate, as described above. Cover plates with plate sealers and incubate overnight at 4° C.

c. Empty plate (flicking and tapping), wash 4× w/ wash buffer.

d. Add 50 μL of secondary antibody (diluted in block, see appropriate dilutions under Materials and Equipment) to each well. Incubate for 1 hour at 37° C.
e. Empty the plate and wash 6× with wash buffer.
f. Add 100 μL of TMB to each well, protect from light and incubate for 30 minutes at 37° C.
g. Add 25-50 μL of stop solution (1M $H_2SO_4$) to each well.
h. Read OD of plates (on any standard plate reader) at 450 nm within 20 minutes of adding stop solution.

E. Determining Endpoint Titers.
a. Plot OD readings from each sample (at all dilutions) in Excel, or similar program, as a line graph. For the normal/negative control sample, add 0.025 to each value prior to plotting as described below.
b. The endpoint titer is defined by the dilution at which the test sample gives the same OD reading as that of the negative control (i.e., where the lines meet). Generally, the reciprocal endpoint titer is reported; thus, if the dilution is 1:1600, the endpoint titer is reported as 1600.
c. Calculate endpoint titers from each of the duplicate plates, to confirm that the results are consistent between plates. Acceptable error is within one dilution. If reciprocal endpoint titers (RET) from duplicate plates fall within one dilution, average the titers (e.g., when doubling-dilutions are made, and a sample from plate 1 has a RET of 1600 and the RET from plate 2 is 3200, then the average titer is 2400). If endpoint titers on duplicate plates do not fall within one dilution of each other, repeat the ELISA on one additional plate and average the 2 values which are closest.

Example 6: Pan-fungal Vaccination

An adult Rhesus macaque was intramuscularly immunized with 100 μg of pan-fungal 2 peptide and aluminum hydroxide (Imject Alum, ThermoScientific) mixed in a 1:1 ratio and then boosted 8 weeks later with 50 μg of the pan-fungal 2 peptide and aluminum hydroxide. At eight weeks post-boost, the monkeys were infected with simian immunodeficiency virus (SIV) and challenged with *Pneumocystis* (FIG. 3A). Seven additional Rhesus macaques were vaccinated with a sham vaccine, which consisted of the aluminum hydroxide but did not contain any Kex peptide. Referring to FIG. 3F, the percentage of monkeys diagnosed with *Pneumocystis* pneumonia increased steadily from week 10 to week 40 for those monkeys that received a sham vaccination. The monkey vaccinated with Pan-fungal 2 peptide did not develop pneumonia.

Example 7: Wild-Type *Pneumocystis* Kex1 Vaccination

Figure 4A:
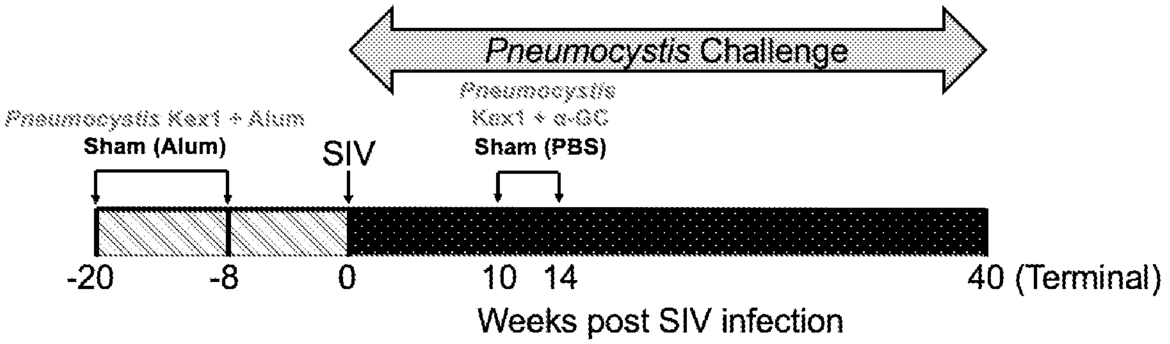
FIGS. 4A-4C summarize prophylactic vaccination of SIV-infected Rhesus macaques with *Pneumocystis* Kex1 peptide and alum adjuvant followed by therapeutic vaccination of the animals with *Pneumocystis* Kex1 peptide and alpha-galactosylceramide (αGC) as adjuvant.
Figure 4B:
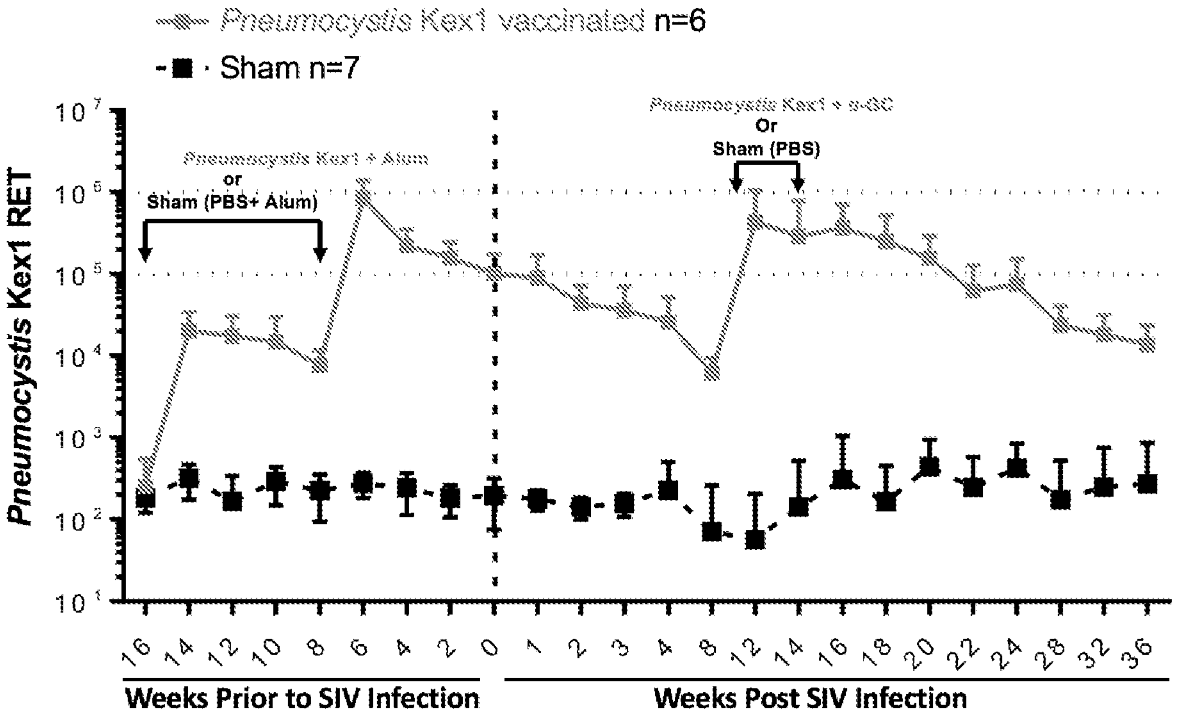
Figure 4C:
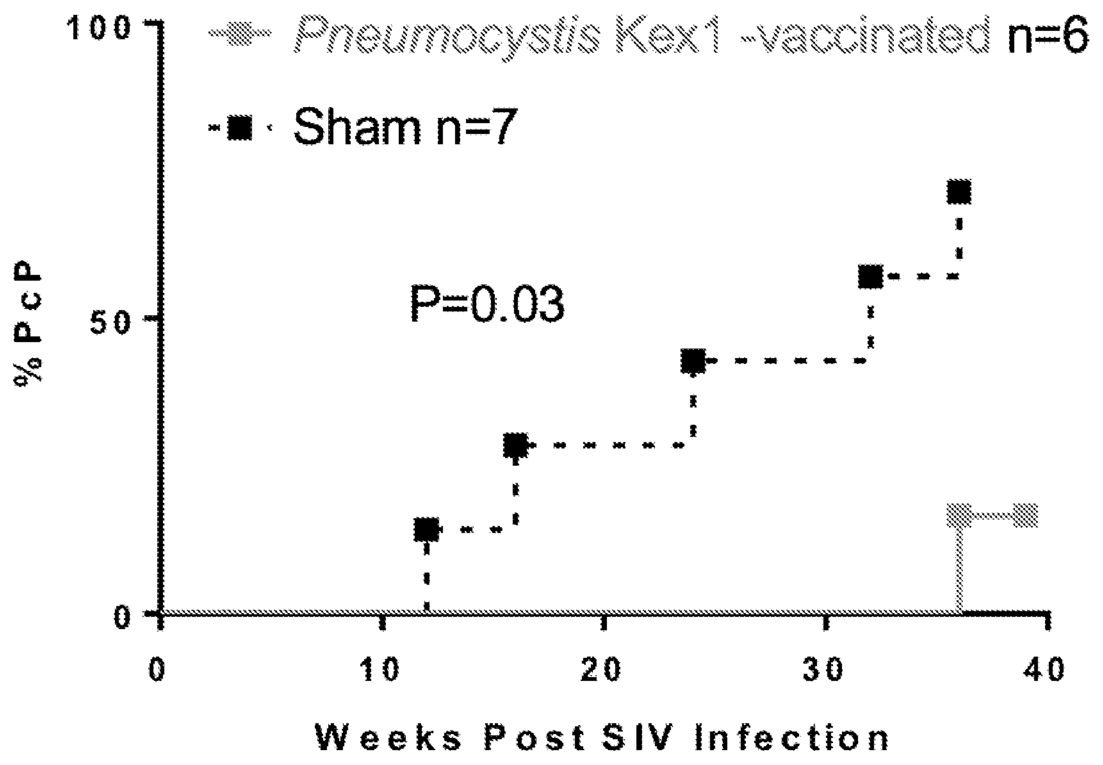

Adult Rhesus macaques were intramuscularly immunized with 100 μg *Pneumocystis* Kex1 (wildtype Kex1: DDDGKTVDGPSPLVLRAFINGVNNGRNGLGSIYVFASGNGGIY DDNCNFDGYANSVFTITIGGIDKHGKRFAYSEACSSQLAVTYAGGSA) and aluminum hydroxide (Imject Alum, Thermo Scientific) mixed in a 1:1 ratio and then boosted 8 weeks later with 50 μg wildtype Kex1 and aluminum hydroxide. At eight weeks post-boost, the monkeys were infected with simian immunodeficiency virus (SIV) and challenged with *Pneumocystis*. At 10 and 14 weeks post infection, the monkeys were boosted with 100 μg wildtype Kex1 and 5 μg α-GC. Seven additional adult Rhesus macaques were intramuscularly immunized with alum mixed in a 1:1 ratio and then boosted 8 weeks later with alum. At eight weeks post-boost, the monkeys were infected with simian immunodeficiency virus (SIV) and challenged with *Pneumocystis* (FIG. 4A) and boosted at 10 and 14 weeks post infection with PBS. Referring to FIG. 4B, ELISA analysis of sera samples collected from *Pneumocystis* Kex1-vaccinated in sham controls. The peak titers for the wild type Kex1 vaccinated group was greater than $10^5$ following both the second wildtype Kex1 with alum and wildtype Kex1 with α-GC boosts. Referring to FIG. 4C, only one of the six wildtype *Pneumocystis* Kex1-vaccinated monkeys developed *Pneumocystis* pneumonia, and this occurred at the end of the 40-week *Pneumocystis* challenge.

Example 8: Therapeutic Vaccination in SIV-Immunocompromised Nonhuman Primates (NHPs)

Figure 5A:
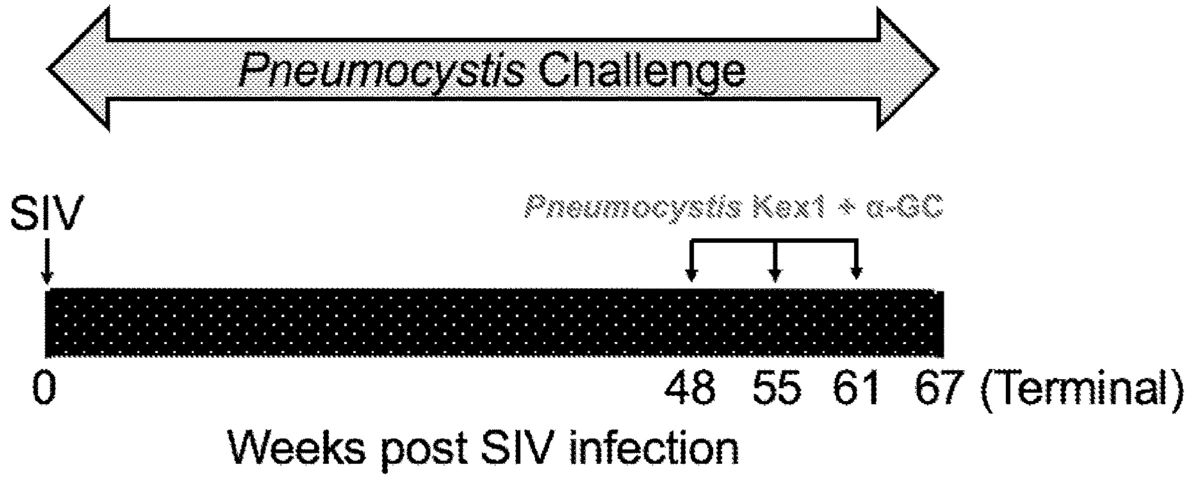
FIGS. 5A and 5B summarize *Pneumocystis* Kex1 therapeutic vaccination with αGC adjuvant in SIV-infected Rhesus macaques.
Figure 5B:
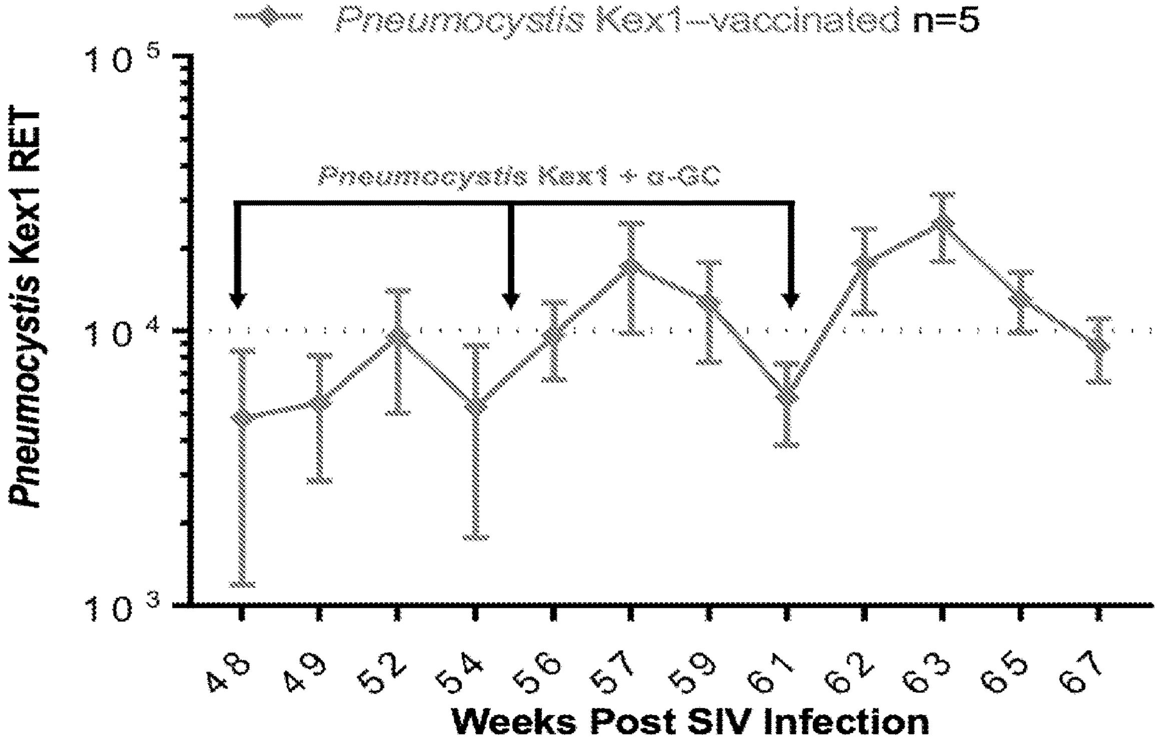

Adult Rhesus macaques were SIV infected and boosted 48, 55, and 61 weeks later with 50 μg*Pneumocystis* Kex 1 and 5 μg alpha-galactosylceramide (αGC) as an adjuvant (FIG. 5A). Referring to FIG. 5B, ELISA analysis of sera samples collected from *Pneumocystis* Kex1-vaccinated animals. The peak reciprocal endpoint titers for the wild type Kex1 vaccinated group were greater than $10^4$ following second and third boost with α-GC at 57 and 63 weeks post-infection.

Example 9: Evaluation of the Immunogenicity and Protective Efficacy of PF,KEX1 in a Murine Model of *Aspergillus fumigatus* (AF) Infection A mouse model of invasive pulmonary aspergillosis (IPA) was used to assess whether mice immunized with the panfungal kex peptide (Pan-fungal peptide 2) and adjuvant would mount a humoral immune response that protected the immunized animals from subsequent infection by *Aspergillus* pathogen as described below.

Humoral Immune Responses to Pan fungal peptide 2

Figure 6A:
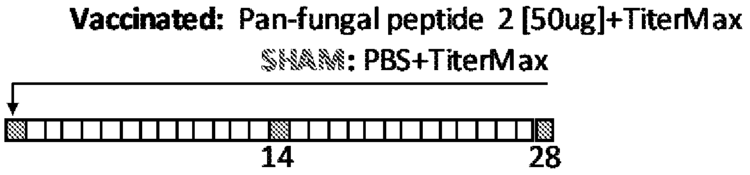
FIGS. 6A and 6B illustrate Pan-fungal peptide 2-specific humoral responses following Pan-fungal peptide 2 immunization in mice.
Figure 6B:
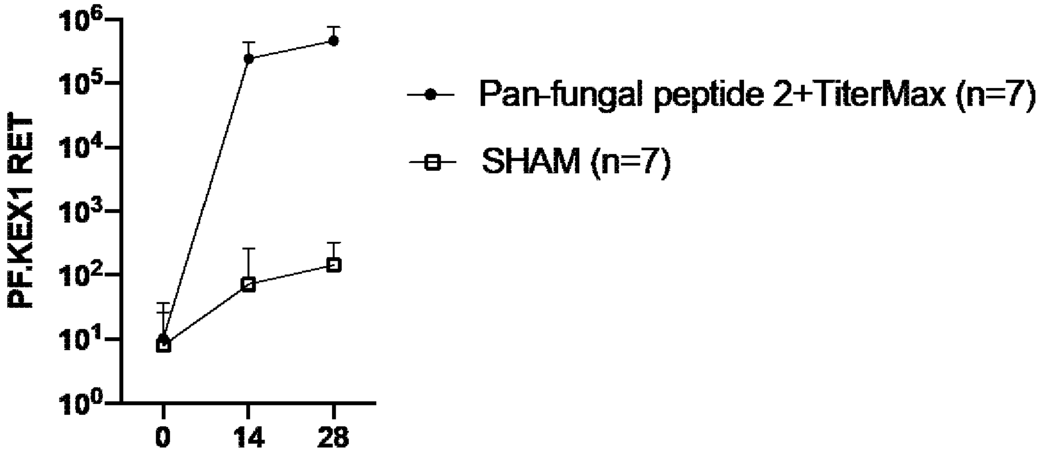

The immunogenicity of the Pan-fungal peptide 2immunogen (termed "vaccine candidate" herein) was evaluated by immunization (vaccination) of animals with recombinant Pan-fungal peptide 2 and TiterMax adjuvant or with PBS and TiterMax, according to the schedule shown in FIG. 6A. FIG. 6B illustrates that anti-Pan-fungal peptide 2 antibody titers significantly increased following immunization (vaccination) of the mice and peaked at 28 days post immunization (mean=$5\times10^5$) compared with the sham-immunized cohort (**p=0.002).

Figure 7:
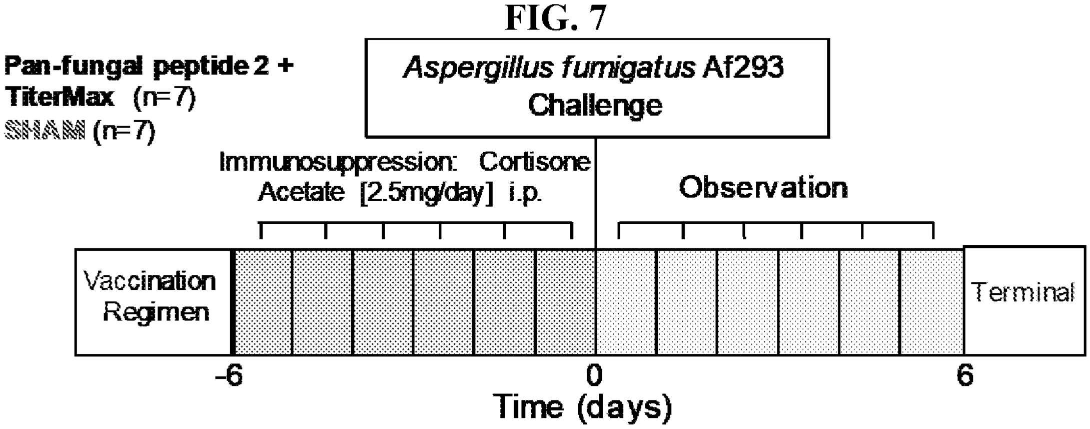
FIG. 7 is a diagram illustrating the design of a study in which mice were vaccinated with Pan-fungal peptide 2 peptide and then challenged with *Aspergillus fumigatus* pathogen. Following the Pan-fungal peptide 2 peptide and sham vaccination regimens as described in FIG. 6A, all mice were immunosuppressed by administering 2.5 mg cortisone acetate per day for six days before intranasal challenge of $5\times10^6$ *Aspergillus* (Af293) *conidia* spores. All mice were then observed twice daily for signs of invasive pulmonary aspergillosis (IPA). The association between Pan-fungal peptide 2 vaccination and IPA-related mortality is presented in Table 2 of Example 9, infra.

Pan Fungal Peptide 2 Immunization Protects Against Invasive Pulmonary Aspergillosis (IPA) in Immunosuppressed CF-1 Mice Following vaccination, seven (7) Pan-fungal peptide 2-immunized mice and 7 sham-immunized mice were immunosuppressed for six days before they were challenged intranasally with $5\times10^6$ *Aspergillus fumigatus* (Af293) conidia (FIG. 7). The mice were then observed twice daily for ruffled fur, labored breathing, weight loss and drops in body temperature, which are signs of aspergillosis. Over the observation period, 3 of the sham-immunized cohort developed evidence of aspergillosis and met the criteria for euthanasia. None of the Pan-fungal peptide 2-immunized mice exhibited severe symptoms or succumbed to aspergillosis during the course of the experiment. Survival of the Pan-fungal peptide 2-immunized mice was significantly higher compared to that of the sham-immunized mice (*p=0.05). In addition, the sham-immunized mice had 1.7 times the relative risk of invasive pulmonary aspergillosis (IPA)-related mortality compared to the risk found in Pan-fungal peptide 2-immunized animals (Table 2).

TABLE 2

Association between Pan-fungal peptide 2 Vaccination and IPA-related mortality

| Cohort | Pan-fungal peptide 2-Vaccinated | Sham-Vaccinated |
|---|---|---|
| All animals | n = 7 | n = 7 |
| Primary Outcome | | |
| IPA-related mortality | 0 | 3 |
| No IPA-related mortality | 7 | 4 |
| Relative Risk | | |
| Value | — | 1.750 |
| 95% CI, Koopman asymptotic score | — | 0.9974-2.981 |
| Association between Pan-fungal Peptide 2 Vaccination and IPA-related mortality | | |
| Fisher's exact test p value | — | *0.05 |

CI, confidence interval;
Invasive Pulmonary Aspergillosis (IPA); *p < 0.05

Figure 8:
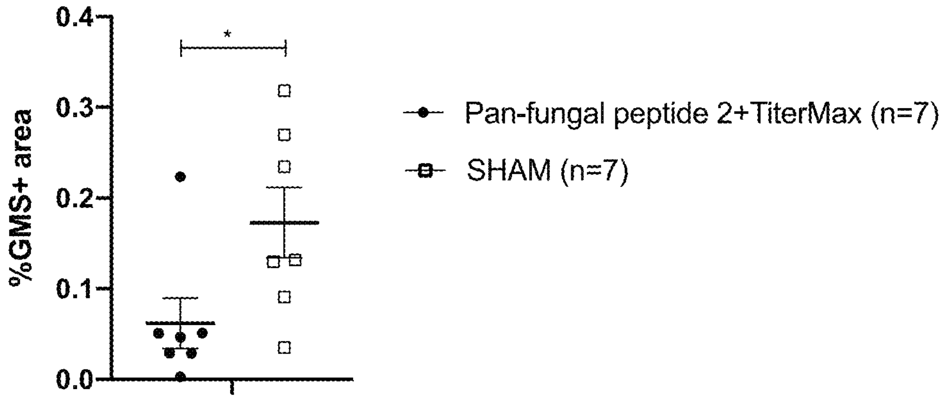
FIG. 8 is a graph showing lung fungal burden following *A. fumigatus* challenge, as described above in FIG. 7. Quantification of the fungal burden in the lungs was carried out using Grocott's methenamine silver (GMS) staining. *A. fumigatus* fungal burden was significantly reduced in Pan-fungal peptide 2-vaccinated animals (*p=0.026).

Table 2 presents the association and relative risk analysis comparing vaccination to observation of humane endpoint criteria. Pan-fungal peptide 2 vaccination showed a significant association with IPA-related mortality (*p=0.05), while sham-vaccinated mice had 1.75 times the relative risk of IPA-related mortality. These results were further supported by an analysis of fungal burden, which was conducted using GMS staining histological quantification. *A. fumigatus* pulmonary fungal burden was significantly reduced in Pan-fungal peptide 2-immunized mice compared to that of the sham-immunized cohort (FIG. 8), (*p=0.026).

Materials and Methods used in this Example are as follows:

Study Design

Fourteen (14) CF-1 mice (Charles River Laboratories) were randomly assigned to immunization and sham cohorts. Blood was collected at baseline (day 0), as well as at 14 and 28 days following immunization (FIG. 6A). Plasma samples were stored at −80° C.

Vaccine Construction and Purification

A 90-amino recombinant protein, Pan-fungal peptide 2 (SEQ ID NO: 2) was cloned into the pET28b(+) expression vector (Novagen) in *Escherichia coli* BL21(DE3) pLysS (ThermoFisher Scientific) and purified by affinity chromatography.

Immunization and Immunosuppression

Seven (7) mice were immunized subcutaneously at the base of the tail with 50 μg Pan-fungal peptide 2 prepared 1:1 with TiterMax adjuvant according the adjuvant guidelines. An additional seven (7) mice were sham-immunized with PBS and TiterMax. 28 days following immunization, all mice began an immunosuppressive regimen of 2.5 mg cortisone acetate per mouse in PBS with 0.5% methylcellulose and 0.01% Tween-80, injected subcutaneously. This regimen was administered for six days (FIG. 7), during which time trimethoprim sulfamethoxazole was added to the drinking water to control secondary infections.

*Aspergillus fumigatus* Challenge and Monitoring

*A. fumigatus* Af293 conidia were maintained on solid 1% glucose minimal medium for 72 hours, harvested in 0.01% Tween-20, counted with a hemocytometer, and then were diluted in PBS. Mice were inoculated with $5\times10^6$ conidia in 40 μl PBS via intranasal inoculation following the six days of cortisone acetate immunosuppression as described above.

Following challenge, mice were monitored twice daily for changes in weight, temperature, and appearance. If weight loss exceeded 20 percent of the baseline body weight or body temperature fell below 29° C. in addition to exhibiting ruffled fur and labored breathing, the animals were humanely sacrificed. At six days following challenge, all remaining animals were humanely sacrificed and their lungs were collected for analysis.

Fungal Burden

Following sacrifice, the right lungs of all animals were stored in 10% neutral buffered formalin. The fixed lung tissue was embedded in paraffin, cut, and stained with Gomori's modified methanamine silver stain. Images of five distinct fields were taken and fungal burden was quantified according to the guidelines provided by Stolz et al., 2018, J. Vis. Exp., (133)e57155:1-8.

Statistical Analysis

All statistical analyses were performed using GraphPad Prism (GraphPad Software, La Jolla, CA). Reduction in IPA-related mortality was assessed using Fisher's exact test. The relative risk in IPA-mortality was also determined using Koopman asymptotic score. Differences in fungal burden by GMS staining were analyzed by Mann-Whitney U tests.

Example 10: Evaluation of the Immunogenicity and Protective Efficacy of Pan-Fungal Peptide 2 in a Non-Human Primate Model of *Pneumocystis* and HIV(SIV) Co-Infection Humoral Immune Responses to Pan fungal peptide 2

Figure 9A:
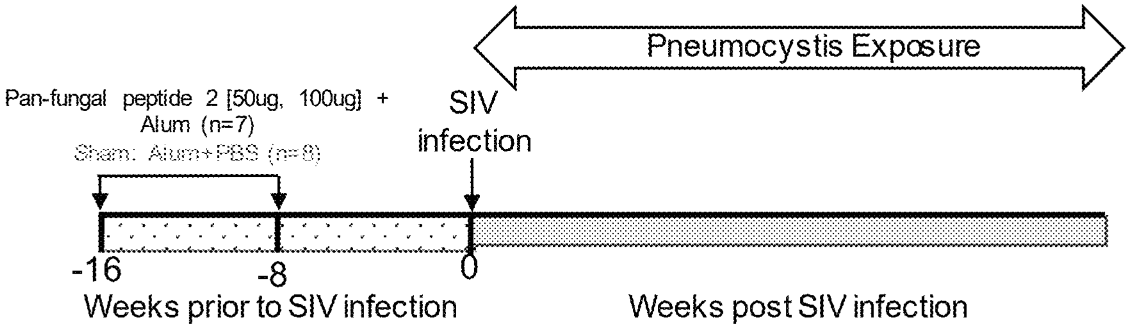
FIGS. 9A and 9B depict Pan-fungal peptide 2-specific humoral responses following Pan-fungal peptide 2immunization in non-human primates.
Figure 9B:
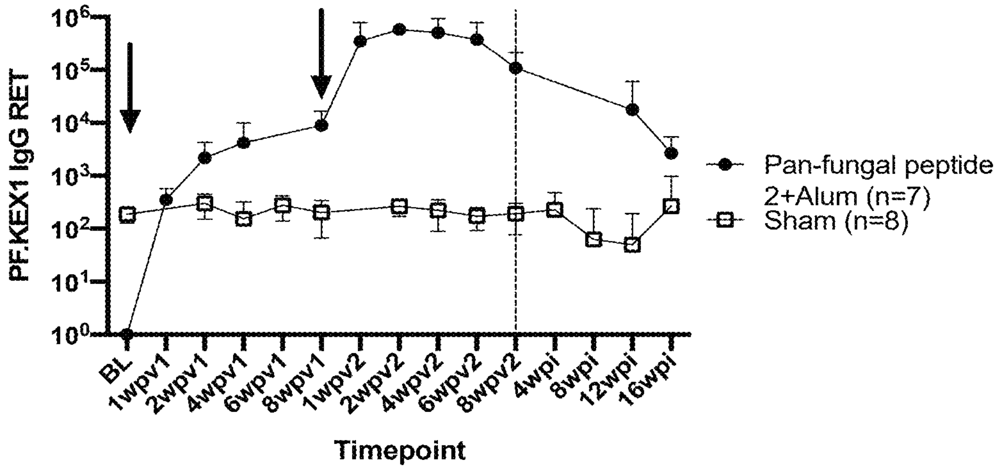

The immunogenicity of the Pan-fungal peptide 2 immunogen (called "vaccine candidate" herein) was evaluated by immunization (vaccination) of non-human primates with recombinant Pan-fungal peptide 2 and alum or with PBS and alum, according to the schedule shown in FIG. 9A. Anti-Pan-fungal peptide 2 antibody titers significantly increased in animals following immunization and peaked at two weeks post boost (mean=$4\times10^5$), while no significant change in antibody titers was observed in the sham-immunized cohorts (FIG. 9B).

Pan Fungal Peptide 2 Immunization Protects against *Pneumocystis* Pneumonia

Following the vaccination regimen illustrated in FIG. 9A, all animals were infected with Simian Immunodeficiency Virus (SIV) and were monitored monthly for *Pneumocystis*. Over the course of SIV infection, 5 macaques in the sham-immunized cohort tested positive for *Pneumocystis* pneumonia (PCP) by PCR and bronchoalveolar lavage (BAL) smear by 32 weeks post SIV infection. None of the Pan-fungal peptide 2-immunized macaques exhibited symptoms or tested positive for PCP by this same timepoint. This finding demonstrates a significant reduction in the number of PCP cases in Pan-fungal peptide 2-immunized animals (p=0.035). Table 3 below presents data related to the association between Pan-fungal peptide 2 immunization (vaccination) and Pneumocystis pneumonia (PCP) disease in study animals, as well as a significant association between Pan-fungal peptide 2 immunization (vaccination) and PCP (p=0.026). The association and relative risk of immunization of animals with Pan-fungal peptide 2 and the diagnosis of PCP is shown in Table 3. Furthermore, the relative risk of a sham-immunized (vaccinated) animal acquiring PCP was determined to be 3.3 times that of a Pan-fungal peptide 2-immunized (vaccinated) animal (Table 3).

TABLE 3

Association between Pan-fungal peptide 2 Vaccination and Pneumocystis pneumonia

| Cohort | Pan-fungal peptide 2-Vaccinated | Sham-Vaccinated |
|---|---|---|
| All animals | n = 7 | n = 8 |
| Primary Outcome | | |
| PCP | 0 | 5 |
| No PCP | 7 | 3 |
| Relative Risk | | |
| Value | — | 3.333 |
| 95% CI, Koopman asymptotic score | — | 1.409-4.088 |
| Association between Pan-fungal peptide 2 Vaccination and PCP | | |
| Fisher's exact test p value | — | *0.0256 |

CI, confidence interval;
PCP, *Pneumocystis* pneumonia; *p < 0.05

Pan Fungal Peptide 2 Immunization Reduces *Pneumocystis* Colonization

Figure 10:
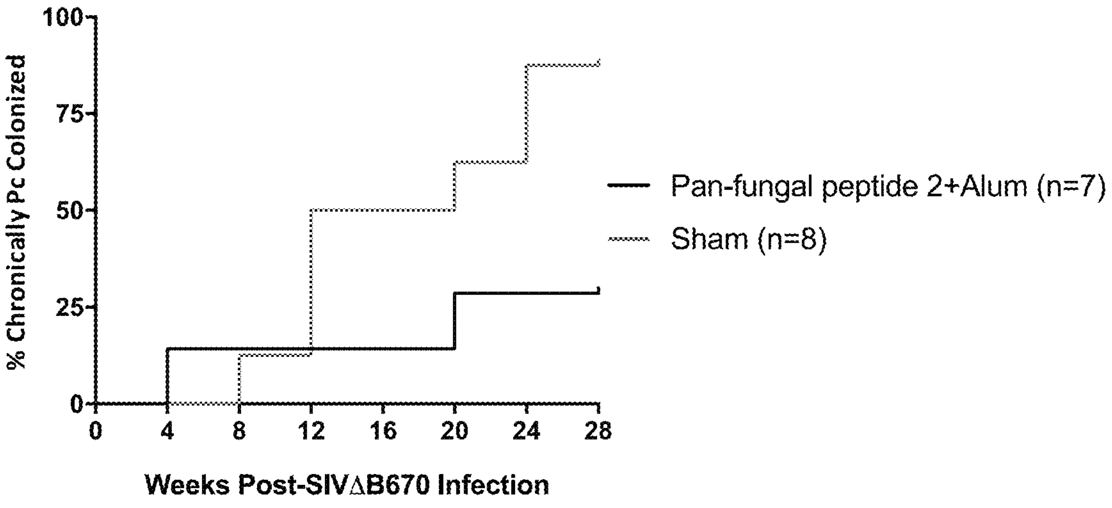
FIG. 10 is a graph showing chronic *Pneumocystis* colonization in Pan-fungal peptide 2-vaccinated and sham-vaccinated cohorts of Rhesus macaques. The graph illustrates the percentage of SIV-infected animals (Pan-fungal peptide 2-vaccinated (n=7) or sham-vaccinated (n=8)) that were chronically colonized with *Pneumocystis* (two or more consecutive months with positive nested PCR) over the course of the SIV infection (28 weeks post SIV inoculation) compared by Kaplan-Meier (*p=0.05). At 28 weeks post-infection, significantly fewer Pan-fungal peptide 2-immunized, SIV infected animals were chronically colonized with *Pneumocystis* compared with sham-immunized animals.

In addition to detection of *Pneumocystis* by first round PCR, BAL samples were assessed by nested PCR for colonization with *Pneumocystis*. FIG. 10 illustrates the time (in weeks) to chronic colonization (as determined by a positive nested PCR in two or more consecutive months) in both Pan-fungal peptide 2-immunized and sham-immunized cohorts. Chronic colonization was found to be significantly reduced in the Pan-fungal peptide 2-immunized cohort compared to the sham-immunized cohort by 28 weeks post infection (wpi), (*p=0.05).

Materials and Methods used in this Example are as follows:

Animals

Fifteen (15) adult Chinese-origin rhesus macaques (*Macaca mulatta*) were obtained from national primate centers or vendors and were housed in accordance with the NIH Guide for the Care and Use of Laboratory Animals in a BSL2+ primate facility.

Vaccine Construction and Purification

A 90-amino recombinant protein Pan-fungal peptide 2 was cloned into the pET28b(+) expression vector (Novagen) in *Escherichia coli* BL21(DE3) pLysS (ThermoFisher, Scientific) and was purified by affinity chromatography. The recombinant Pan-fungal peptide 2 protein was used for immunization and enzyme-linked immunosorbent assay (ELISA).

Immunization and Study Design

Seven macaques were intramuscularly immunized with 100 μg of recombinant Pan-fungal peptide 2 and aluminum hydroxide (Imject Alum, Thermo Scientific) mixed in a 1:1 ratio. A control cohort of eight sham-immunized (vaccinated) macaques received PBS and alum. Animals were rested for eight weeks, after which time Pan-fungal peptide 2immunized animals were boosted with 50 μg of Pan-fungal peptide 2and alum, and sham-immunized animals were sham inoculated as described above. 8 weeks following the boost, the NHP animals were infected intravenously with SIV/Delta B670 (1:100 in PBS), tissue culture infectious dose of 50% ($TCID_{50}=2.6\times10^5$). Viral infection was monitored at weekly time points for 4 weeks and monthly thereafter for up to 32 weeks after infection. Bronchoalveolar lavage (BAL) fluid was collected monthly to monitor for the presence of *Pneumocystis* infection.

*Pneumocystis* Challenge and Determination of *Pneumocystis* Infection

*Pneumocystis* (Pc) cannot be reliably cultured in vitro. Thus, *Pneumocystis* challenge of Pan-fungal peptide 2-immunized and sham-immunized rhesus macaques was performed via natural airborne transmission by co-housing these animals as described previously by Kling et al. (2010, *Infect. Immun.,* 78(10):4320-4330). *Pneumocystis* pneumonia (PCP) was defined as detection of *Pneumocystis* in BAL fluid by first-round PCR and/or by microscopy-based detection of *Pneumocystis* in a BAL smear. Nested PCR was performed by amplifying 5 μL of the first-round product, as previously described (Savoia, D. et al., 1997, *Diagn Microbiol Infect Dis,* 29(2):61-65). Chronic pulmonary *Pneumocystis* colonization was defined as detection of *Pneumocystis* DNA in the nested round of PCR in two or more consecutive months. To control for the DNA quality in BAL fluid samples, PCR for detection of β-globin was also performed on BAL samples at each timepoint (method described by Croix, D A et al., 2002, AIDS Res Hum Retroviruses, 18(5):391-401).

Statistical Analysis

All statistical analyses were performed using GraphPad Prism (GraphPad Software, La Jolla, CA). Fisher's exact test used to determine the association between Pan-fungal peptide 2 immunization (vaccination) and the incidence of PCP in the vaccinated group compared with the sham-immunized group. Differences in PCP diagnosis between Pan-fungal peptide 2 immunized and sham-immunized cohorts were compared using a Kaplan-Meier test. The relative risk of PCP was calculated using Koopman asymptotic score. Chronic Pc colonization was evaluated by Mantel-Cox test.

Other Embodiments

From the foregoing description, it will be apparent that variations and modifications may be made to the aspects and embodiments described herein to adopt them to various usages and conditions. Such embodiments are also within the scope of the following claims.

The recitation of a listing of elements in any definition of a variable herein includes definitions of that variable as any single element or combination (or subcombination) of listed elements. The recitation of an embodiment herein includes that embodiment as any single embodiment or in combination with any other embodiments or portions thereof.

All patents and publications mentioned in this specification are herein incorporated by reference to the same extent as if each independent patent and publication was specifically and individually indicated to be incorporated by reference.

What is claimed is:

1. A method of eliciting an immune response in a subject, the method comprising administering to the subject an immunogenic composition comprising an effective amount of an immunogenic peptide having at least about 95% or more amino acid sequence identity to PDDGKTMEGPDIL-VLRAFINGVQNGRDGKGSIYVFASGNGGGFEDNCN-FDGYTNSIYSIT VGAIDRKGLHPSYSEACSAQLVVTY-SSGSG (Pan-fungal peptide 2) as set forth in SEQ ID NO: 2, or a polynucleotide encoding the peptide, and a pharmaceutically acceptable carrier or excipient.

2. The method of claim 1, wherein the subject is a human subject that is immunocompromised or immunosuppressed and/or is a pre-transplant subject or a post-transplant subject.

3. A method of treating or protecting a subject against a fungal infection, the method comprising administering to the subject an immunogenic composition comprising an effective amount of an immunogenic peptide having at least about 95% or more amino acid sequence identity to PDDGKTMEGPDILVLRAFINGVQNGRDGKGSIYV-FASGNGGGFEDNCNFDGYTNSIYSIT VGAIDRKGL-HPSYSEACSAQLVVTYSSGSG (Pan-fungal peptide 2) as set forth in SEQ ID NO: 2 or a polynucleotide encoding the peptide, and a pharmaceutically acceptable carrier or excipient.

4. A method of treating or protecting a subject against a fungal infection, the method comprising administering to the subject an immunogenic composition comprising an effective amount of an immunogenic peptide having at least about 95% or more amino acid sequence identity to PDDGKTMEGPDILVLRAFINGVQNGRDGKGSIYVFA-SGNGGGFEDNCNFDGYTNSIYSIT VGAIDRKGLHP-SYSEACSAQLVVTYSSGSG (Pan-fungal peptide 2) as set forth in SEQ ID NO: 2, or a polynucleotide encoding the peptide, and a pharmaceutically acceptable carrier or excipient; wherein the immunogenic composition elicits in the subject the production of antiserum comprising isolatable antibodies that specifically react with Pan-fungal peptide 2 and with kexin peptides of one or more fungal pathogens selected from *Aspergillus, Candida, Cryptococcus*, or *Pneumocystis* fungal pathogens.

5. The method of claim 4, wherein an adjuvant comprising alpha-galactosylceramide (a-GC) or alum is co-administered to the subject.

6. The method of claim 4, wherein the method treats pulmonary disease, pulmonary dysfunction or a symptom thereof.

7. The method of claim 6, wherein the pulmonary disease or pulmonary dysfunction is *Pneumocystis* pneumonia (PCP), aspergillosis or Invasive Pulmonary Aspergillosis (IPA).

8. A method of eliciting an immune response in a subject, or treating or protecting a subject against a fungal infection, the method comprising: administering to the subject an immunogenic composition comprising an effective amount of an immunogenic peptide comprising or consisting of the amino acid sequence PDDGKTMEGPDILVLRAFING-VQNGRDGKGSIYVFASGNGGGFEDNCNFDGYTN-SIYSIT VGAIDRKGLHPSYSEACSAQLVVTYSSGSG (Pan-fungal peptide 2) as set forth in SEQ ID NO: 2, or a polynucleotide encoding the peptide, and a pharmaceutically acceptable carrier or excipient.

9. The method of claim 8, wherein the fungal infection is caused by an *Aspergillus, Candida, Cryptococcus*, or *Pneumocystis* fungal organism.

10. The method of claim 8, wherein the composition further comprises an adjuvant comprising alpha-galactosylceramide (a-GC) or alum.

11. The method of claim 8, wherein the method treats or protects against pulmonary disease, pulmonary dysfunction, Invasive Pulmonary Aspergillosis (IPA), or a symptom thereof.

12. The method of claim 11, wherein the pulmonary disease or pulmonary dysfunction is *Pneumocystis* pneumonia (PCP) and/or symptoms thereof, and wherein the *Aspergillus*-associated disease is Invasive Pulmonary Aspergillosis (IPA) and/or symptoms thereof.

13. The method of claim 8, wherein the subject is a human subject that is immunocompromised or immunosuppressed and/or is a pre-transplant subject or a post-transplant subject.

14. The method of claim 13, wherein the immunocompromised or immunosuppressed subject is being treated for cancer, an immunodeficiency disease, a congenital disease, or an autoimmune disease, HIV, rheumatoid arthritis, or psoriasis.

15. A method of treating or protecting a subject against a fungal infection, the method comprising administering to the subject an immunogenic composition comprising an effective amount of an immunogenic peptide comprising or consisting of the amino acid sequence PDDGKTMEGPDIL-VLRAFINGVQNGRDGKGSIYVFASGNGGGFEDNCN-FDGYTNSIYSIT VGAIDRKGLHPSYSEACSAQLVVTY-SSGSG (Pan-fungal peptide 2) as set forth in SEQ ID NO: 2, or a polynucleotide encoding the peptide, and a pharmaceutically acceptable carrier or excipient; wherein the immunogenic composition elicits in the subject the production of antiserum comprising isolatable antibodies that specifically react with Pan-fungal peptide 2 and with kexin peptides of one or more fungal pathogens selected from *Aspergillus, Candida, Cryptococcus*, or *Pneumocystis* fungal pathogens.

* * * * *